United States Patent
Ward et al.

(10) Patent No.: US 11,787,279 B2
(45) Date of Patent: Oct. 17, 2023

(54) OFF-ROAD RECREATIONAL VEHICLE

(71) Applicant: Arctic Cat Inc., Thief River Falls, MN (US)

(72) Inventors: Nicholas Keegan Ward, Saint Joseph, MN (US); Chadwick Allen Williams, Paynesville, MN (US); Luke Adam Baker, St. Cloud, MN (US); Ross Leonard Nygren, Rogers, MN (US); Aaron Lee Swanson, Kandiyohi, MN (US); Cody Tove Kallock, Becker, MN (US); Kyle Douglas Olason, Thief River Falls, MN (US); Lucas Grant Purcell, St. Cloud, MN (US); Reid Dale Anderson, Maple Lake, MN (US); Casey Leland Root, Big Lake, MN (US); Michael Jeffrey Lupelow, Maplewood, MN (US); Thomas Robert Brausen, St. Cloud, MN (US); Stephen Tyler Deck, Augusta, GA (US); Shane Dean Kruse, Hutchinson, MN (US); Robby Gordon, Charlotte, NC (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 17/470,080

(22) Filed: Sep. 9, 2021

(65) Prior Publication Data

US 2022/0134859 A1    May 5, 2022

Related U.S. Application Data

(63) Continuation of application No. 16/717,256, filed on Dec. 17, 2019, now abandoned, which is a
(Continued)

(51) Int. Cl.
  *B62D 21/11*   (2006.01)
  *B60K 5/12*    (2006.01)
  (Continued)

(52) U.S. Cl.
  CPC .......... *B60K 5/1275* (2013.01); *B60G 3/145* (2013.01); *B60G 3/185* (2013.01); *B60G 3/207* (2013.01);
  (Continued)

(58) Field of Classification Search
  CPC B62D 21/11; B60G 2300/07; B60Y 2200/20; B60K 5/10; B60K 5/12; B60K 5/1208; B60K 5/1216
  See application file for complete search history.

(56) References Cited

U.S. PATENT DOCUMENTS

| | | |
|---|---|---|
| 2,474,360 A | 6/1949 | Jimerson |
| 3,608,936 A | 9/1971 | Karden |
| (Continued) | | |

FOREIGN PATENT DOCUMENTS

| | | |
|---|---|---|
| CN | 103057392 A | 4/2013 |
| CN | 113074192 A | 7/2021 |
| (Continued) | | |

OTHER PUBLICATIONS

Dakar 2013: preparation of participants Robby Gordon, Nasser Al-Attiyah and Gerard De Rooy Article showing Dakar Hummer; Oct. 19, 2012.
(Continued)

*Primary Examiner* — James A English
(74) *Attorney, Agent, or Firm* — Billion & Armitage

(57) ABSTRACT

Embodiments relate to an off-road vehicle comprising a frame, including at least one cargo box support member, a suspension movably coupled to the frame, a passenger compartment, an engine, a transmission operatively coupled
(Continued)

to the engine, and a cargo box. The cargo box includes a floor and a plurality of upwardly extending sidewalls, wherein at least a portion of the cargo box floor extends over the at least one cargo box support member and wherein the cargo box is removably coupled to the at least one cargo box support members and is removable from the off-road vehicle via the removal of fewer than eight fasteners.

17 Claims, 98 Drawing Sheets

Related U.S. Application Data continuation of application No. 15/811,011, filed on Nov. 13, 2017, now abandoned, which is a continuation-in-part of application No. 15/244,793, filed on Aug. 23, 2016, now abandoned.

(60) Provisional application No. 62/208,805, filed on Aug. 23, 2015.

(51) Int. Cl.
| | | |
|---|---|---|
| *B60K 5/04* | (2006.01) | |
| *B60G 7/02* | (2006.01) | |
| *B60G 7/00* | (2006.01) | |
| *B60G 3/20* | (2006.01) | |
| *B60G 3/18* | (2006.01) | |
| *B60G 3/14* | (2006.01) | |
| *B60K 17/34* | (2006.01) | |
| *B60K 11/04* | (2006.01) | |
| *B62D 5/04* | (2006.01) | |
| *B62D 23/00* | (2006.01) | |
| *B60K 17/16* | (2006.01) | |
| *B60K 5/10* | (2006.01) | |
| *B60K 17/22* | (2006.01) | |
| *B60K 17/24* | (2006.01) | |
| *B60K 5/00* | (2006.01) | |

(52) U.S. Cl.
CPC ............. *B60G 7/003* (2013.01); *B60G 7/006* (2013.01); *B60G 7/02* (2013.01); *B60K 5/04* (2013.01); *B60K 5/10* (2013.01); *B60K 11/04* (2013.01); *B60K 17/165* (2013.01); *B60K 17/22* (2013.01); *B60K 17/24* (2013.01); *B60K 17/34* (2013.01); *B62D 5/04* (2013.01); *B62D 21/11* (2013.01); *B62D 23/005* (2013.01); *B60G 2200/1322* (2013.01); *B60G 2200/1442* (2013.01); *B60G 2200/18* (2013.01); *B60G 2200/46* (2013.01); *B60G 2200/4622* (2013.01); *B60G 2204/129* (2013.01); *B60G 2204/1242* (2013.01); *B60G 2204/15* (2013.01); *B60G 2204/61* (2013.01); *B60G 2204/62* (2013.01); *B60G 2300/07* (2013.01); *B60K 2005/003* (2013.01); *B60Y 2200/124* (2013.01); *B60Y 2200/20* (2013.01); *B60Y 2300/84* (2013.01); *B60Y 2400/72* (2013.01); *B60Y 2400/802* (2013.01)

(56) References Cited

U.S. PATENT DOCUMENTS

| | | |
|---|---|---|
| 4,103,514 A | 8/1978 | Grosse-Entrup |
| 4,177,654 A | 12/1979 | Aucktor |
| 4,223,758 A | 9/1980 | Schopf |
| 4,254,639 A | 3/1981 | Teramachi |
| 4,705,491 A | 11/1987 | Andersson |
| 5,026,325 A | 6/1991 | Welschof |
| 5,036,939 A | 8/1991 | Johnson et al. |
| 5,611,733 A | 3/1997 | Jacob et al. |
| 5,624,318 A | 4/1997 | Jacob et al. |
| 5,725,453 A | 3/1998 | Zalewski et al. |
| 5,836,599 A | 11/1998 | Rein |
| 5,855,386 A | 1/1999 | Atkins |
| 6,112,843 A | 9/2000 | Wilcox et al. |
| 6,145,416 A | 11/2000 | Bonniot |
| 6,217,456 B1 | 4/2001 | Jacob |
| 6,234,908 B1 | 5/2001 | Jacob |
| 6,254,487 B1 | 7/2001 | Jacob |
| 6,306,045 B1 | 10/2001 | Jacob |
| 6,390,928 B1 | 5/2002 | Welschof et al. |
| 6,422,369 B1 | 7/2002 | McCalla |
| 6,585,602 B2 | 7/2003 | Cermak et al. |
| 6,851,691 B2 | 2/2005 | Rasidescu et al. |
| 6,874,392 B1 | 4/2005 | Wu |
| 6,902,487 B2 | 6/2005 | Welschof |
| 7,018,317 B2 | 3/2006 | Tweet |
| 7,229,358 B2 | 6/2007 | Carlini et al. |
| 7,281,984 B2 | 10/2007 | Foster-Hamilton et al. |
| 7,363,999 B2 | 4/2008 | Hastings |
| 7,488,257 B1 | 2/2009 | Booker et al. |
| 7,510,199 B2 | 3/2009 | Nash et al. |
| 7,670,229 B2 | 3/2010 | Disser et al. |
| 7,673,719 B2 | 3/2010 | Buschena |
| 7,762,894 B2 | 7/2010 | Momiyama et al. |
| 7,905,540 B2 | 3/2011 | Kiley et al. |
| 8,070,611 B2 | 12/2011 | Wormsbaecher et al. |
| 8,083,245 B2 | 12/2011 | Hatzikakidis |
| 8,118,683 B2 | 2/2012 | Disser et al. |
| 8,328,649 B2 | 12/2012 | Disser |
| 8,388,457 B2 | 3/2013 | Keller |
| 8,523,209 B2 | 9/2013 | Pollmeyer et al. |
| 8,573,337 B1 | 11/2013 | Luoma et al. |
| 8,649,950 B2 | 2/2014 | Yang |
| 8,746,394 B2 | 6/2014 | Kuramoto et al. |
| 8,746,719 B2 | 6/2014 | Safranski et al. |
| 8,764,039 B2 | 7/2014 | Keller |
| 8,870,667 B2 | 10/2014 | Buth et al. |
| 9,381,785 B2 | 7/2016 | Gale |
| 9,493,185 B2 | 11/2016 | Dada et al. |
| 9,623,909 B1 | 4/2017 | Hirano |
| 9,623,912 B2 | 4/2017 | Schlangen |
| 10,036,428 B2 | 7/2018 | Doner et al. |
| 10,124,659 B2* | 11/2018 | Bessho .............. B60K 13/04 |
| 10,160,497 B2* | 12/2018 | Wimpfheimer .......... B60G 3/20 |
| 10,196,094 B2* | 2/2019 | Tsumiyama ......... B62D 23/005 |
| 10,280,683 B1 | 5/2019 | Smid |
| 10,350,952 B2 | 7/2019 | Gordon et al. |
| 10,358,029 B2 | 7/2019 | Gruschow et al. |
| 2002/0166603 A1 | 11/2002 | Camacho |
| 2003/0090128 A1 | 5/2003 | Seksaria et al. |
| 2006/0012145 A1 | 1/2006 | Gardner |
| 2007/0024044 A1 | 2/2007 | Ogawa |
| 2010/0326761 A1 | 12/2010 | Melcher |
| 2011/0127135 A1 | 6/2011 | Grogg et al. |
| 2012/0031688 A1 | 2/2012 | Safranski |
| 2012/0031693 A1 | 2/2012 | Deckard et al. |
| 2012/0055729 A1 | 3/2012 | Bessho |
| 2012/0063842 A1 | 3/2012 | Keller |
| 2012/0223500 A1 | 9/2012 | Kinsman |
| 2013/0033070 A1* | 2/2013 | Kinsman ................ B60J 5/0487 |
| | | 296/190.03 |
| 2013/0197756 A1 | 8/2013 | Ramirez Ruiz |
| 2013/0319785 A1 | 12/2013 | Spindler |
| 2014/0103627 A1* | 4/2014 | Deckard ................ B60R 22/00 |
| | | 411/362 |
| 2014/0124279 A1 | 5/2014 | Schlangen et al. |
| 2014/0262584 A1 | 9/2014 | Lovold et al. |
| 2014/0345964 A1 | 11/2014 | Nakaoka et al. |
| 2015/0061275 A1 | 3/2015 | Deckard |
| 2015/0094158 A1 | 4/2015 | Mondragon et al. |
| 2015/0137481 A1 | 5/2015 | Manternach et al. |
| 2015/0292371 A1 | 10/2015 | Barnes |
| 2016/0176287 A1* | 6/2016 | Ripley ..................... B60G 3/20 |
| | | 180/365 |
| 2016/0257360 A1 | 9/2016 | Mackenzie |
| 2017/0001549 A1 | 1/2017 | Bessho |

(56) References Cited

U.S. PATENT DOCUMENTS

| | | |
|---|---|---|
| 2017/0050483 A1 | 2/2017 | Gordon |
| 2017/0050517 A1 | 2/2017 | Higuchi |
| 2017/0050673 A1 | 2/2017 | Gordon |
| 2017/0122377 A1 | 5/2017 | Fukuzawa et al. |
| 2017/0174027 A1 | 6/2017 | Mailhot et al. |
| 2017/0248169 A1 | 8/2017 | Gordon |
| 2017/0292570 A1 | 10/2017 | Ketchel et al. |
| 2018/0058821 A1 | 3/2018 | Kwiatkowski et al. |
| 2018/0326846 A1 | 11/2018 | Soto Velasco |
| 2020/0248750 A1 | 8/2020 | Gordon |

FOREIGN PATENT DOCUMENTS

| | | |
|---|---|---|
| DE | 4230529 A1 | 3/1994 |
| DE | 102006016843 A1 | 10/2007 |
| EP | 1081023 A1 | 3/2001 |
| WO | 9002634 A1 | 3/1990 |
| WO | 2014059258 A1 | 4/2014 |

OTHER PUBLICATIONS

Image Off-Road Vehicle, http:www.race-dezert.com/forum/threads/extreme-baja-karts.37384; Dec. 23, 2007.

"1400HP Buckshot Racing sand car build Member Rides & Builds Show off your whip, Show off your System! SMD Forum", retrieved May 4, 2016 from http://www.stevemeadedesigns.com/board/topic/1375431400hpbuckshotracingsandcarbuild/.

"Monster Energy Buckshot Racing Sandrail at the Orange County Sand Show", YouTube Video, https://www.youtube.com/watch?v=UfroFVLVw; Published Sep. 15, 2012.

"RG Pro—Arctic Cat brochure".

"Universal Joint and Driveshaft Design Manual, AE-7, Society of Automotive Engineers", Inc., Warrendale, PA, pp. 311-319, TJ1079.S62. (Year: 1979), 311-319.

"RCV Ultimate UTV Axle for Polaris IP900 Front ('11-'14)", Aug. 20, 2015, 1-2.

"U.S. Appl. No. 14/498,216 PTO File History".

Gordon, et al., "Universal Wishbone Trailing Arm—Specification", Aug. 21, 2015, U.S. Appl. No. 62/208,531, filed 2015.

Gordon, et al., "Universal Wishbone Trailing Arm—Drawings", Aug. 21, 2015, U.S. Appl. No. 62/208,531.

Bertrand, "Front structure of a motor car and motor car equipped with this structure", EPO, EP 1 081 023 A1, Machine Translation of Description, Mar. 7, 2001, 8 pages.

Brandel, et al., "Car with exchangeable rear engine—Has rear engine and wheels mounted in detachable subframe plugging into car shell and fixed by vertical bolts", EPO, DE 4 230 529 A1, Machine Translation of Description, Mar. 17, 1994, 5 pages.

Fu, et al., "An engine suspension assembly", PE2E database, CN 103057392 A, Machine Translation of Description, Apr. 24, 2013, 6 pages.

*Speed RMG Partners, LLC, Robby Gordon, and Todd Romano*, Plaintiffs, v. *Arctic Cat Sales Inc., Arctic Cat Inc.*, Textron Specialized Vehicles Inc., and Textron Inc., Defendants. File No. 20-cv-609, Jury Trial Proceedings—vol. VIII, Dec. 14, 2022.

"Checkmate: Speed UTV Live Presentation No. 108", Speed UTV, Retrieved Apr. 5, 2023 from https://www.youtube.com/watch?v=2tjmuXp9Tw4.

"Deposition of Michael J. Mckeen, Feb. 16, 2021", *Speed RMG Partners* vs *Arctic Cat Sales Inc.*, Case No. 0:20-cv-00609-SRN-LIB, United States District Court for the District of Minnesota.

\* cited by examiner

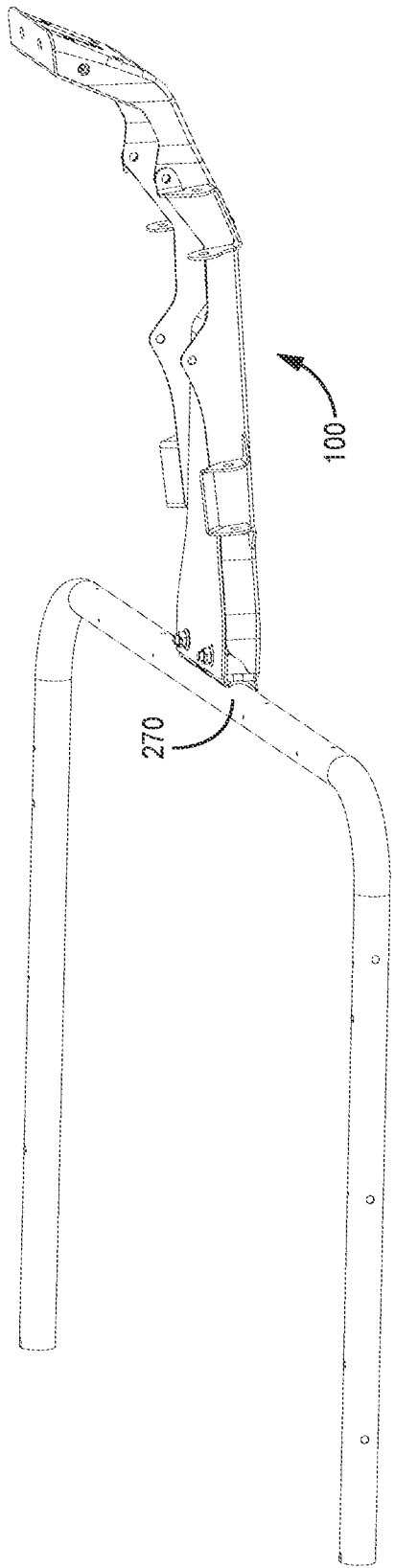
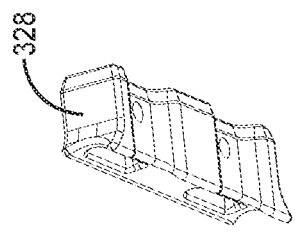
FIG. 96
FIG. 94
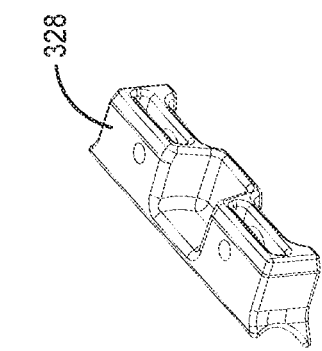
FIG. 95

OFF-ROAD RECREATIONAL VEHICLE

CROSS REFERENCE TO RELATED APPLICATIONS

This application is a continuation of U.S. application Ser. No. 16/717,256, which is a continuation of U.S. application Ser. No. 15/811,011, filed Nov. 13, 2017, which is a continuation-in-part of U.S. application Ser. No. 15/244,793, filed Aug. 23, 2016, which claims the benefit of and priority to U.S. Provisional Application No. 62/208,805, filed Aug. 23, 2015, and which application is incorporated herein by reference. A claim of priority is made.

BACKGROUND

Off-road recreational vehicles, such as side-by-side recreational off-highway vehicles ("ROVs") or all-terrain vehicles ("ATVs"), are quite capable in a wide variety of riding environments and situations, whether for sport or utility purposes. The vehicles can be easy to enter and exit and easy to operate with controls and ergonomics somewhat similar to automobiles. However, unlike most automobiles, off-road recreational vehicles can be driven on harsh off-road terrain.

SUMMARY

Embodiments relate to an off-road vehicle comprising a frame, including at least one cargo box support member, a suspension movably coupled to the frame, a passenger compartment, an engine, a transmission operatively coupled to the engine, and a cargo box. The cargo box includes a floor and a plurality of upwardly extending sidewalls, wherein at least a portion of the cargo box floor extends over the at least one cargo box support member and wherein the cargo box is removably coupled to the at least one cargo box support members and is removable from the off-road vehicle via the removal of fewer than eight fasteners.

Embodiments also relate to an off-road vehicle comprising a frame, including at least one cargo box support member, a suspension movably coupled to the frame, a passenger compartment, an engine having an engine block, a transmission operatively coupled to the engine, and an engine cradle. The engine cradle includes a first portion extending forwardly of the engine block and a second portion extending rearwardly of the engine block, wherein at least a portion of the engine cradle extends under the engine block.

BRIEF DESCRIPTION OF DRAWINGS

This written disclosure describes illustrative embodiments that are non-limiting and non-exhaustive. Reference is made to illustrative embodiments that are depicted in the figures, in which:

FIGS. 94-100 illustrate perspective views a removable subframe and associated components, according to some embodiments.

DETAILED DESCRIPTION

Figure 1:
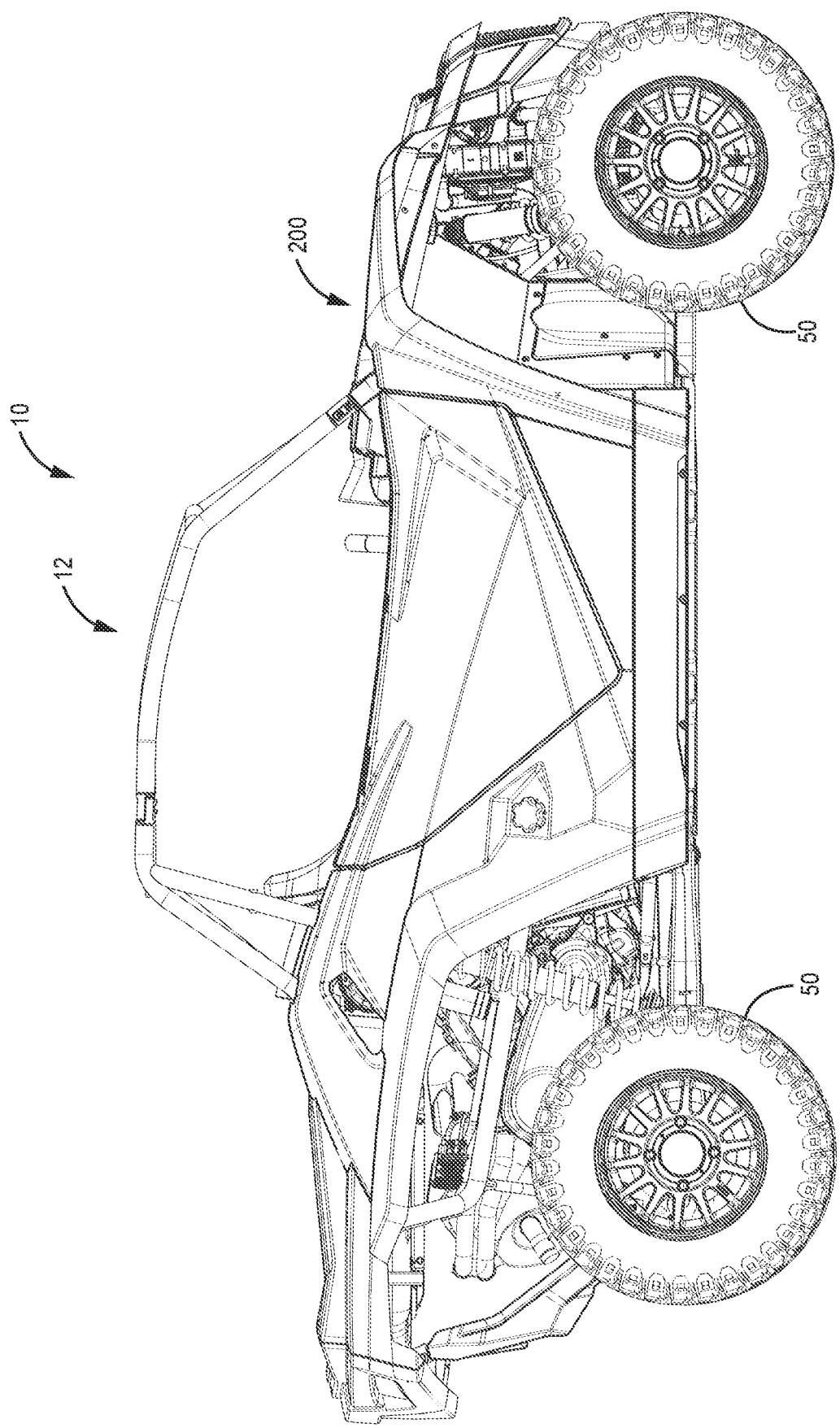
FIGS. 1-41 illustrate perspective views of an off-road recreational vehicle, according to some embodiments.
Figure 68:
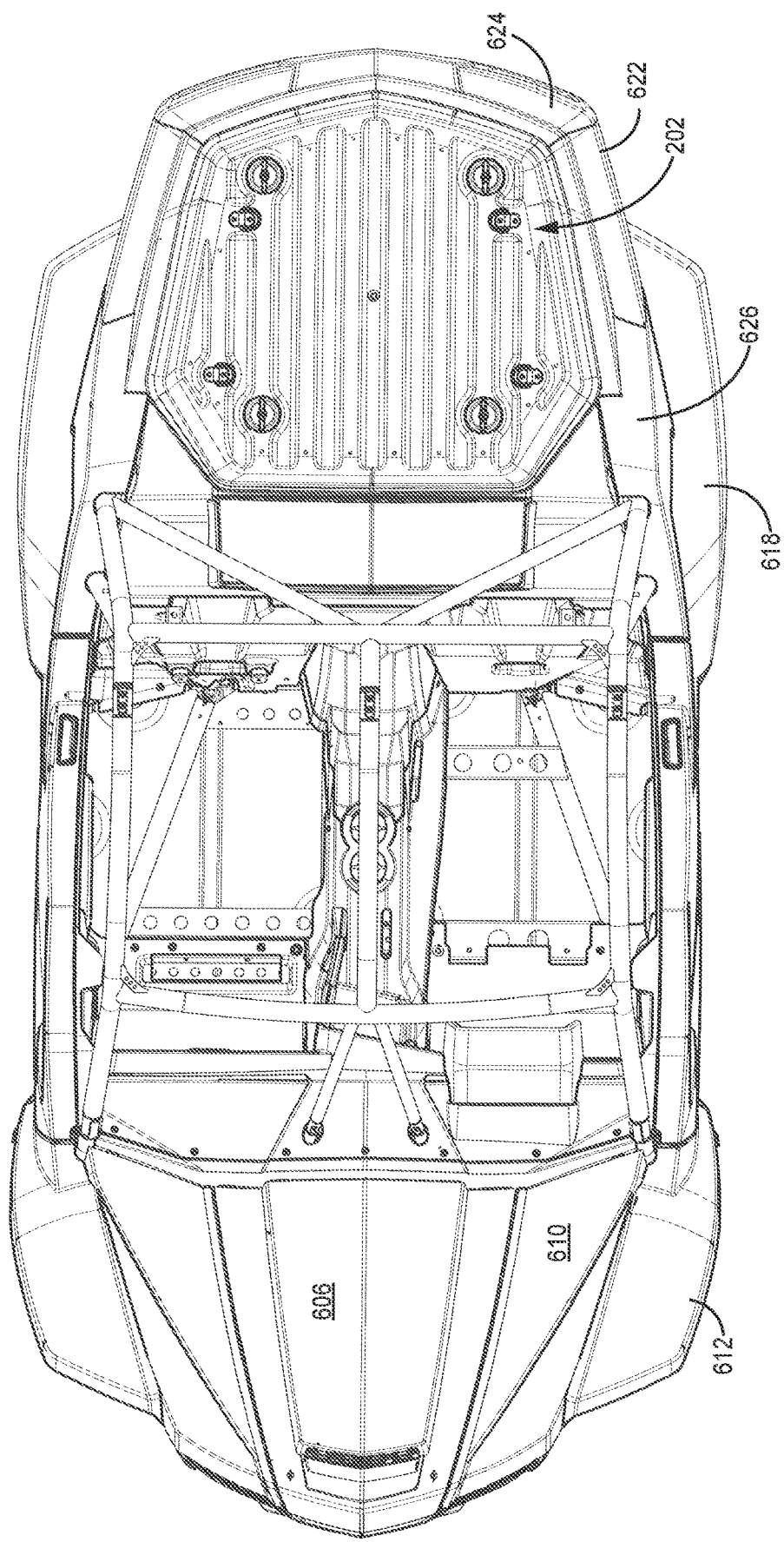

As shown in FIG. 1 an embodiment of an off-road vehicle 10 includes a plurality of ground engaging members 50, a front suspension assembly 72 (FIG. 3), a rear suspension assembly 38 (FIG. 3), a frame 12, and one or more body panels 200. In some embodiments, the off-road vehicle 10 further comprises a cargo box 202 (FIG. 68).

In some embodiments, the frame 12 includes structural members 204 (FIG. 2) which are coupled together (e.g., welded, bolted, glued). Further, the structural members 204 can be tubular steel or aluminum, stamped sheet metal (e.g., steel, aluminum), hydroformed, cast, forged, or formed in any other suitable manner. The off-road vehicle 10 can be 2-wheel or 4-wheel drive. Further, it can have any suitable style of drive system. In some embodiments, the off-road vehicle 10 is 4-wheel drive and includes a differential one or both the front end and rear end of the off-road vehicle 10. The differentials can include optional locking differentials or they can be open differentials, which can be manually selectable by an operator or engaged automatically in response to terrain conditions (e.g., wheel slip). In some embodiments, the off-road vehicle has a limited slip differential (e.g., clutch pack, Quaife, Torsen) or any other suitable configuration (e.g., spool).

Figure 2:
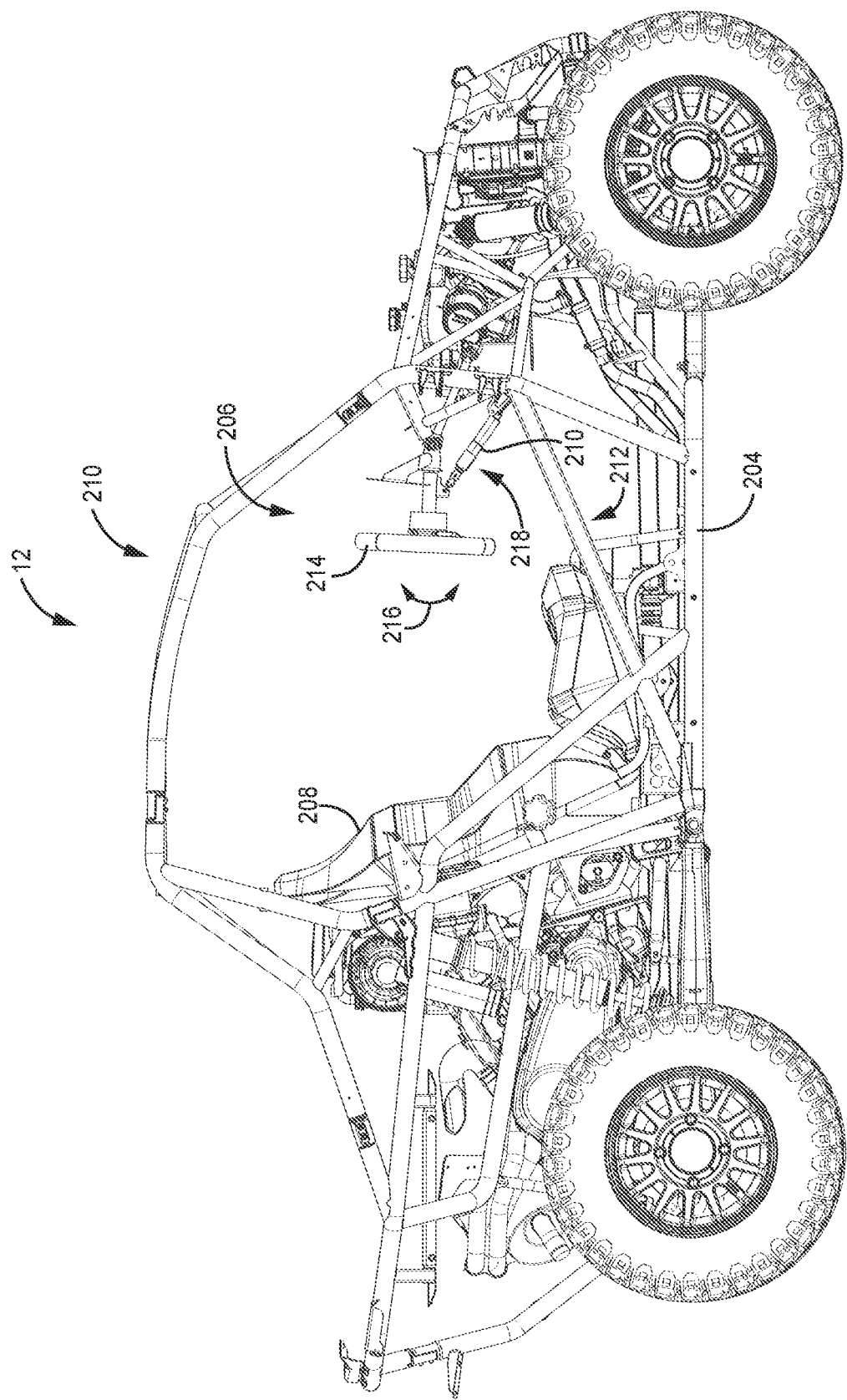

With further regard to FIG. 2, in some embodiments, the off-road vehicle 10 includes a seating area 206. The seating area 206 includes one or more seats 208. Further one or more of the seats 208 can be arranged in any configuration, such as a side-by-side configuration. Further still, the seats 208 can include bench seats, bucket seats, or a combination of both bench and bucket seating. In some embodiments, one or more of the seats 208, or portions thereof, are adjustable.

In some embodiments, the frame 12 includes a ROPS (roll-over protection structure) 210. In some embodiments, the ROPS 210 is attached to the main frame 212. As used in herein, the term "frame" 12 includes both the ROPS 210 and main frame 212.

As shown in FIG. 2, in some embodiments, the off-road vehicle 10 includes a steering wheel 214 which is coupled, for example via a steering linkage, to at least two of the ground engaging members 50, for example front ground engaging members. The steering wheel 84 is coupled to the front ground engaging members (e.g., tires) in any suitable way, for example by mechanical steering linkage, electric power steering (EPS), hydraulically assisted power steering, electric power steering without mechanical linkage (e.g., drive-by-wire), electric assisted power steering ((EPAS), e.g., including pull-drift compensation, active nibble control, etc.) or in any other suitable way. Further, in some embodiments, the steering can include variable ratio steering and it can be programmable such that the user can set the steering ratio (and rate-of-change of steering ration, if it is variable) to illicit a steering response in accordance with the user's or manufacturer's desires (e.g., exhibiting understeer characteristics). As further shown in FIG. 2, in some embodiments, the steering wheel 214 tilts, shown via arrow 216, and a tilt assembly 218 includes a shock 220 to adjust the tilt configuration of the steering wheel 214.

Figure 3:
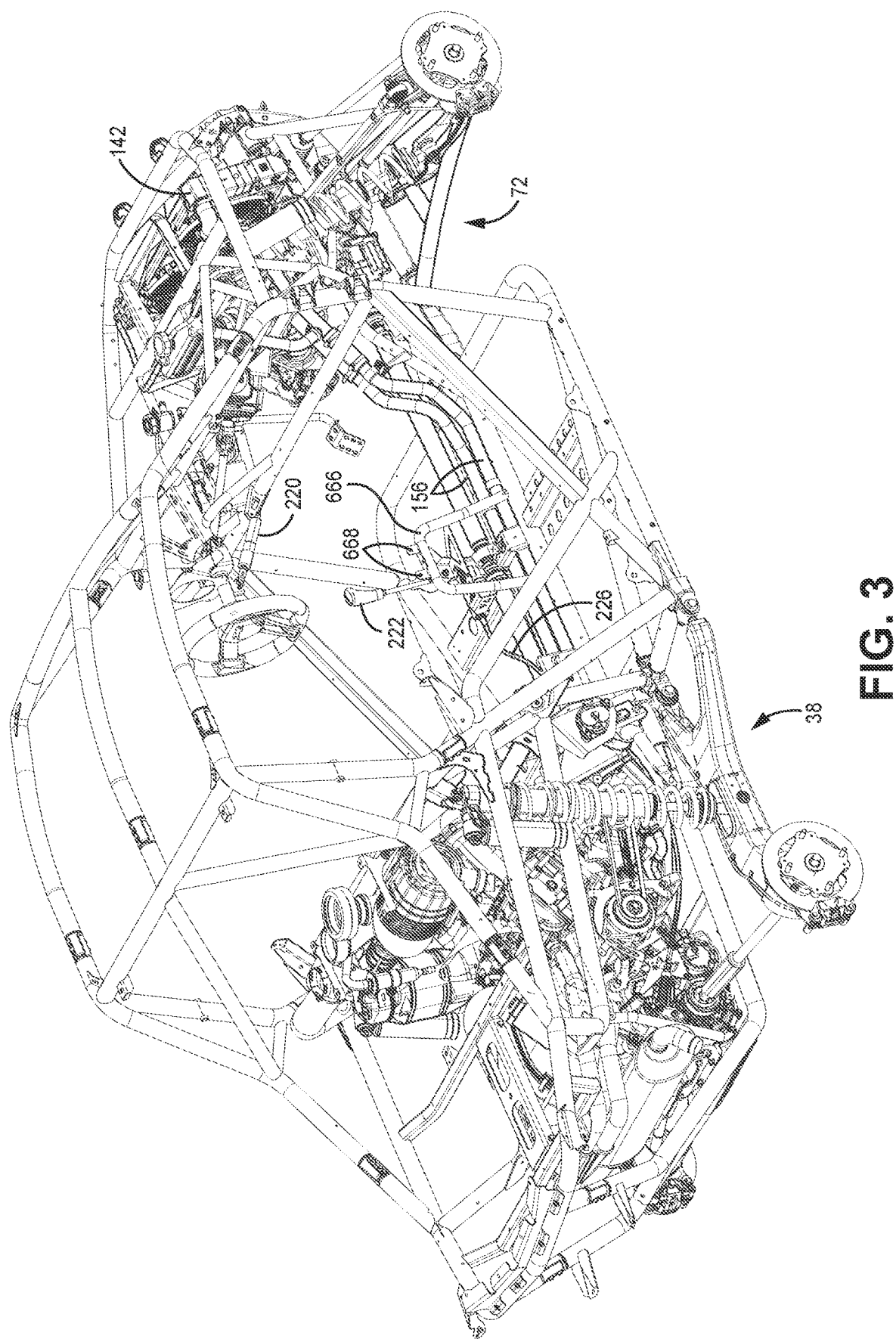
Figure 4:
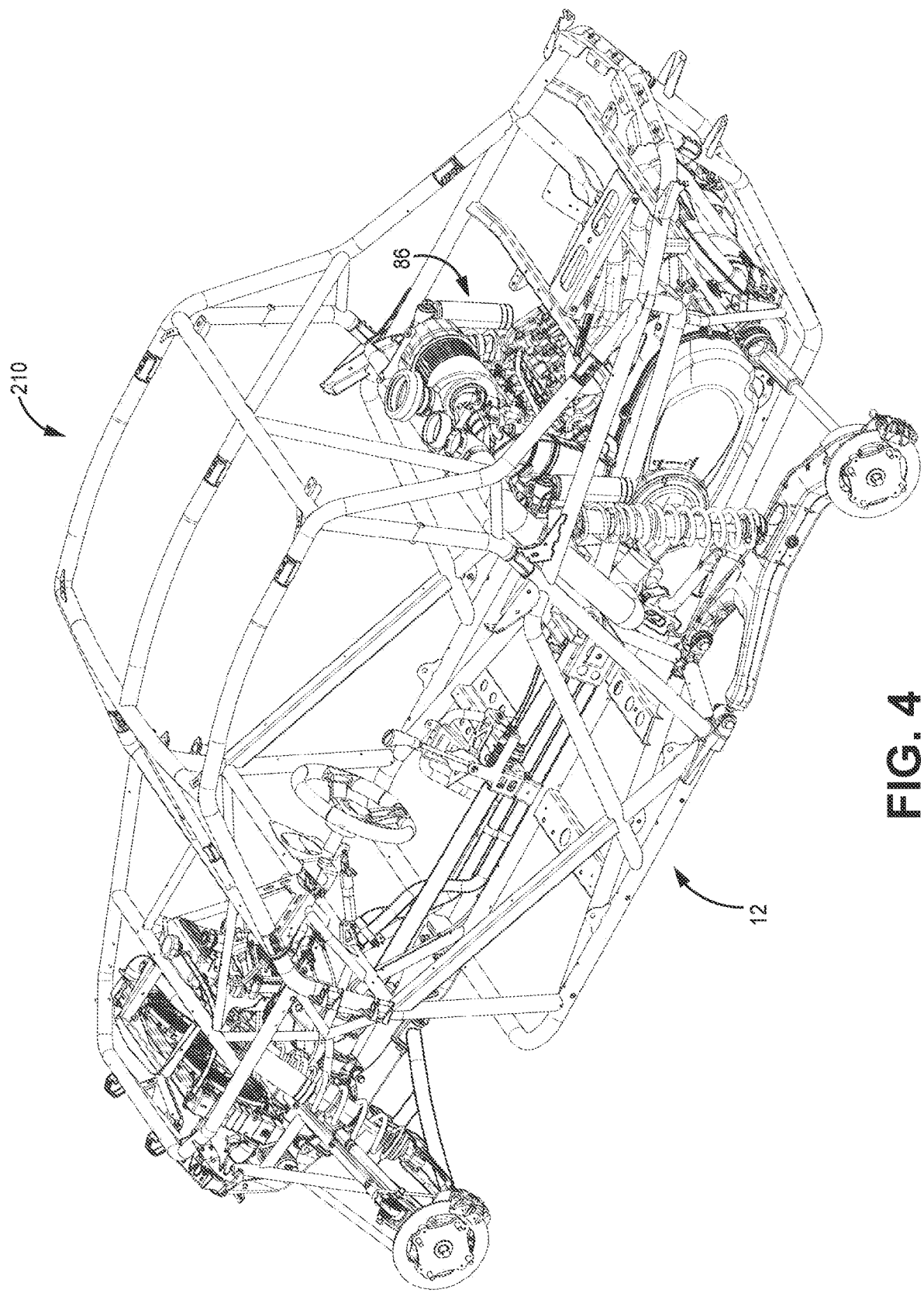
Figure 93:
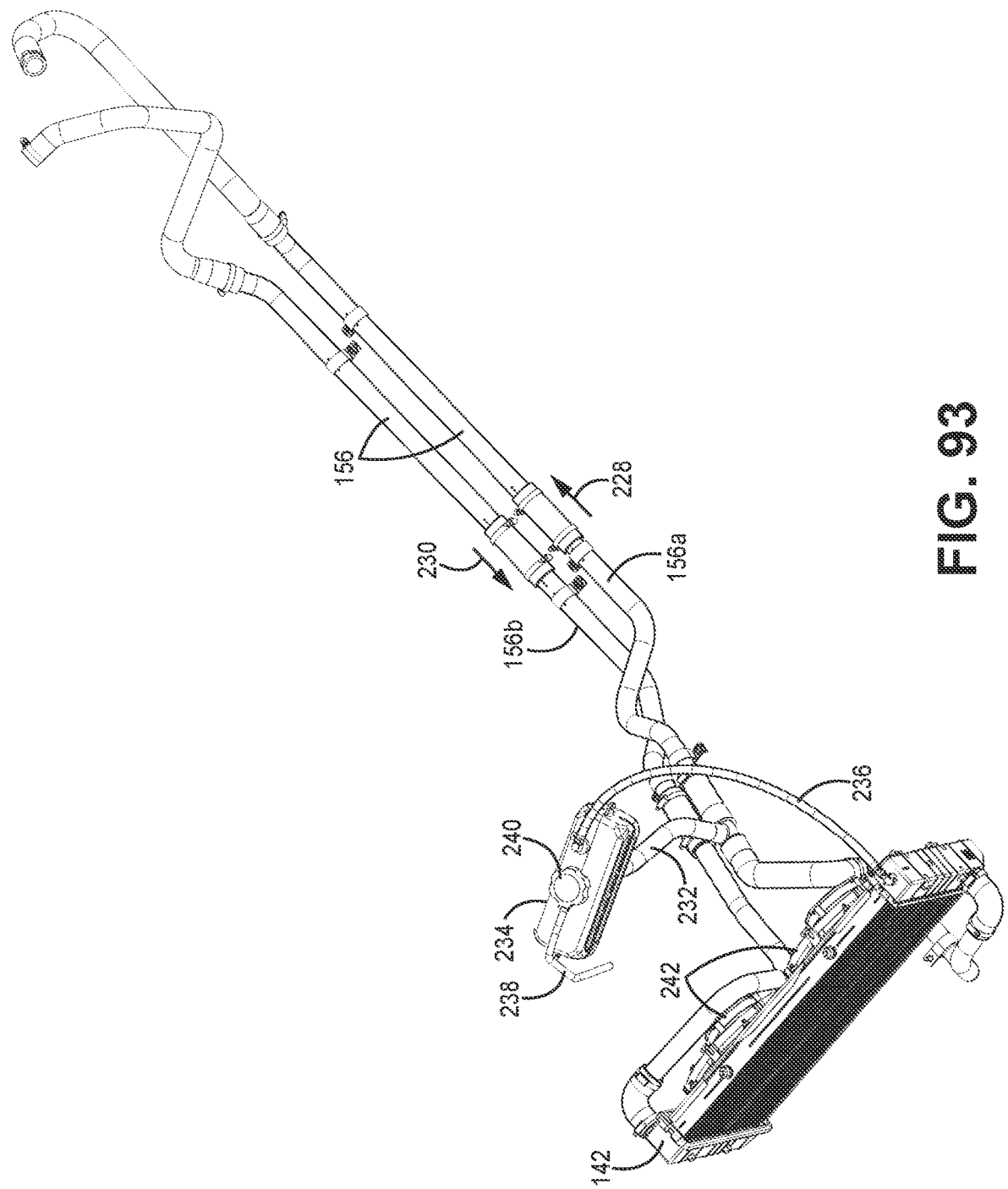
FIG. 93 illustrates a perspective view of a cooling system of an off-road recreational vehicle, according to some embodiments.

With regard to FIG. 3, the off-road vehicle 10 includes a gear shift selector 222. The gear shift selector 222 is coupled to the transmission 224 (FIG. 42), for example via a push-pull cable 226. The off-road vehicle 10 further includes a radiator 142 and coolant lines (or coolant hoses) 156, also shown in FIG. 93. As illustrated in FIG. 93, in some embodiments, the coolant lines 156 include a first coolant line 156a and a second coolant line 156b. In some embodiments, coolant flows through the first coolant line 156a from the radiator 142 to the prime mover (e.g., engine 86, FIG. 4), as shown via directional arrow 228 (FIG. 93). In some embodiments, coolant flows through the second coolant line 156b from the prime mover (e.g., engine 86, FIG. 4) to the radiator 142, as shown via directional arrow 230 (FIG. 93).

As further shown in FIG. 93, in some embodiments, a shunt line 232 extends to a coolant tank 234 which, in some embodiments, is an overflow tank. In some embodiments, a radiator overflow line 236 extends between the radiator 142 and the coolant tank 234. Further, in some embodiments, a coolant tank overflow line 238. In some embodiments, the coolant tank overflow line 238 is fluidly connected to the coolant tank cap 240. In some embodiments, the shunt line 232 extends from the first coolant line 156a. In some embodiments, however, the shunt line 232 extends from the second coolant line 156b. In some embodiments, the radiator 142 has no radiator cap and the radiator 142 is filled with coolant via the coolant tank cap 240. In some embodiments, for example as shown in FIG. 93, a coolant line (e.g., first coolant line 156a) extends from a front of the radiator 142. As shown in FIG. 93, in some embodiments, one of the coolant lines (e.g., second coolant line 156b) extends from the back of the radiator 142. Other configurations can also be utilized. In some embodiments, one or more fans 242 (e.g., electric fans) are used to circulate air across the radiator fins to help cool the coolant in the radiator. In some embodiments, one or more of the fans 242 are reversible fans and can "pull" or "push" air across the radiator 142 as desired.

Figure 40:
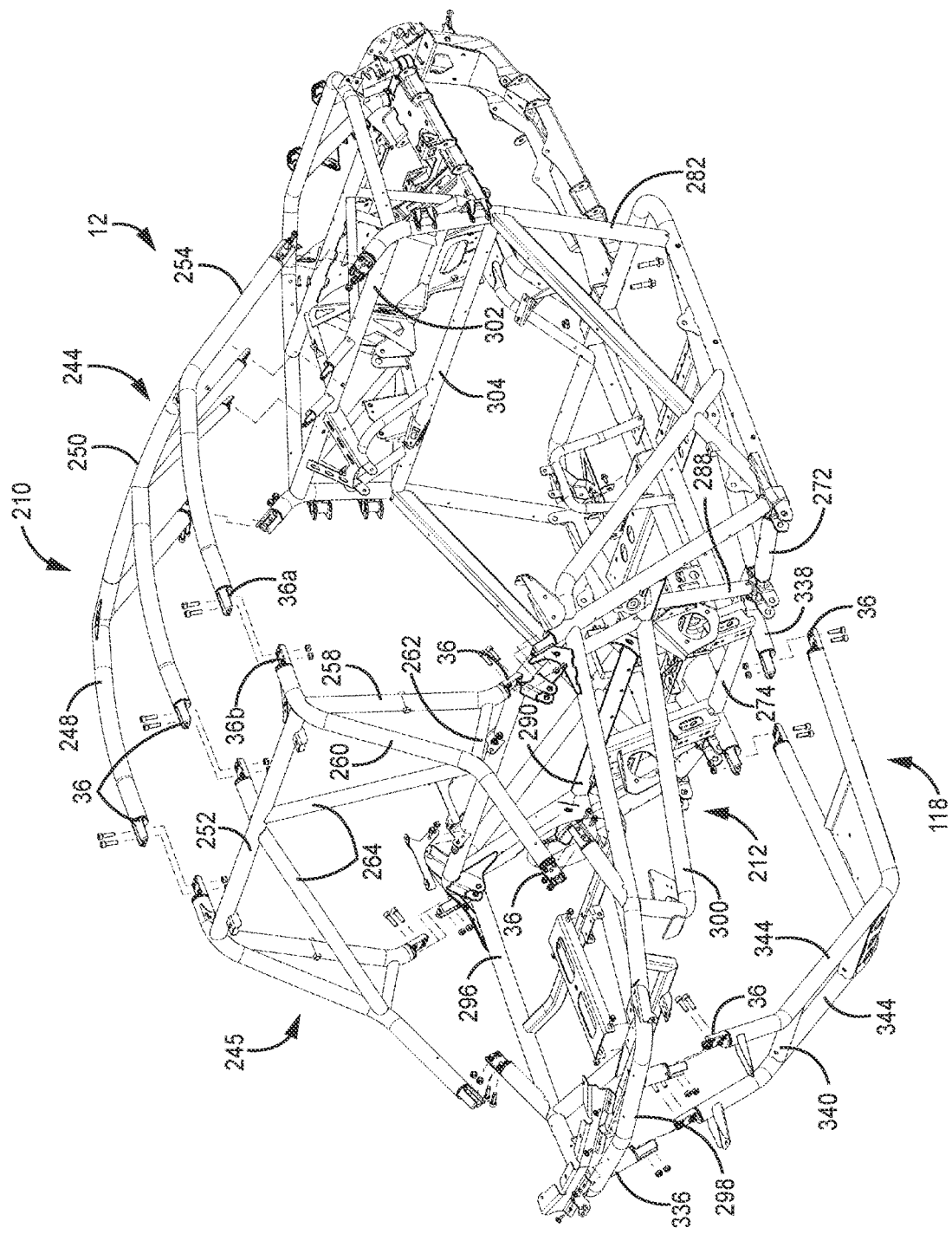

With regard to FIGS. 4 and 31-41, in some embodiments, the ROPS 210 comprises two detachable portions: a first detachable ROPS portion 244 (FIGS. 40 and 41) and a second detachable ROPS portion 246. In some embodiments, the second detachable ROPS portion 246 is rearward of the first detachable ROPS portion 244. In some embodiments, the first and second detachable ROPS portions 244, 246 are coupled to one another via one or more disconnects 36. In some embodiments, the disconnects 36 comprise castings that mate with opposing disconnects. As shown in FIG. 40, for example, disconnect 36a is configured to mate with disconnect 36b.

Figure 35:
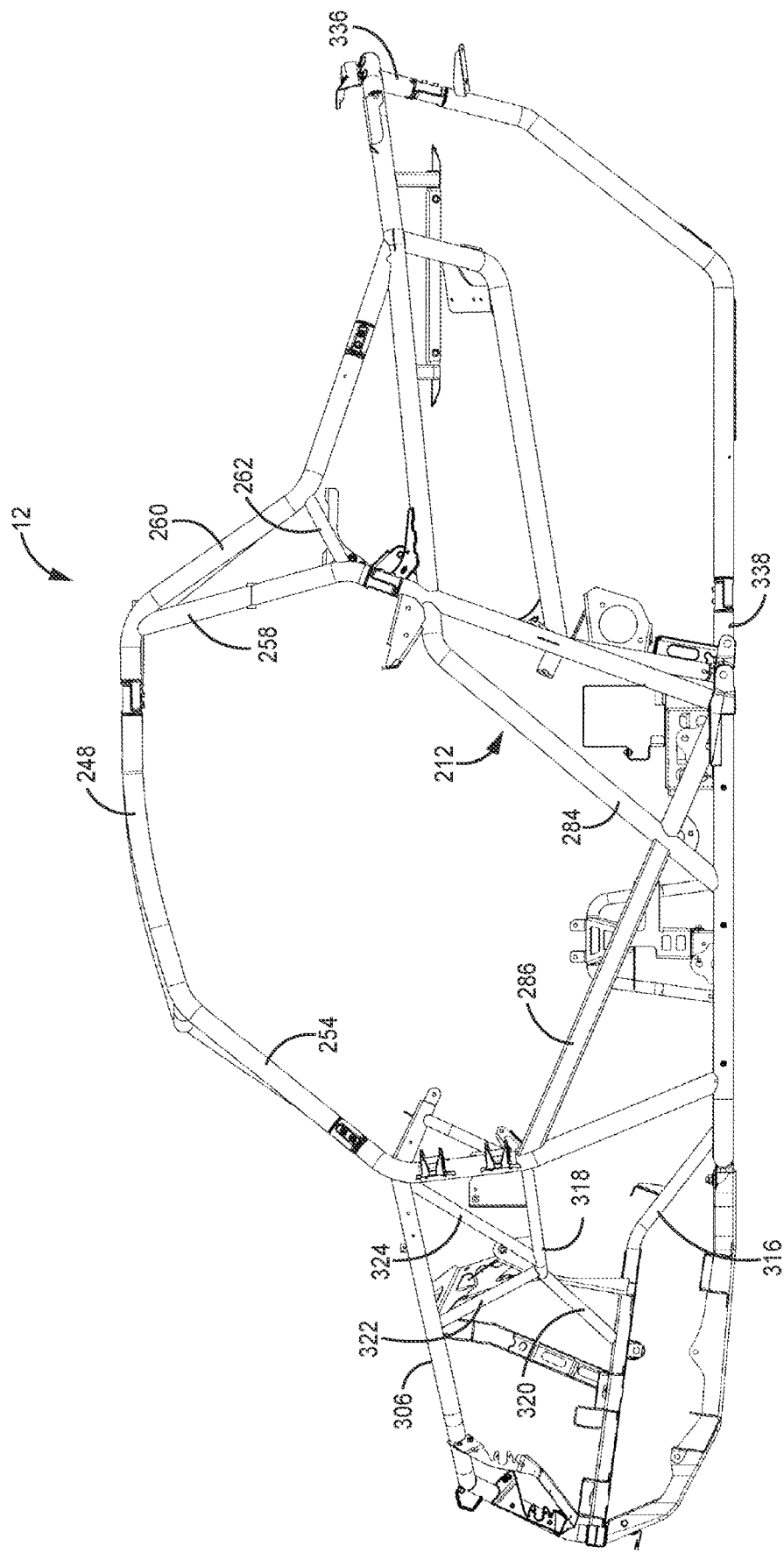
Figure 36:
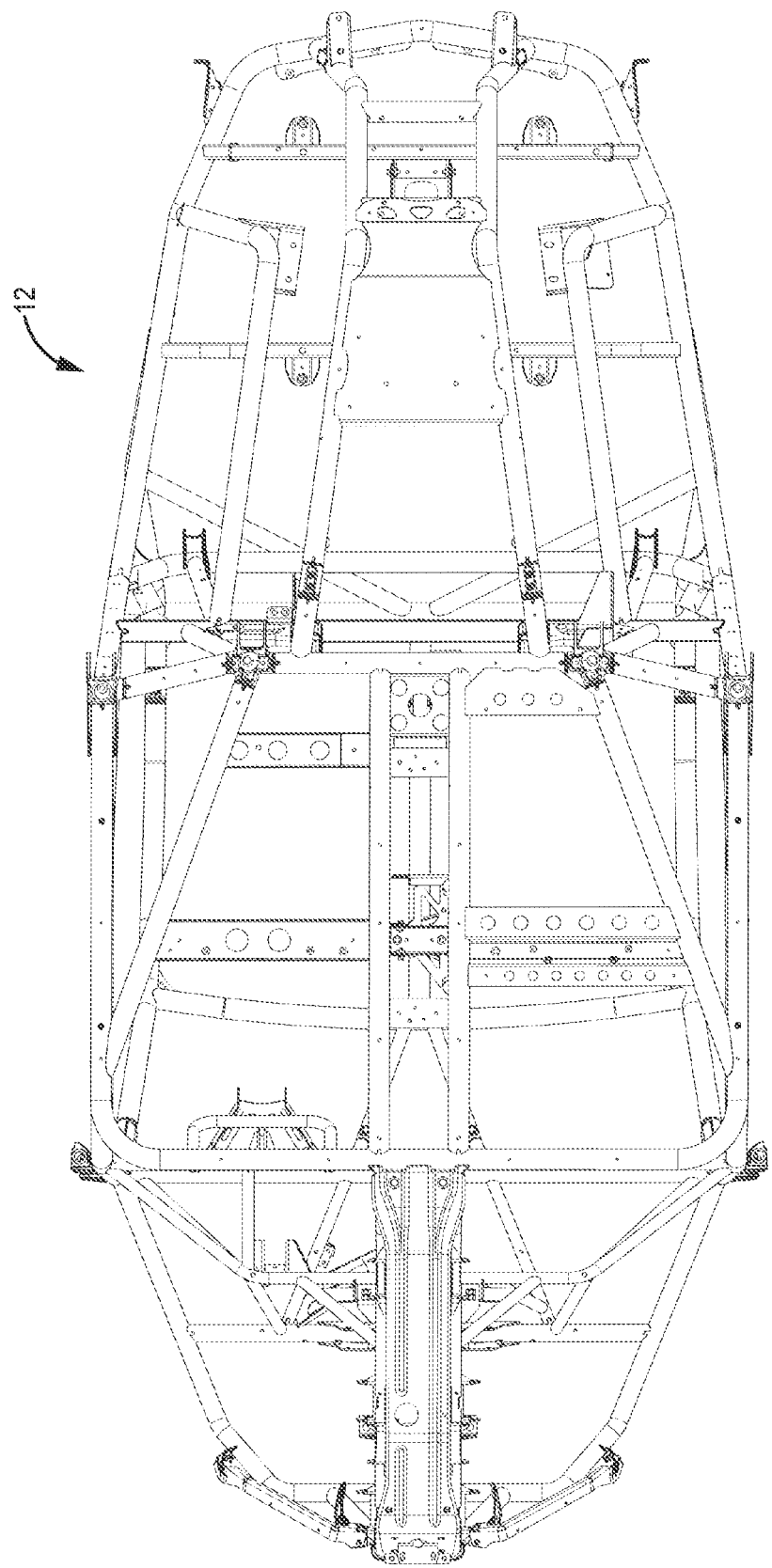
Figure 41:
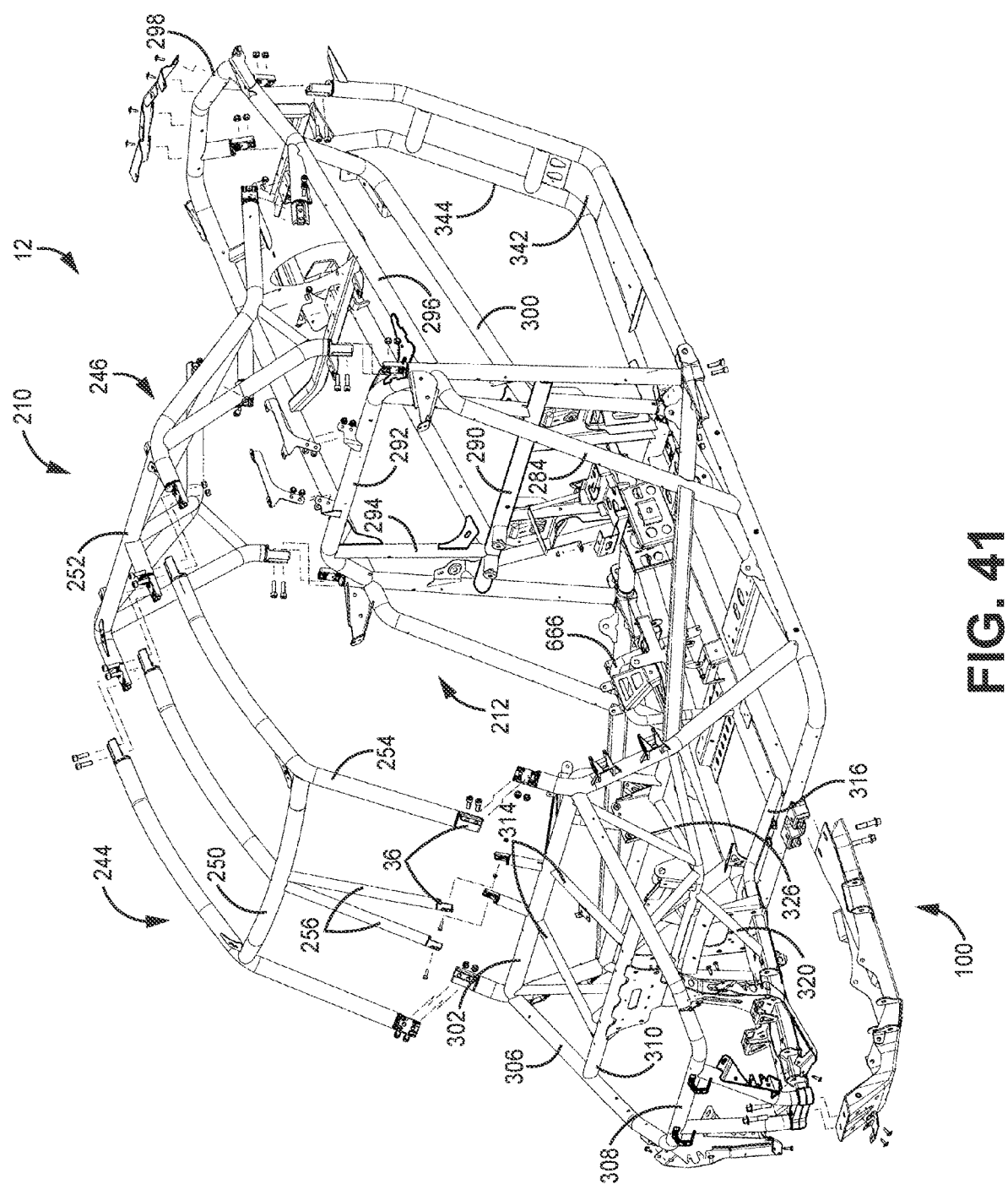

In some embodiments, the ROPS 210 includes one or more lengthwise ROPS members 248. In some embodiments, the ROPS 210 includes three lengthwise ROPS members 248 which are generally parallel to one another. In some embodiments, one or more of the lengthwise ROPS members 248 are bowed outwardly as shown in FIG. 35. As shown in FIG. 41, in some embodiments, the ROPS 210 further includes a front transverse ROPS member 250 and a rear transverse ROPS member 252. In some embodiments, one or both of the front transverse ROPS member 250 and a rear transverse ROPS member 252 are bowed. As shown in FIGS. 35 and 41, in some embodiments, the front transverse ROPS member 250 is bowed forwardly such that the middle of the front transverse ROPS member 250 is forward of the left and right ends of the front transverse ROPS member 250.

In some embodiments, the ROPS 210 includes an A-pillar member 254. In some embodiments, the A-pillar member 254 is formed form the same piece of tubing as a lengthwise ROPS member 248. In some embodiments, the ROPS 210 includes front V-brace members 256. In some embodiments, the front V-brace members 256 are coupled to the front transverse ROPS member 250, for example via welding. In some embodiments, the front V-brace members 256 are further comprise disconnects and are removably coupled to mating disconnects. In some embodiments, the front V-brace members 256 have a smaller diameter than the diameter of the A-pillar member(s) 254.

In some embodiments, the ROPS 210 includes an intermediate pillar member 258 and a rear pillar member 260, as shown for example in FIGS. 35 and 40. In some embodiment, the intermediate pillar member 258 and rear pillar member 260 are coupled via a pillar bracing member 262. In some embodiments, one or both of the intermediate pillar member 258 and rear pillar member 260 include disconnects 36 such that the second detachable ROPS portion 246 can be removed from the main frame 212.

Figure 37:
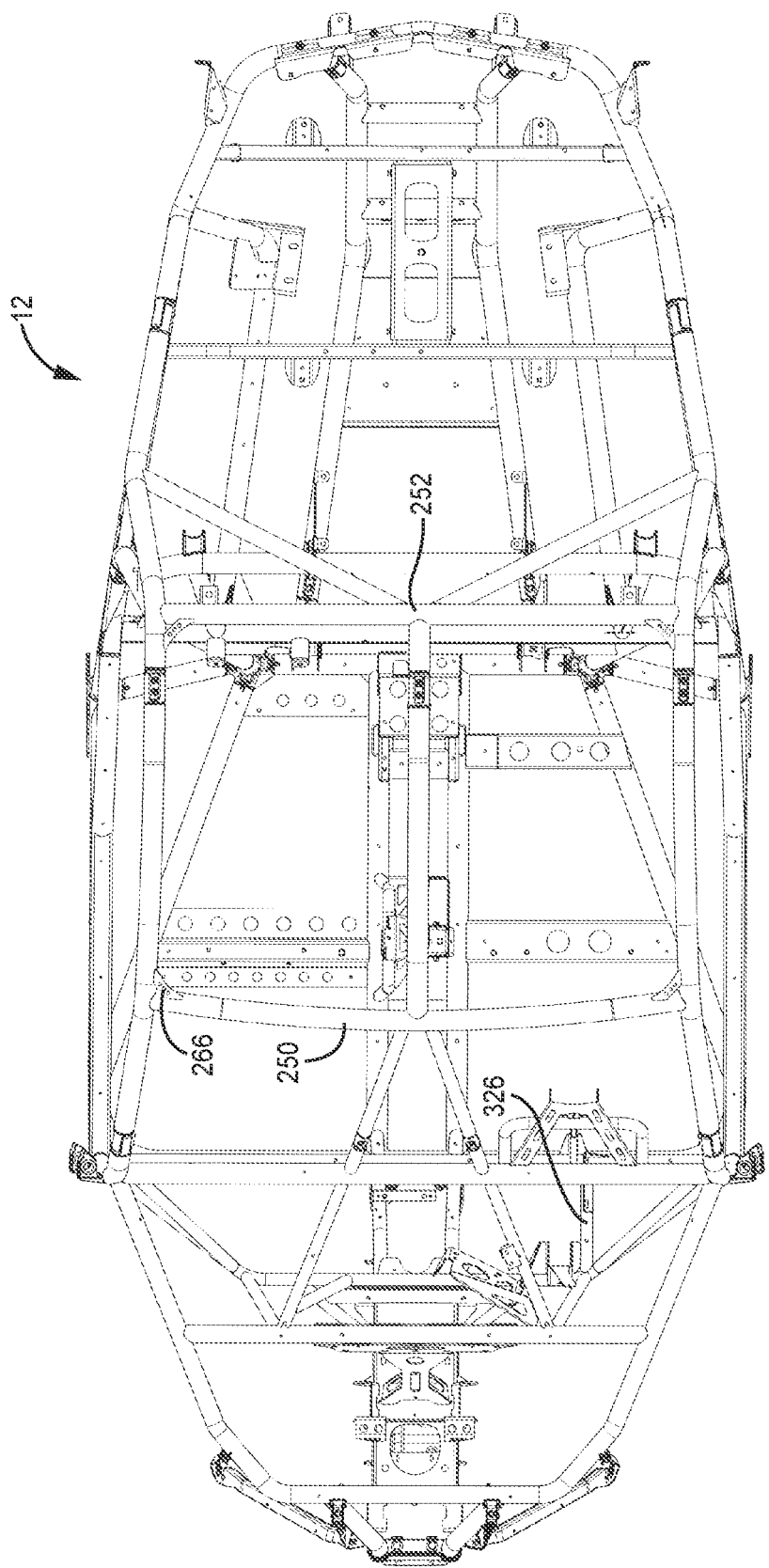
Figure 38:
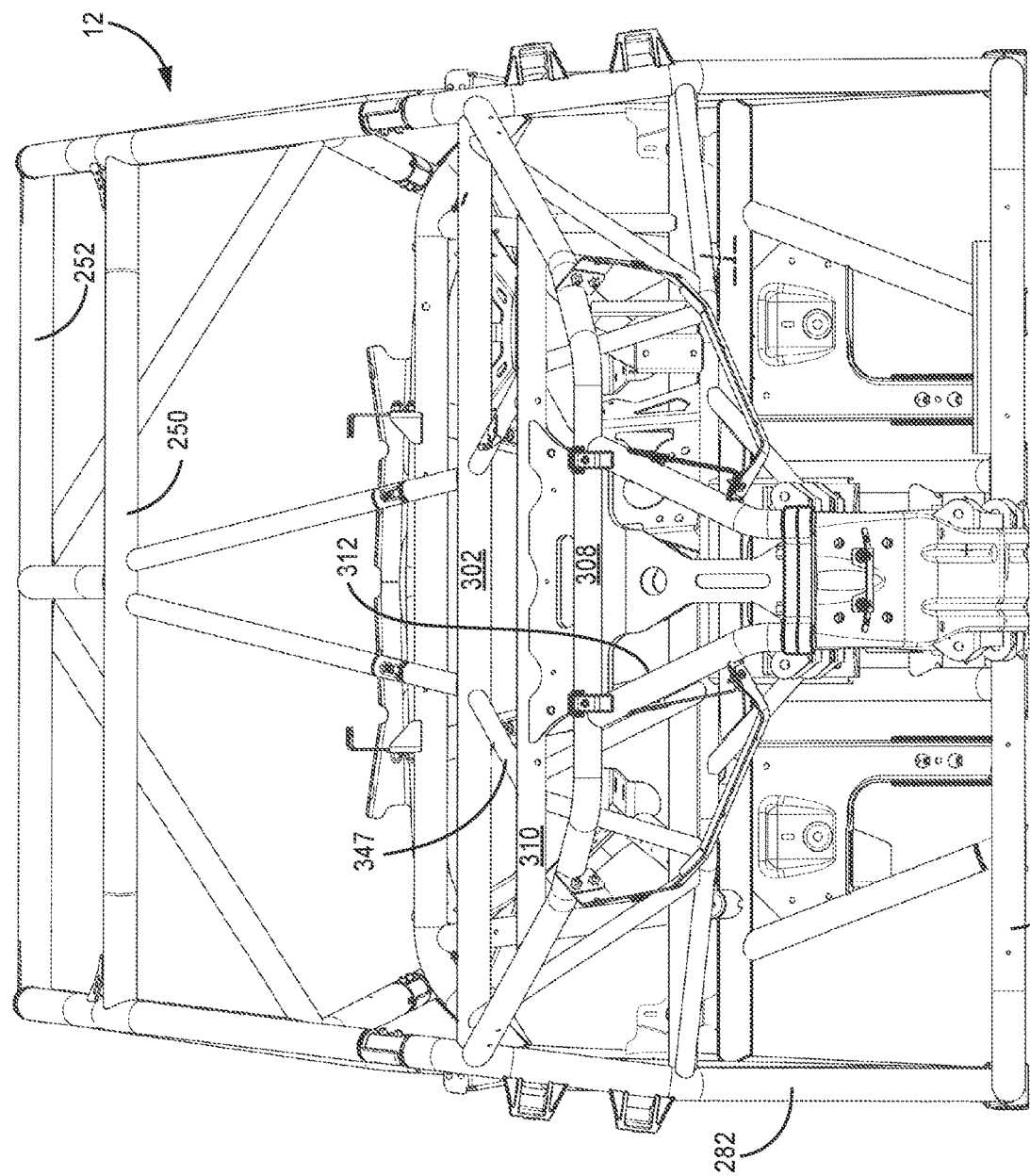
Figure 39:
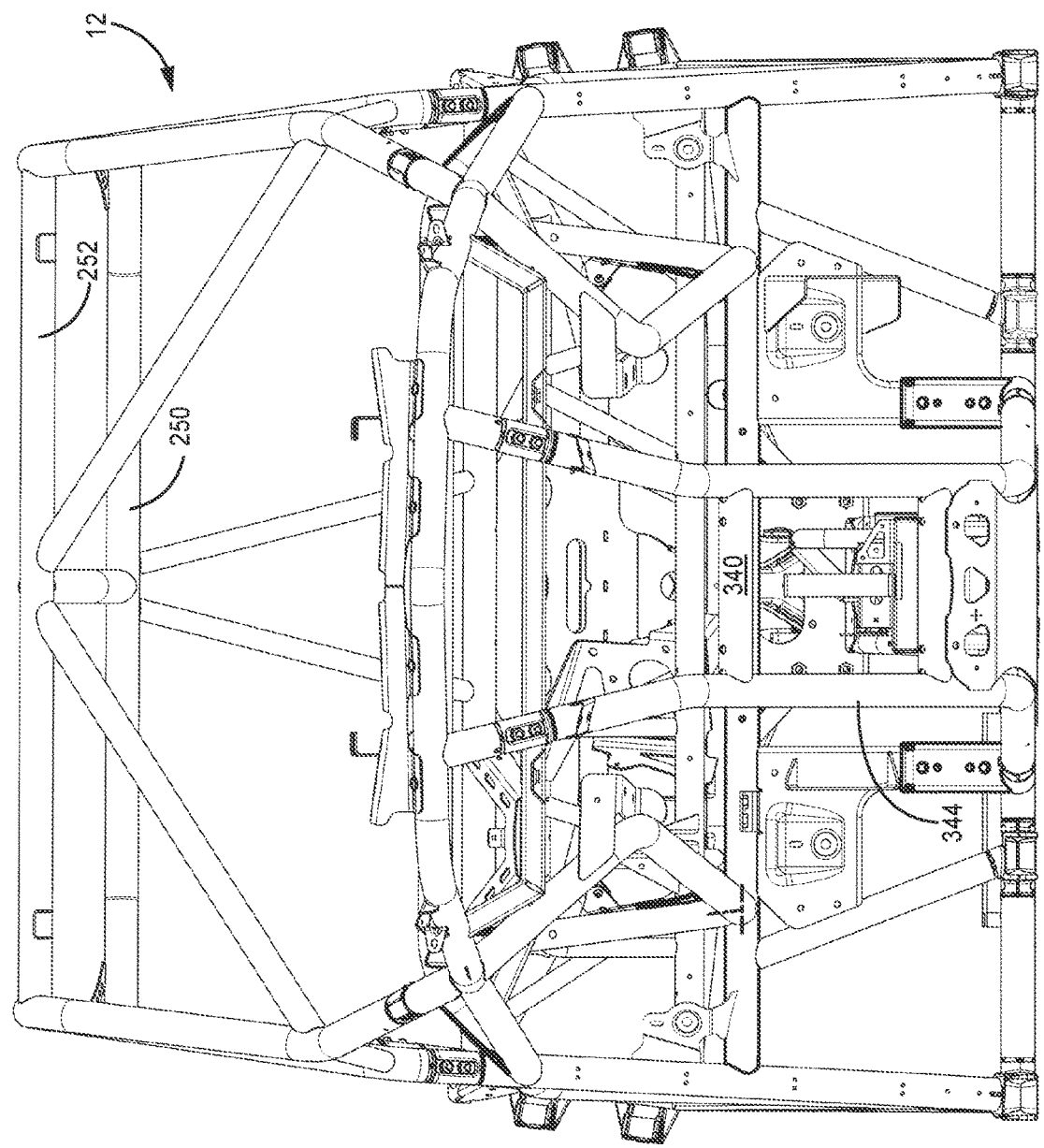

In some embodiments, the ROPS 210 includes rear V-brace members 264 (FIG. 40). In some embodiments, the rear V-brace members 264 are coupled (e.g., welded) to rear pillar members 260 and rear transverse ROPS member 250. In some embodiments, the ROPS 210 includes one or more gussets 266 (FIG. 37). In some embodiments, the gussets 266 are welded to adjacent ROPS members, as shown for example in FIG. 37.

Figure 32:
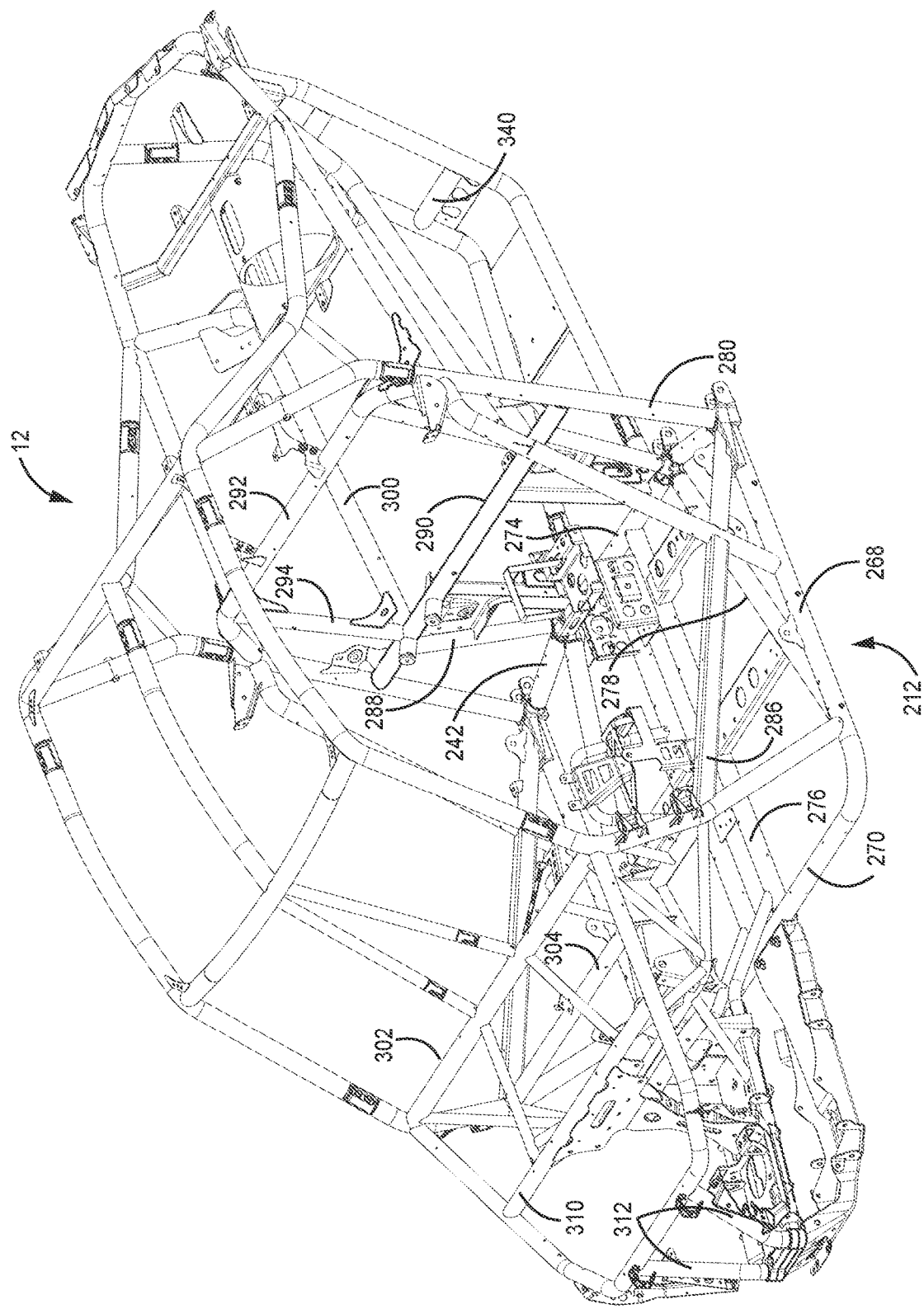
Figure 33:
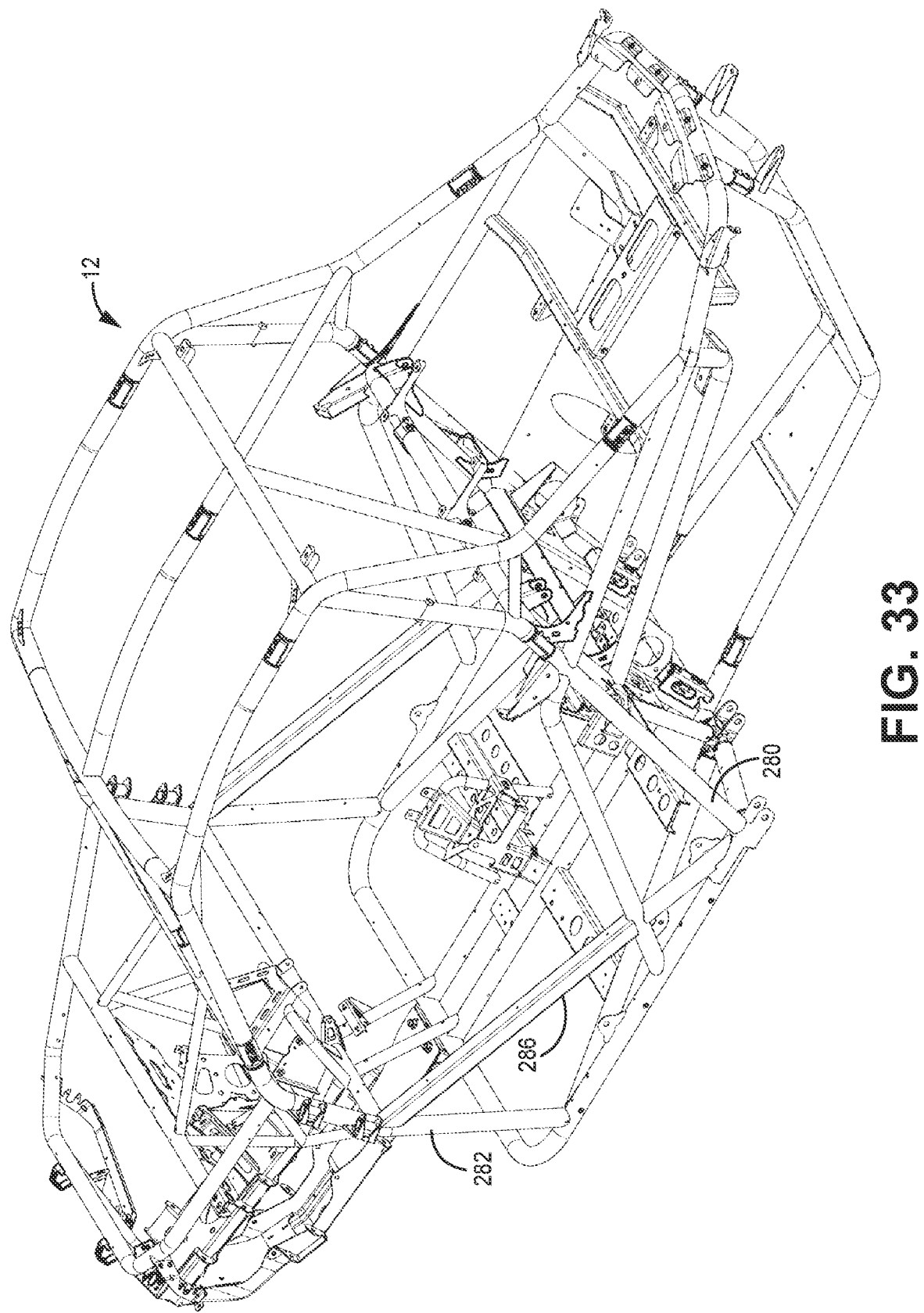
Figure 34:
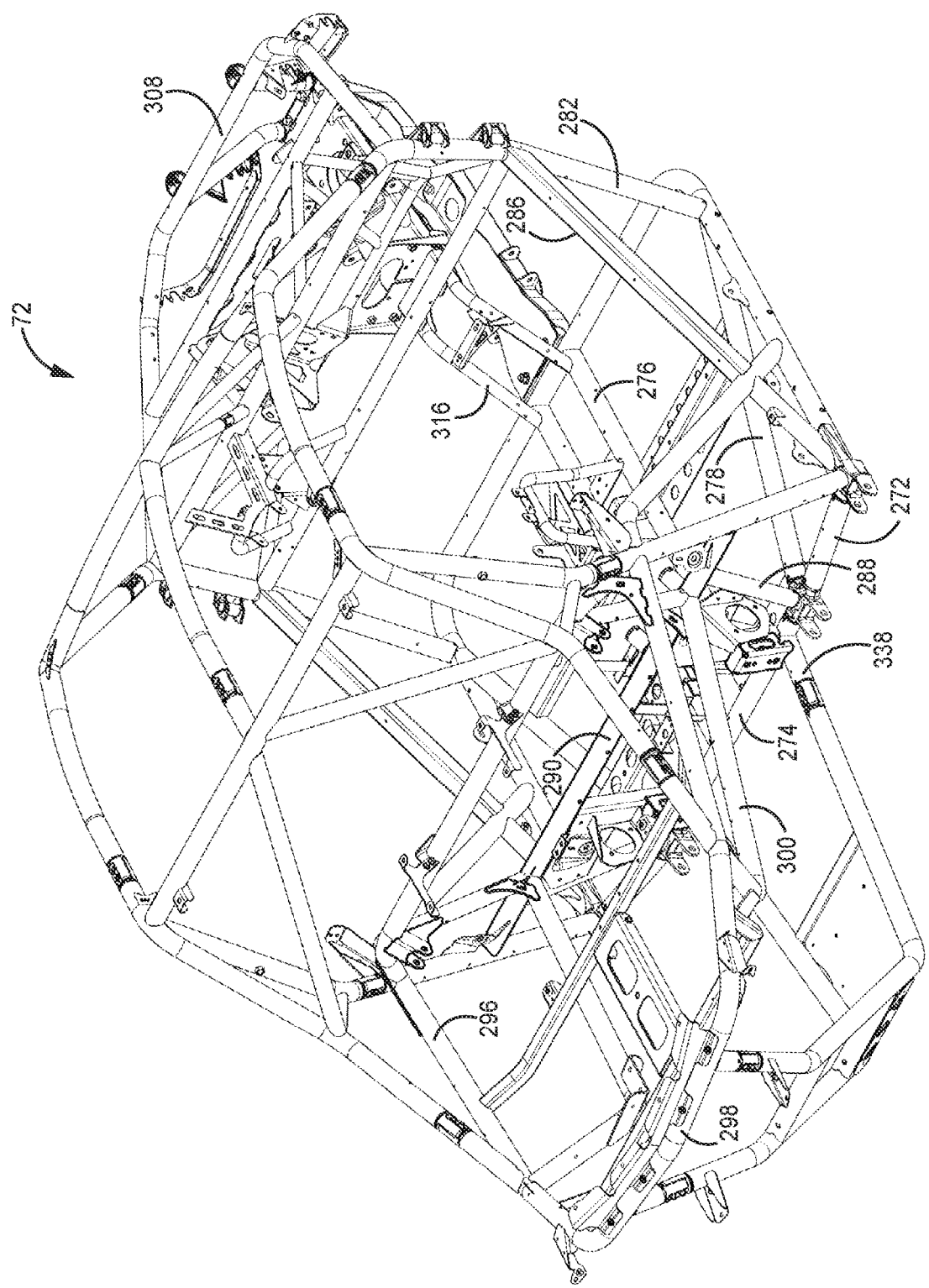

In some embodiments, for example as shown in FIG. 32, the main frame 212 includes outer lower frame member(s) 268, front lateral lower frame member(s) 270, rear outer lateral lower frame member(s) 272, rear inner lateral lower frame member 274 (FIG. 34), inner lower frame member(s) 276, joining lower frame member(s) 278, rear outer upstanding support member(s) 280, front outer upstanding support member(s) 282, intermediate outer upstanding support member(s) 284 (FIGS. 35 and 41), diagonal outer support member(s) 286, rear inner upstanding lower support member(s) 288, rear intermediate lateral frame member 290 (FIG. 41), rear upper lateral frame member 292 (FIG. 41), rear inner upstanding intermediate support member(s) 294 (FIG. 41), rear outer lengthwise frame member(s) 296, rear outer lateral frame member(s) 298, rear inner lengthwise frame member(s) 300, upper lateral dash support member 302 (FIG. 40), lower lateral dash support member 304 (FIG. 40), front upper lengthwise frame member(s) 306 (FIG. 35), front upper lateral frame member 308 (FIG. 34), front upper intermediate lateral frame member 310 (FIG. 41), front upstanding frame member(s) 312 (FIG. 32), upper lengthwise dash support member(s) 314 (FIG. 41), front lengthwise bridging member(s) 316 (FIG. 35), front intermediate support member(s) 318 (FIG. 35), front intermediate bridging member(s) 320 (FIG. 35), front upper bridging member (s) 322, front intermediate dash support member 324 (FIG. 35), steering support member 326 (FIG. 41).

Figure 5:
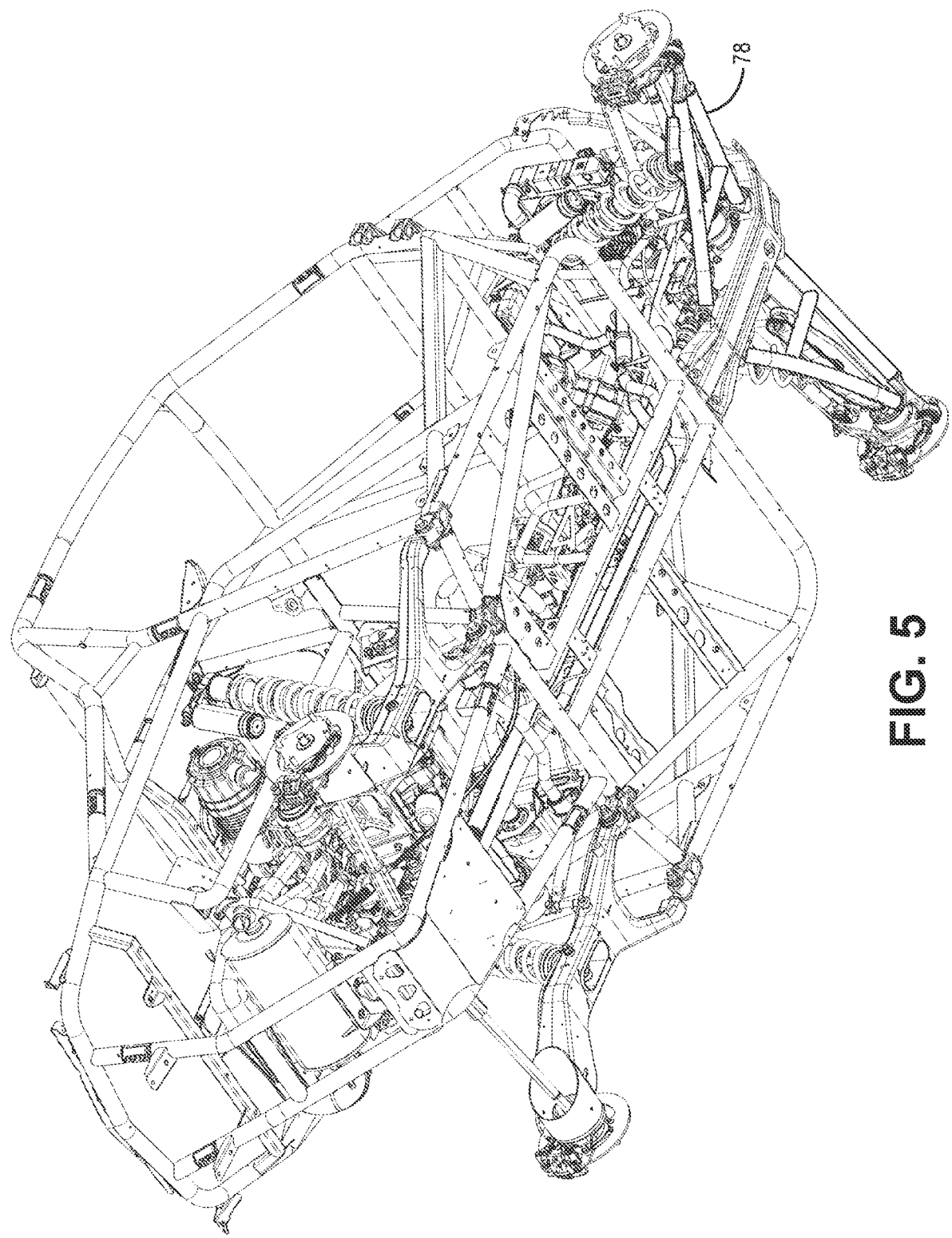
Figure 6:
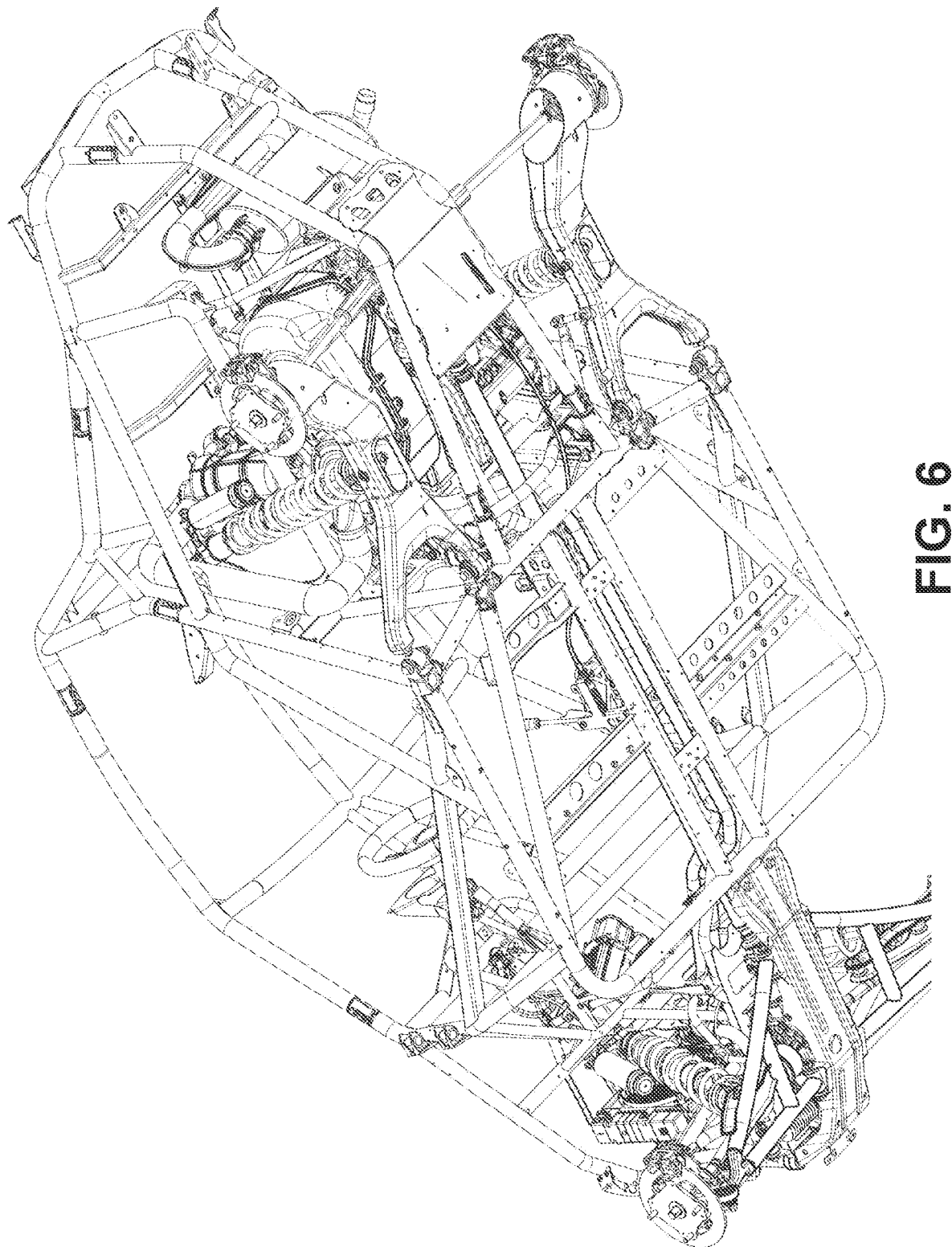
Figure 7:
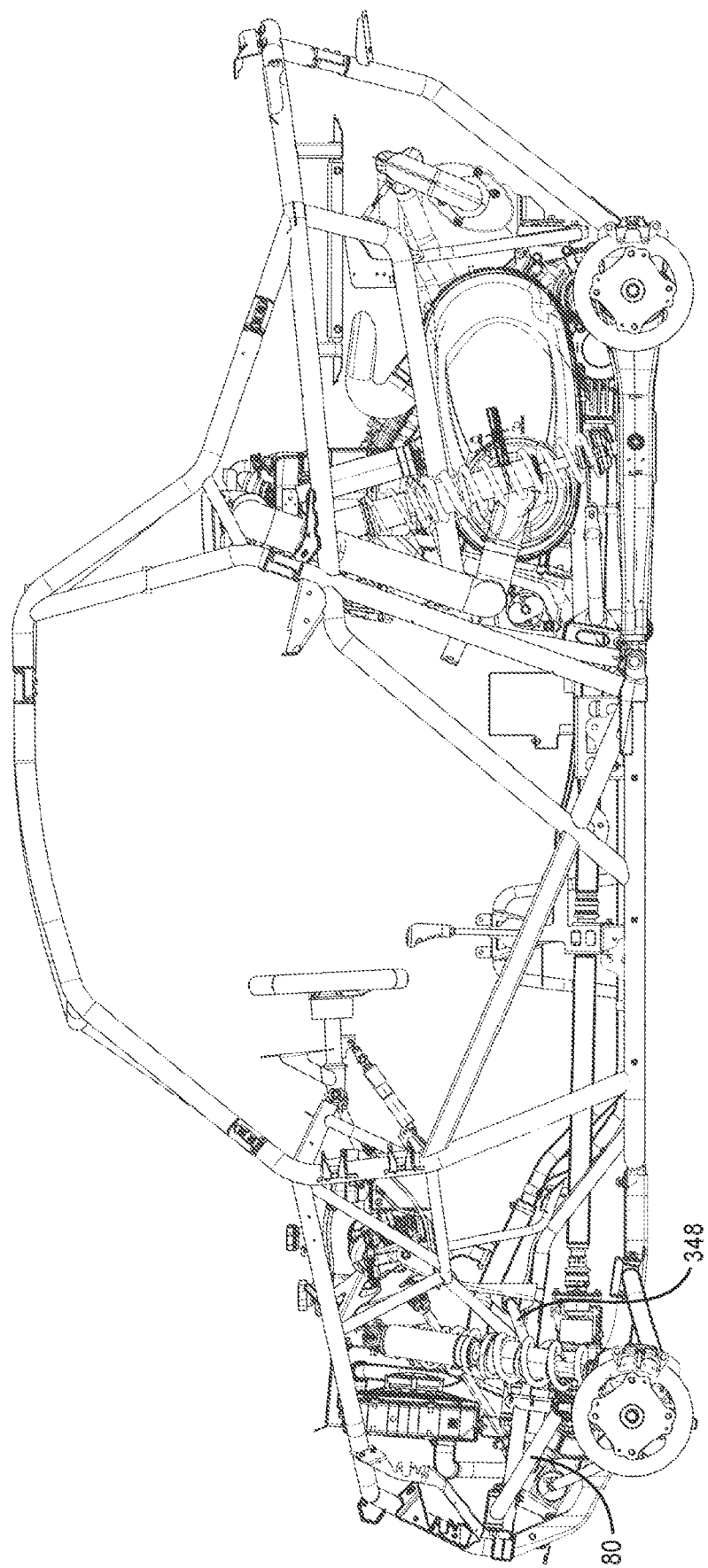
Figure 8:
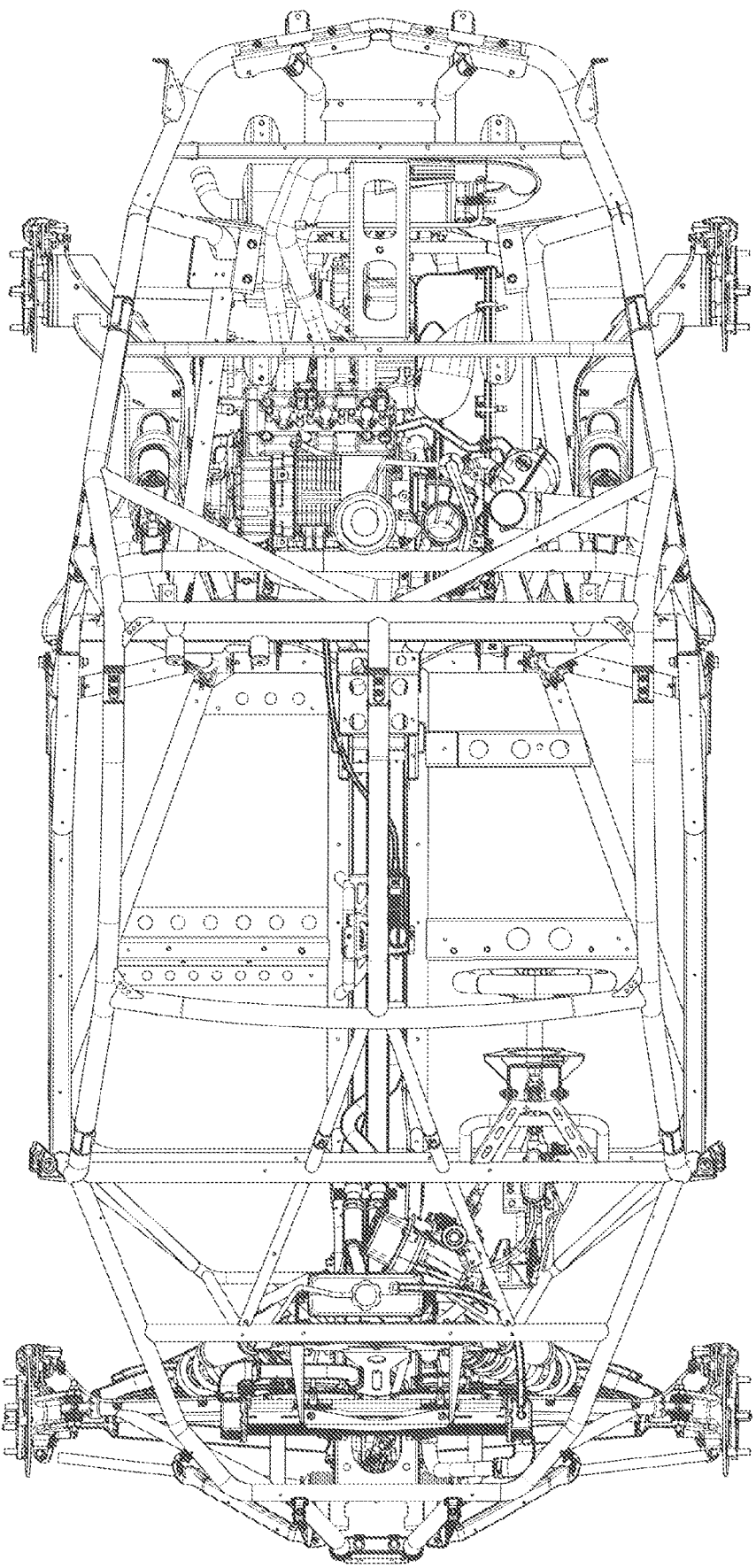
Figure 9:
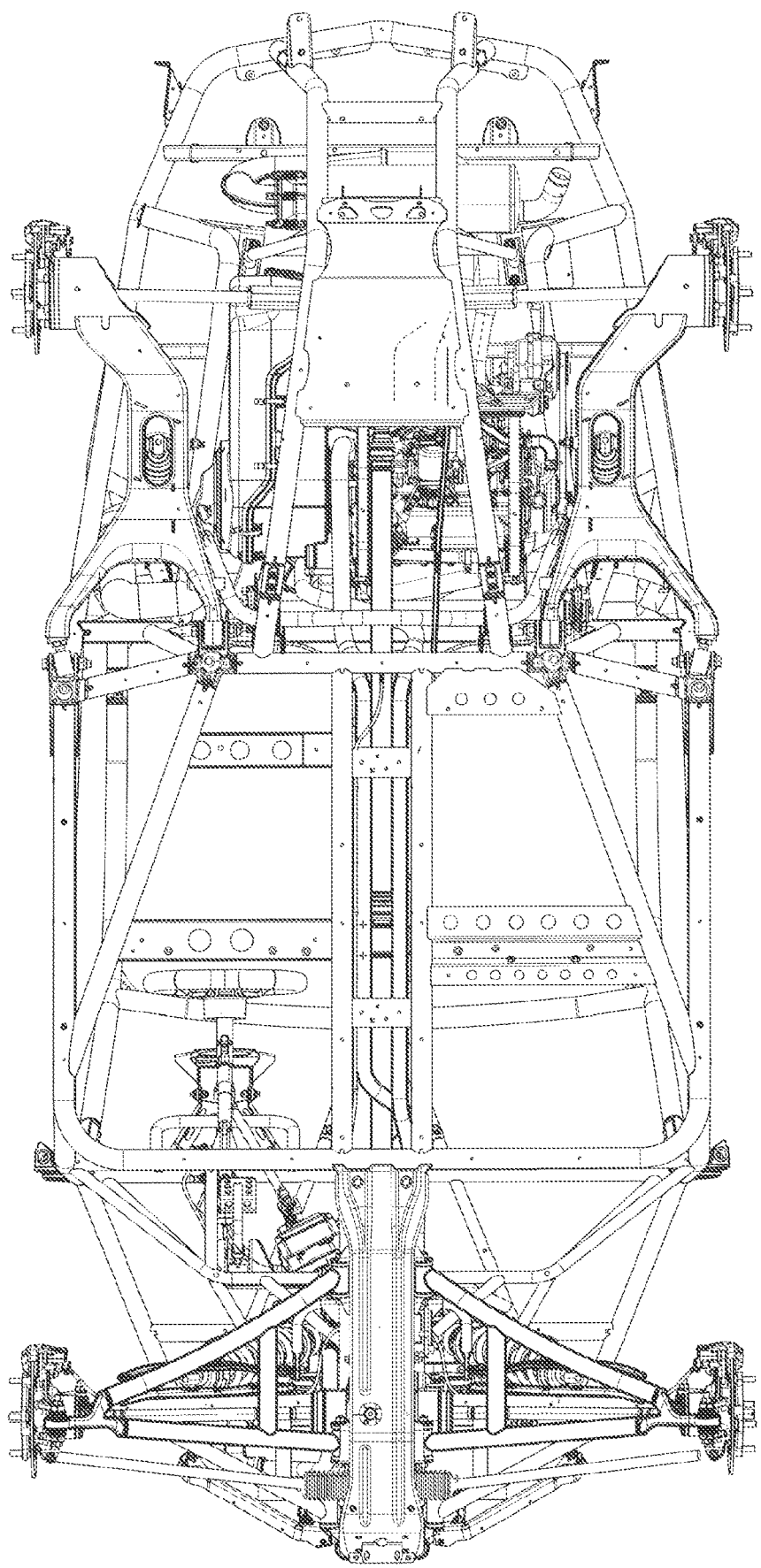
Figure 10:
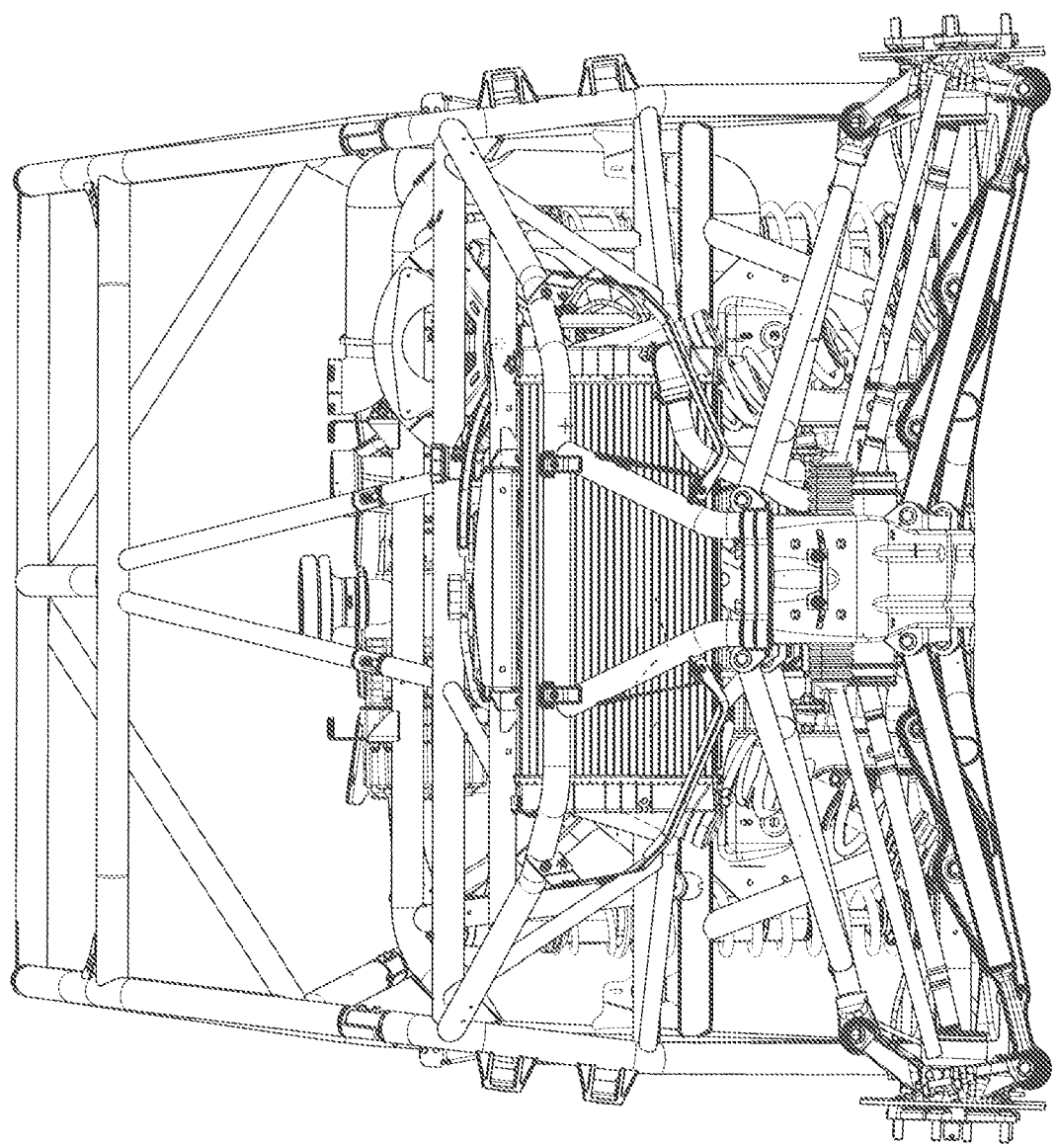
Figure 98:
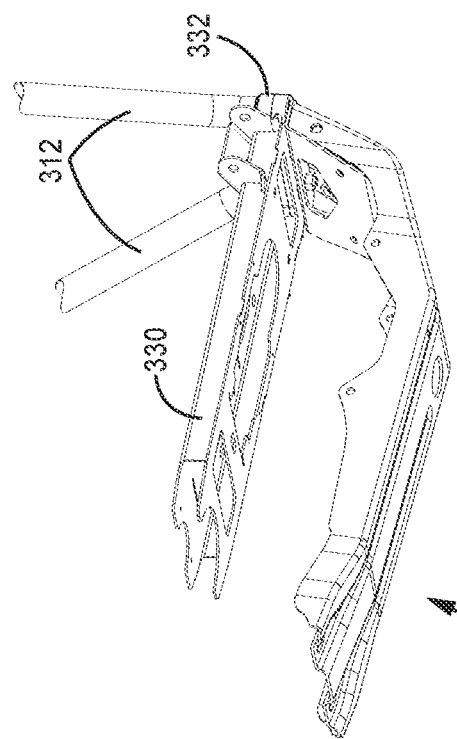
Figure 100:
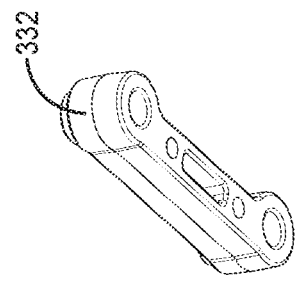
Figure 97:
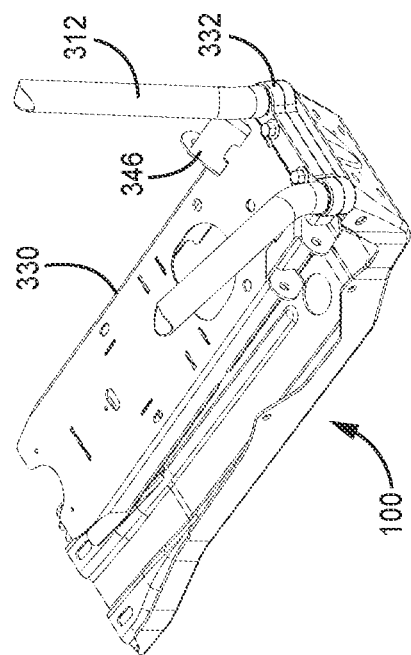
Figure 99:
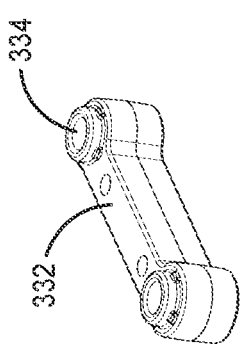
Figure 101:
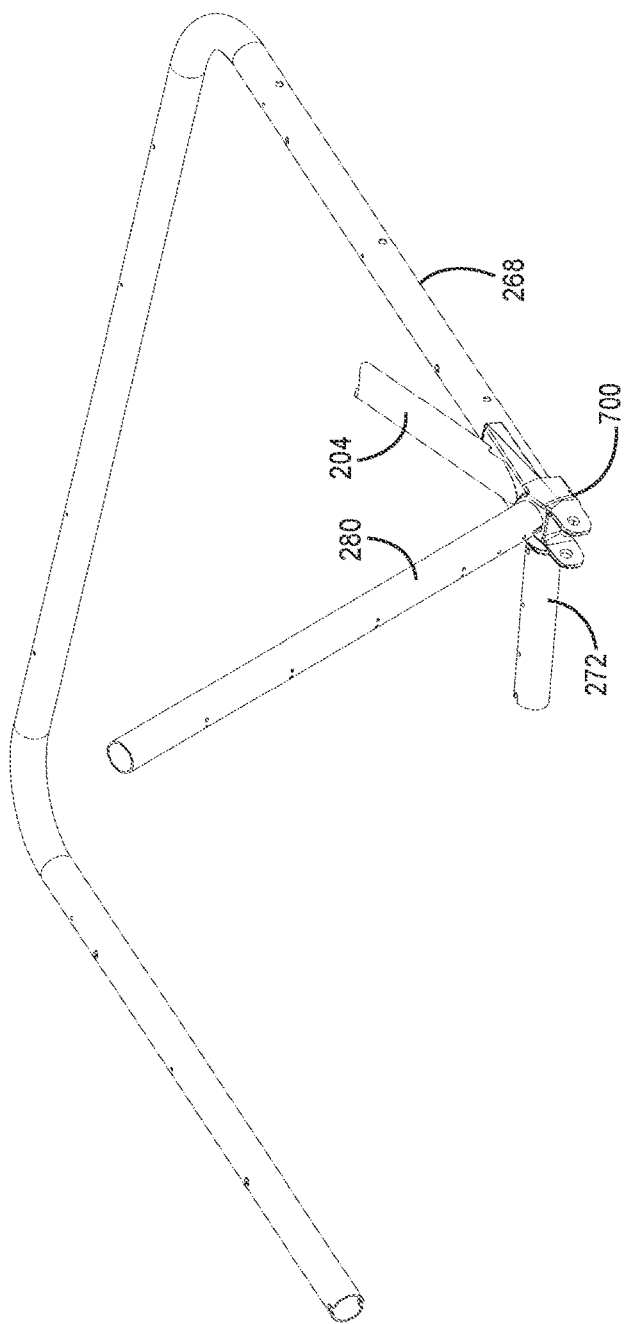
FIGS. 101-105 illustrate perspective views of trailing arm attachment locations formed from castings to which respective frame tubes are welded, according to some embodiments.
Figure 103:
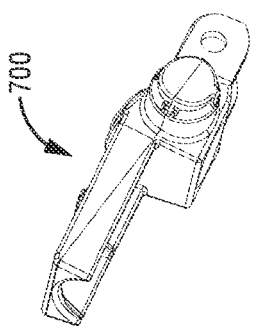
Figure 102:
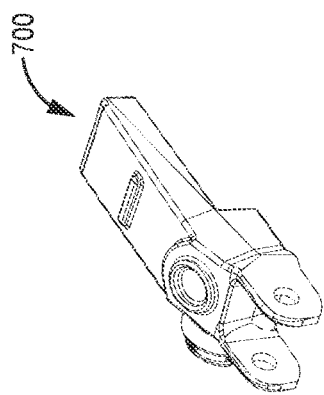

In some embodiments, the frame 12 includes a removable front subframe 100 (FIG. 41). In some embodiments, the removable front subframe 100 includes coupling locations for the lower A-arms 78, as shown in FIG. 5. In some embodiments, the removable front subframe 100, shown in greater detail in FIGS. 94, 97, and 98. In some embodiments, the removable subframe 100 is coupled (e.g., via fasteners such as bolts) to the front lateral lower frame member 270 via lower front subframe casting 328 (FIGS. 95 and 96). The lower front subframe casting 328 is coupled to the front lateral lower frame member 270, for example, via welding.

In some embodiments, the removable subframe 100 is coupled to the front upper A-arm support member 330 (FIGS. 97 and 98) and the front upstanding frame members 312 via upper front subframe casting 332 (FIGS. 97-100). In some embodiments, the upper front subframe casting 332 has one or more casting features to locate the front upstanding frame members 312 thereon for attachment thereto (e.g., welding). In some embodiments, the casting features 334 fit inside the inner diameter of the respective front upstanding frame member 312 to locate the front upstanding frame member 312 relative to the upper front subframe casting 332.

With further regard to FIG. 40, in some embodiments, the frame 12 includes a removable rear subframe 118. In some embodiments, the rear subframe 118 includes disconnects 36 which couple the rear subframe 118 to the rear outer lateral frame member 298, for example via tube segments 336 extending downwardly from the rear outer lateral frame member 298. In some embodiments, the rear subframe 118 is further coupled to the rear inner lateral lower frame member 274, for example via lengthwise tube segments 338. In some embodiments, the rear subframe 118 comprises one or more laterally extending tube connection members 340. In some embodiments, the rear subframe 118 includes one or more rear subframe panels 342 (e.g., stampings), as shown in FIG. 41, to join adjacent rear subframe members 344.

Figure 11:
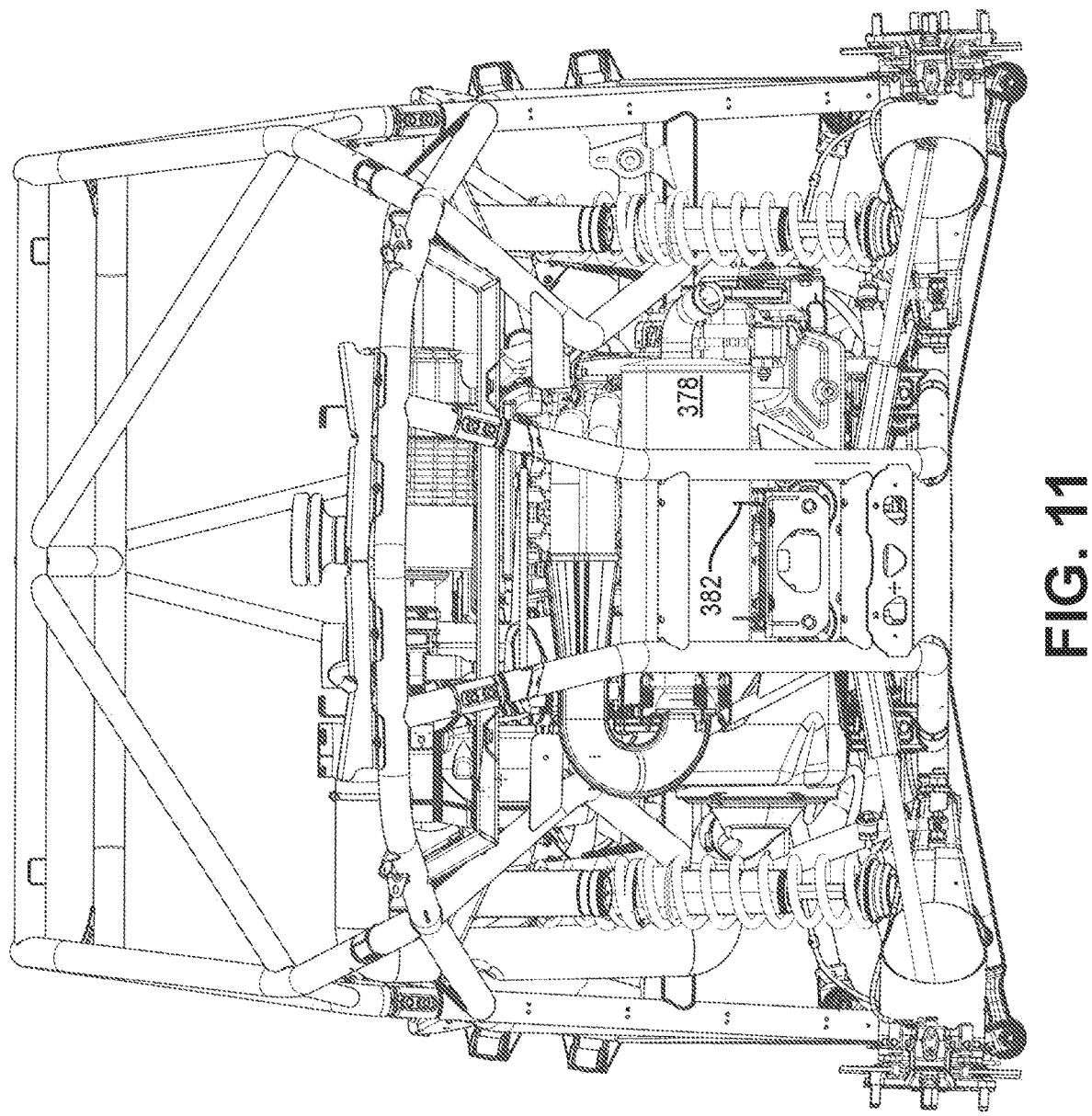
Figure 12:
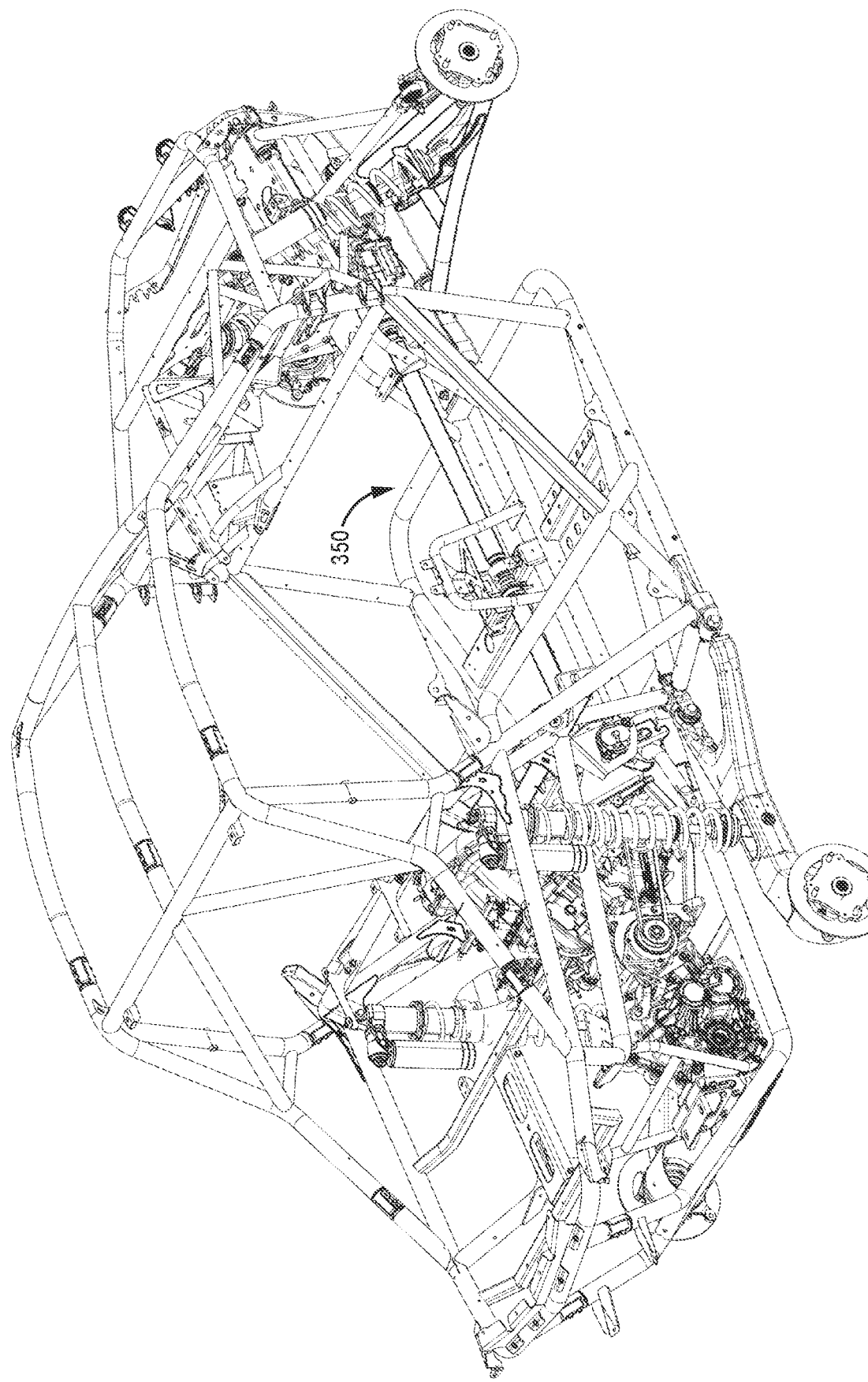
Figure 13:
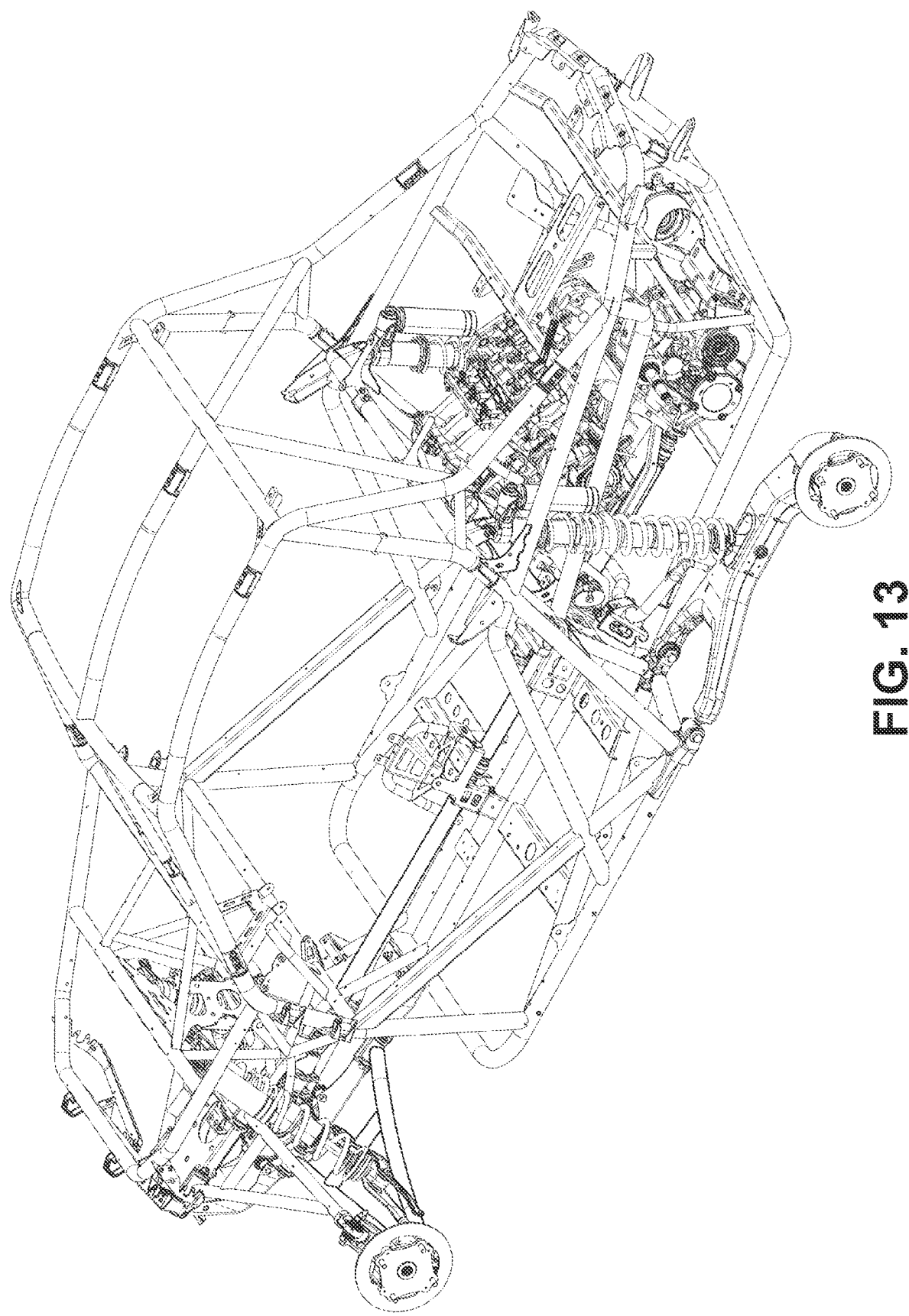
Figure 14:
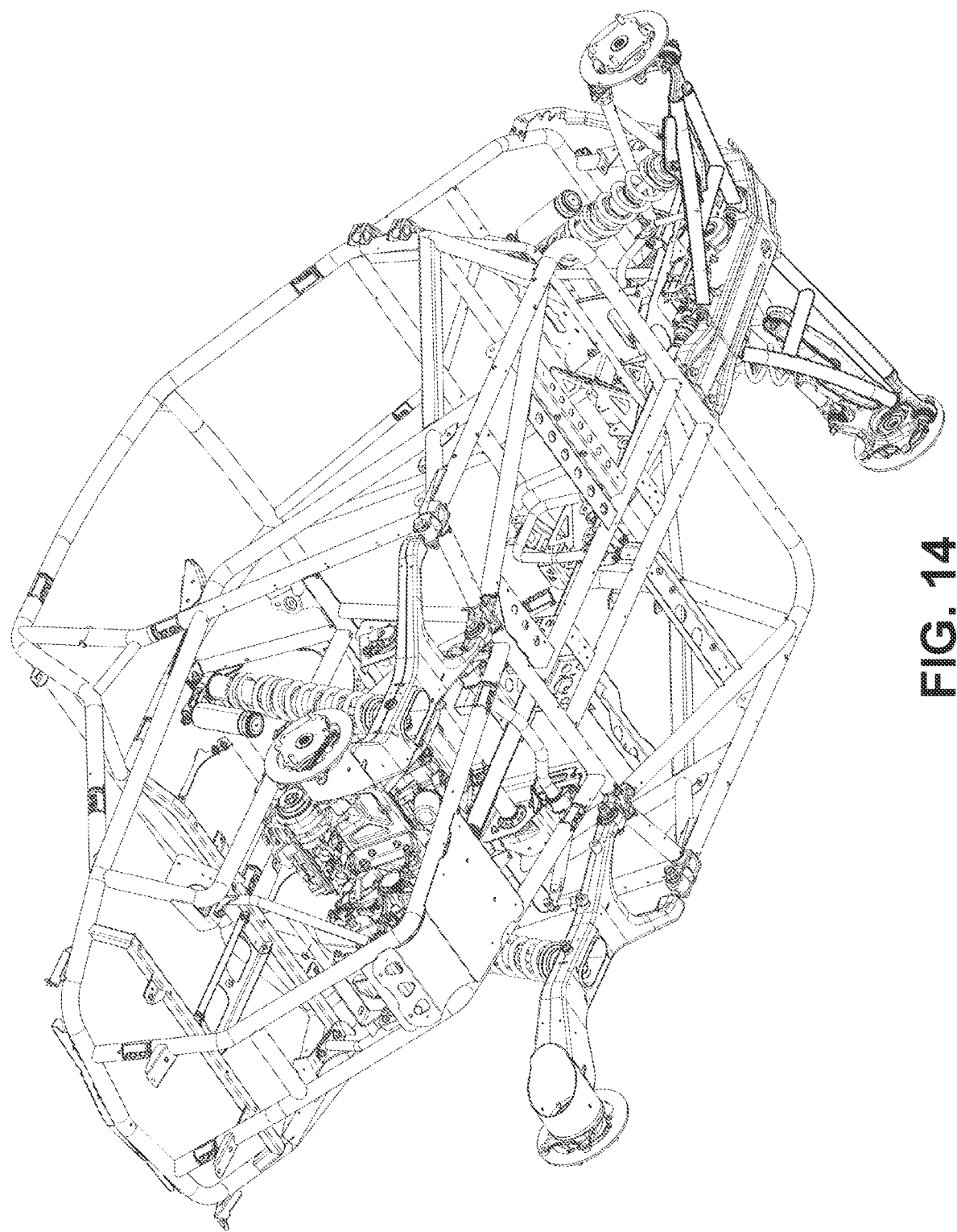
Figure 42:
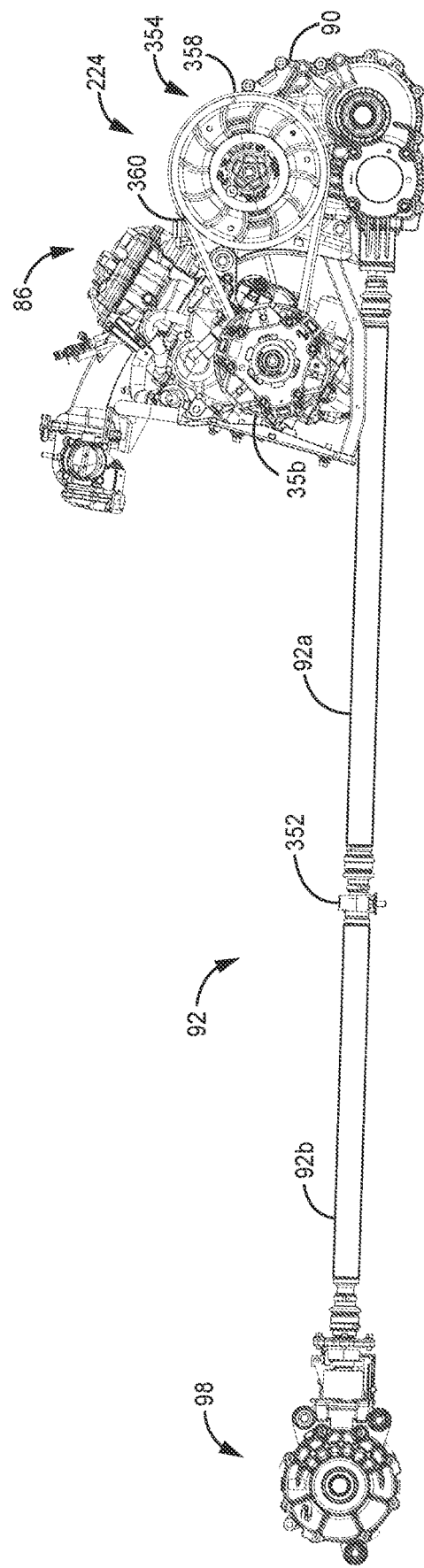
FIGS. 42-51 illustrate perspective views of drive train and engine components, according to some embodiments.
Figure 43:
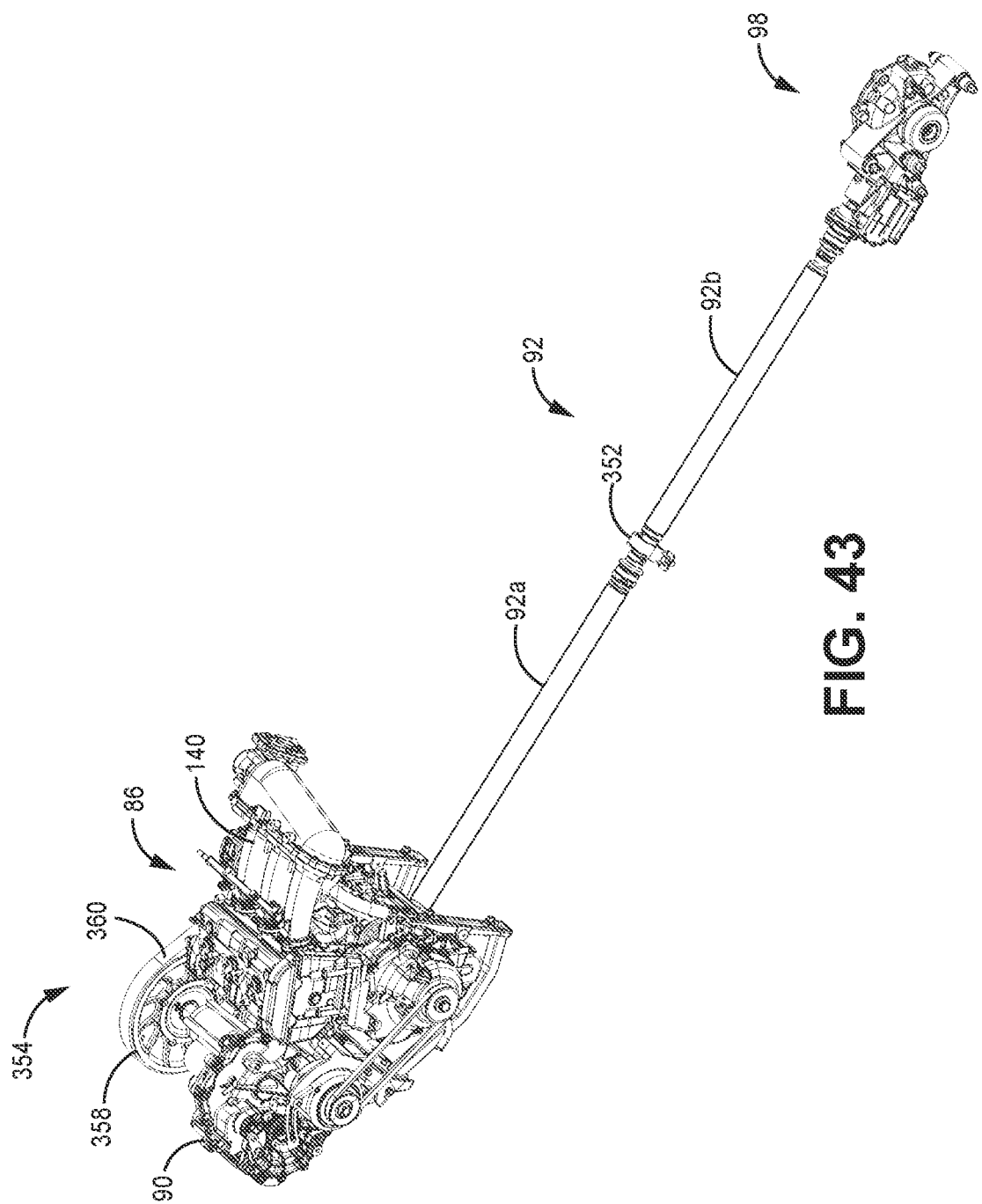

As shown for example in FIGS. 4-11, 42, and 43, the off-road vehicle 10 includes a driveline 350 (FIG. 12). Referring to FIGS. 42 and 43, in some embodiments, the off-road vehicle 10 includes a longitudinally extending driveshaft 92. In some embodiments, the driveshaft 92 is a two-piece driveshaft, for example having a first section 92a and a second section 92b, as shown in FIGS. 42 and 43, however, it can also be a single piece driveshaft, three piece driveshaft, etc. Where a two-piece driveshaft 92 is utilized, a bearing mount 352, including a bearing such as a ball bearing, can be located at the joint between the first section 92a and the second section 92b. Further, the bearing mount 352 can be used to secure the driveshaft 92 to the frame 12, while permitting rotation of the driveshaft 92. In some embodiments, one or more portions of the driveshaft 92 extend beneath a portion of the engine 86, as shown in FIG. 42.

In some embodiments, the driveshaft 92 is selectively coupled to a front differential 98. In some embodiments, the front differential 98 can include a locker, for example as disclosed in U.S. Pat. No. 7,018,317, the contents of which are herein incorporated by reference.

Figure 24:
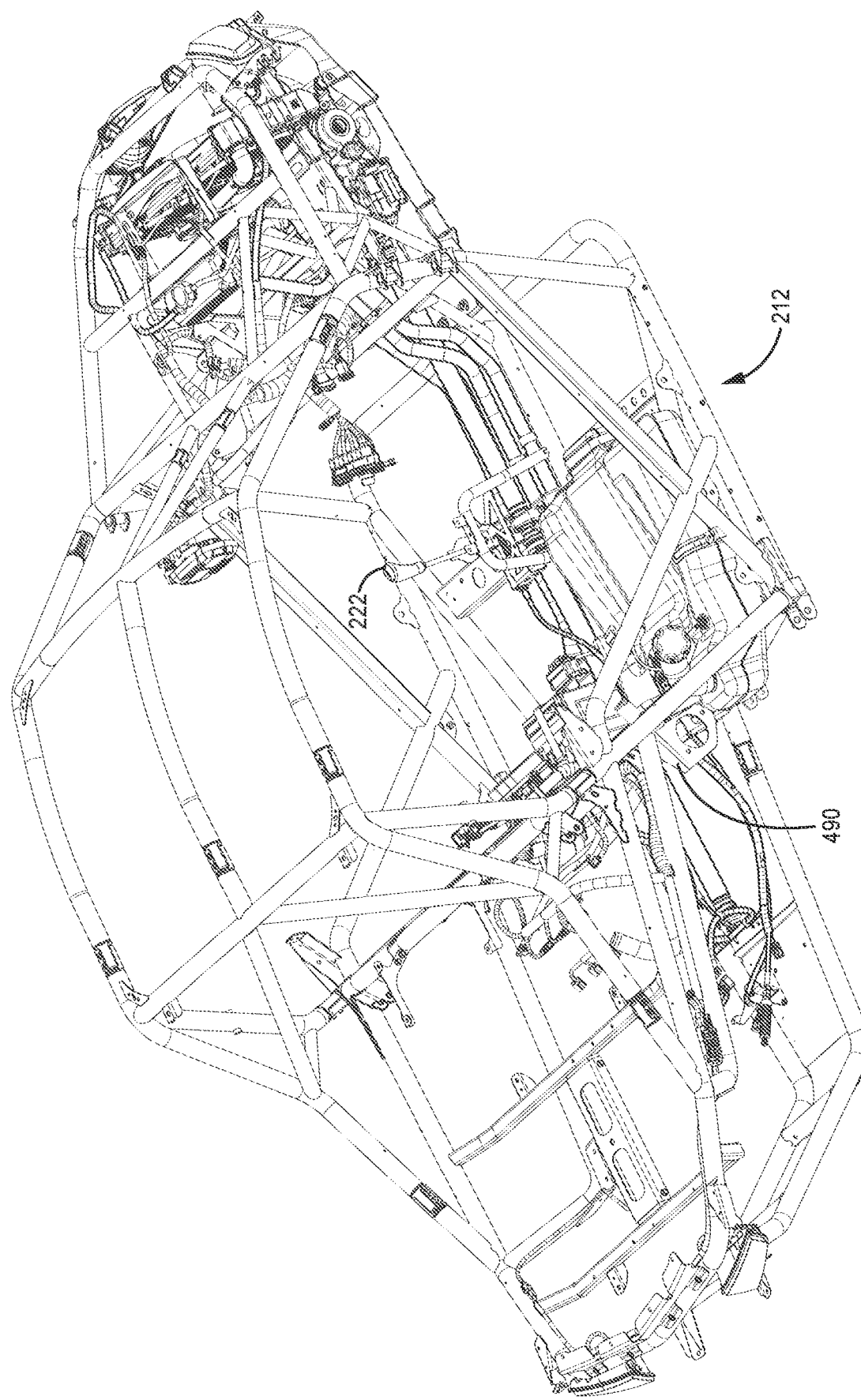
Figure 25:
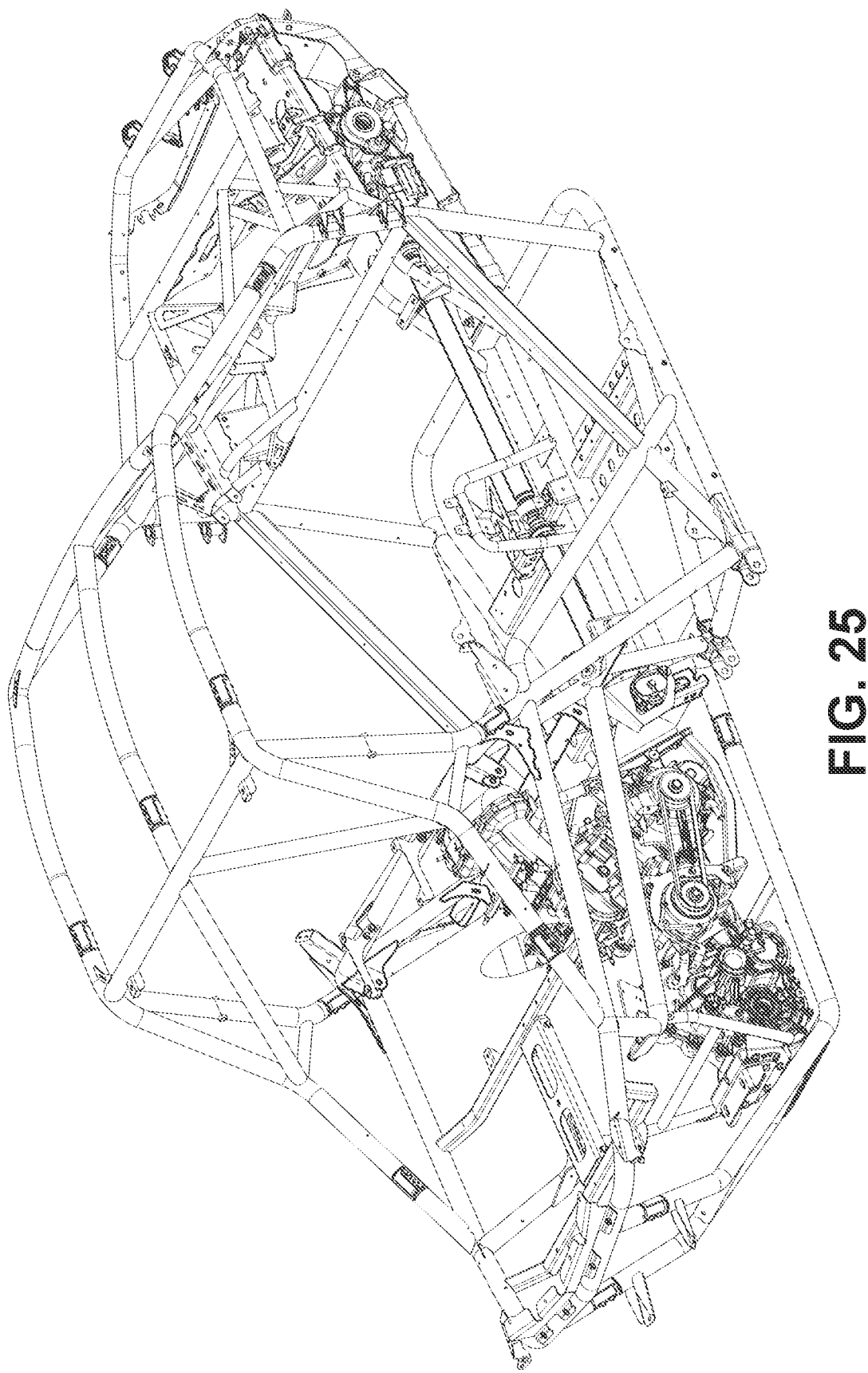

As further shown in FIGS. 42 and 43, in some embodiments, the off-road vehicle 10 includes a continuously variable transmission ("CVT") 354, which includes a drive clutch 356 and a driven clutch 358. The drive clutch 356 and driven clutch 358 have a belt 360 extending therebetween. In some embodiments, the driven clutch 358 is coupled to a transaxle 90. In some embodiments, the transaxle 90 has: one or more forward gears, one or more reverse gears, and neutral. Further, in some embodiments, the transaxle 90 has a park setting. Each of the gear settings can be selected by an operator, for example via gear shift selector 222 (FIG. 24).

Figure 48:
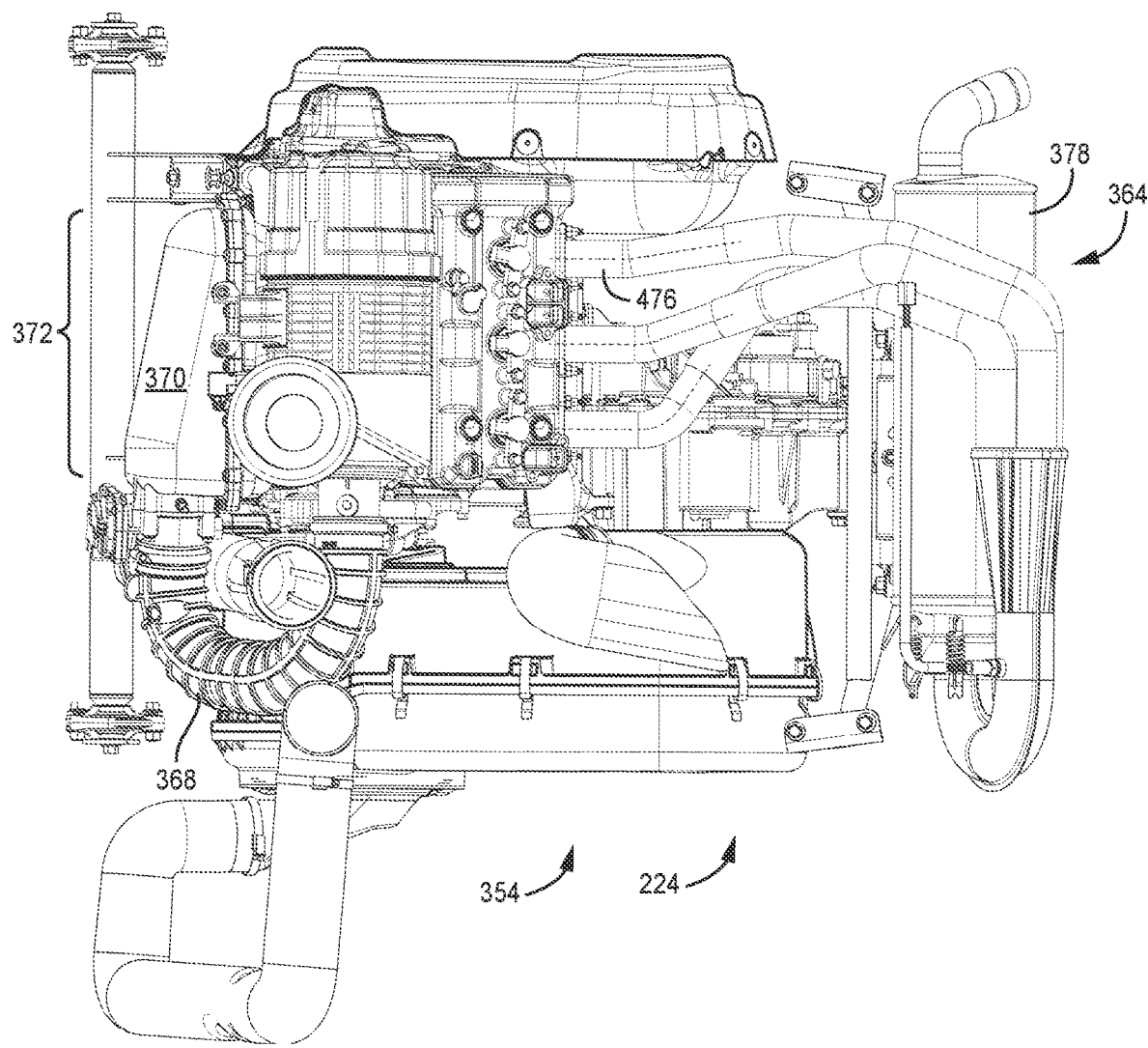

Turning to FIGS. 44-51, in some embodiments, the engine 86, transmission 224, intake assembly 362, and exhaust assembly 364 can be removed from the off-road vehicle as an assembly. In some embodiments, the intake assembly 362 includes an air filter housing 366, having therein one or more air filters such as paper filters, an air intake conduit 368 extending between the filter housing 366 and the intake manifold 370. In some embodiments, the intake manifold 370 has one or more intake runners 140. As show in FIG. 50, for example, in some embodiments, the intake manifold 370 has three intake runners 140. In some embodiments, the intake manifold 370 has a manifold housing 372, shown in FIGS. 48 and 50. In some embodiments, the cross-sectional area of the manifold housing 372 is greater nearer the throttle valve 374 than at a distal end portion of the manifold housing 372. As shown in FIG. 48, in some embodiments, the intake manifold 370 and filter housing 366 overlap and the filter housing 366 is positioned above the intake manifold 370. In some embodiments, a filter housing support bracket 376 (FIG. 44) is coupled to the intake manifold 370 and filter housing 366.

Figure 53:
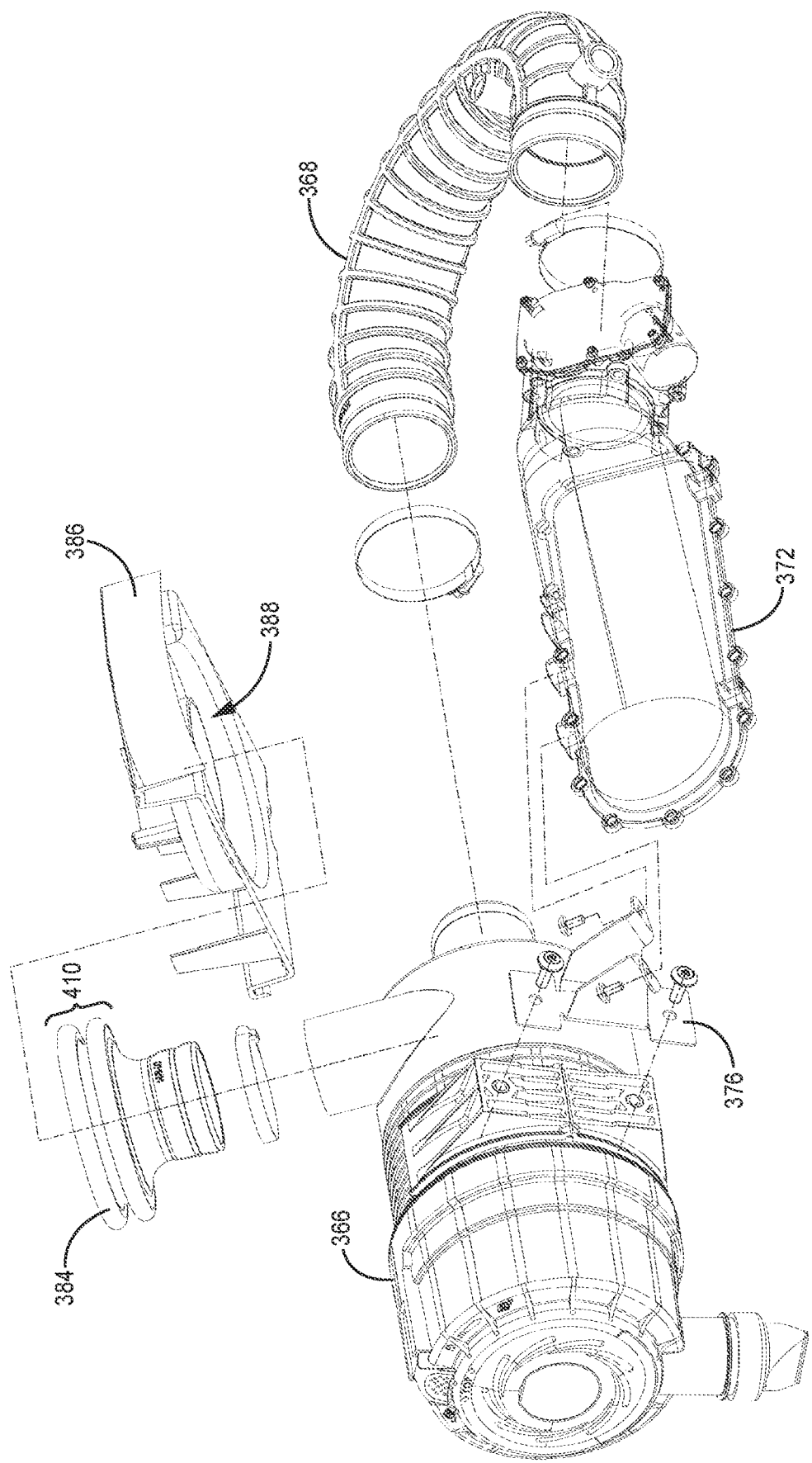
Figure 82:
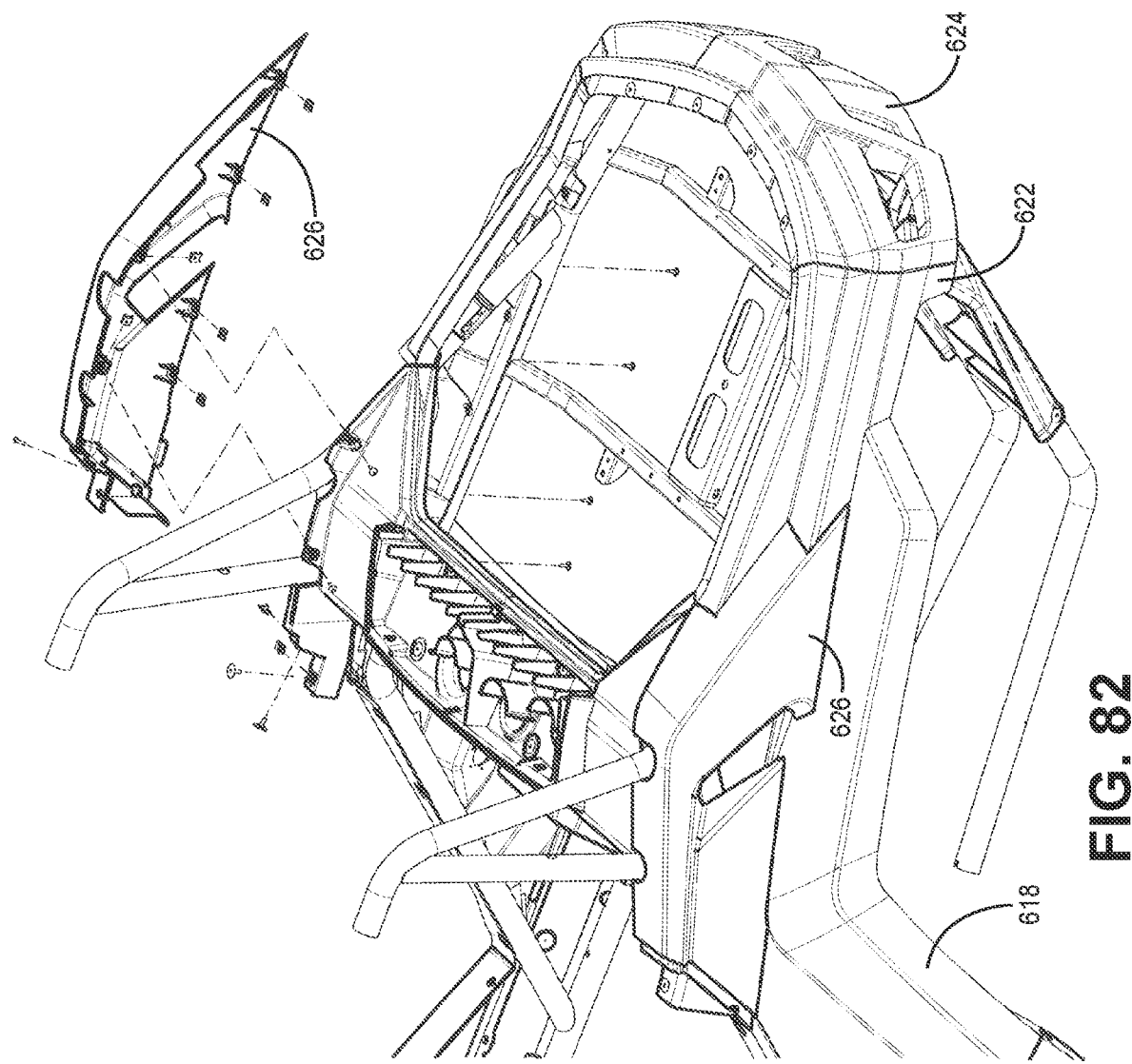
Figure 83:
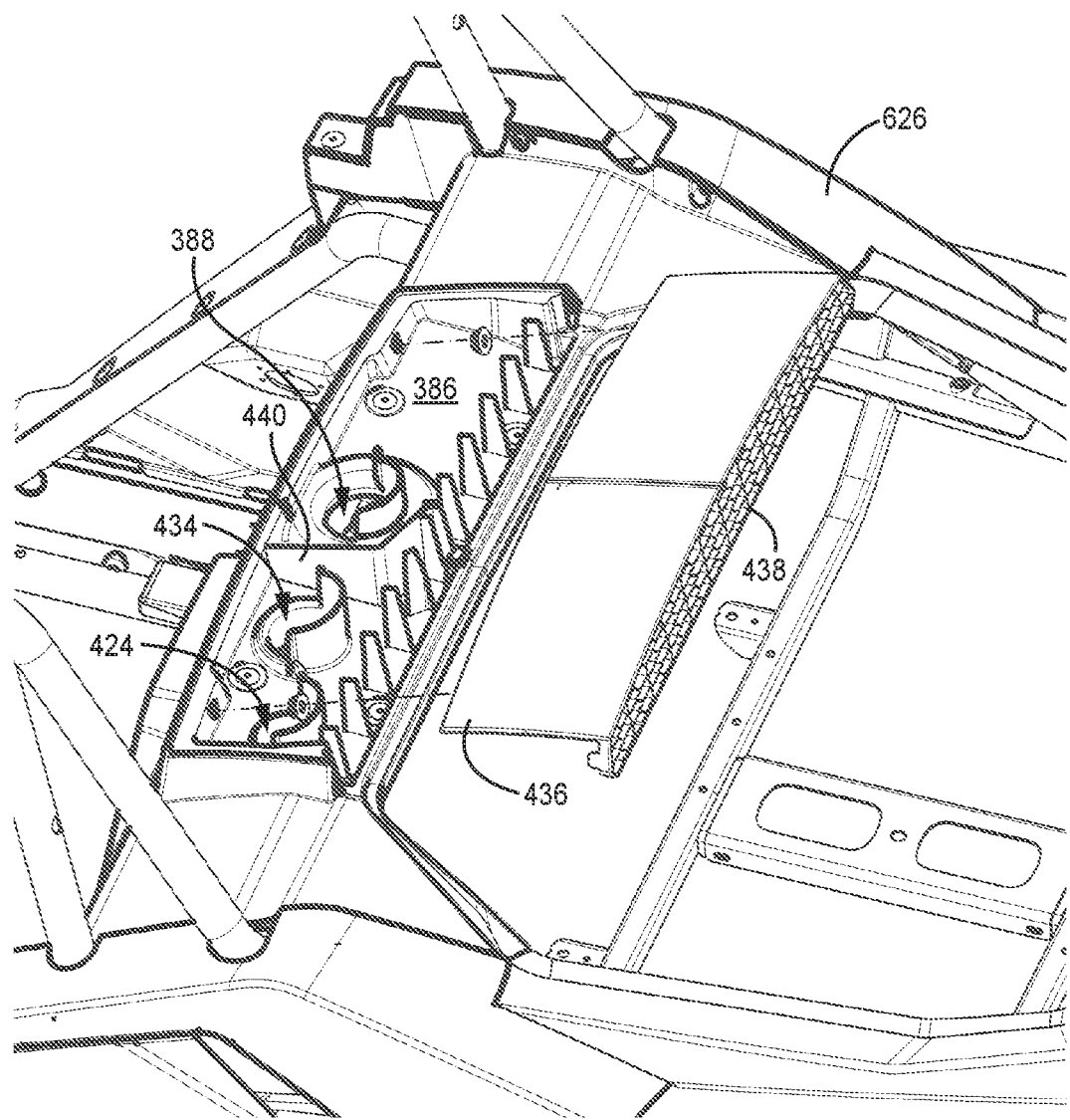

In some embodiments, the intake assembly 362 further includes an intake isolator 384. The intake isolator 384 mates with a portion of the inner cowl 386 (FIGS. 53, 82, and 83). In some embodiments, the intake isolator 384 interfaces with an underside of the inner cowl 386, for example the right port 388 (FIG. 83) of the inner cowl 386. In some embodiments, the intake isolator 384 has a toroidal cross section. In some embodiments, the intake isolator 384 is formed from an elastomeric material in order to permit the engine/transmission assembly to move a limited amount relative to the inner cowl 386 while a portion of the intake isolator 384 maintains contact with the inner cowl 386. In some embodiments, the intake isolator is formed from a rubber material and, in some embodiments, the intake isolator 384 includes a bellows portion 410.

Figure 52:
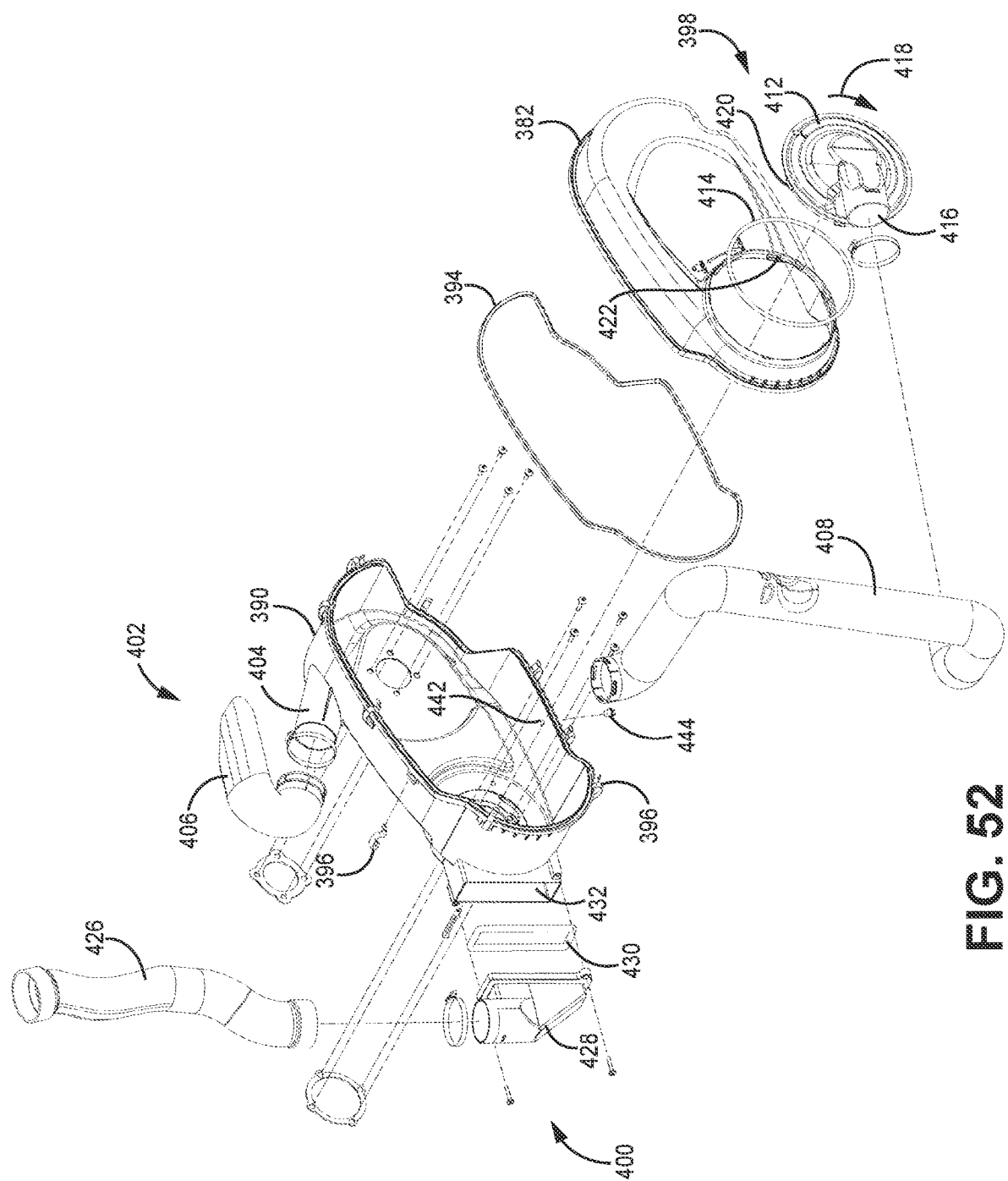
FIGS. 52-53 illustrate perspective views of air handling components, according to some embodiments.

Returning to FIGS. 44-48, and with regard to FIG. 52, in some embodiments, the clutches of the CVT 354 are surrounded by an inner CVT cover 390 and an outer CVT cover 392. In some embodiments, a CVT gasket 394 provides a seal between the inner CVT cover 390 and outer CVT cover 392. In some embodiments, the outer CVT cover 392 is releasably coupled to the inner CVT cover 390 with one or more CVT cover fasteners 396, for example spring-type retainers. In this way, the outer CVT cover 390 is removable from the inner CVT cover 390 without the use of tools (i.e. with hands only).

In some embodiments, the CVT has one or more CVT air intakes. For example, as shown in FIG. 52, a first CVT air intake assembly 398 and a second CVT air intake assembly 400 route air into the space defined by the CVT covers to facilitate cooling of the CVT. In some embodiments, the first CVT air intake assembly 398 routes air into the CVT via the outer CVT cover 392. Further, as shown in FIG. 52, the second CVT air intake assembly 400 routes air into the CVT via the inner CVT cover 390. The CVT includes a CVT exhaust assembly 402, including a CVT exhaust port 404 and a CVT exhaust duct 406. In some embodiments, the CVT exhaust port 404 is located on the inner CVT cover 390, however, it can be located on the outer CVT cover 392 or both inner and outer CVT covers.

Figure 79:
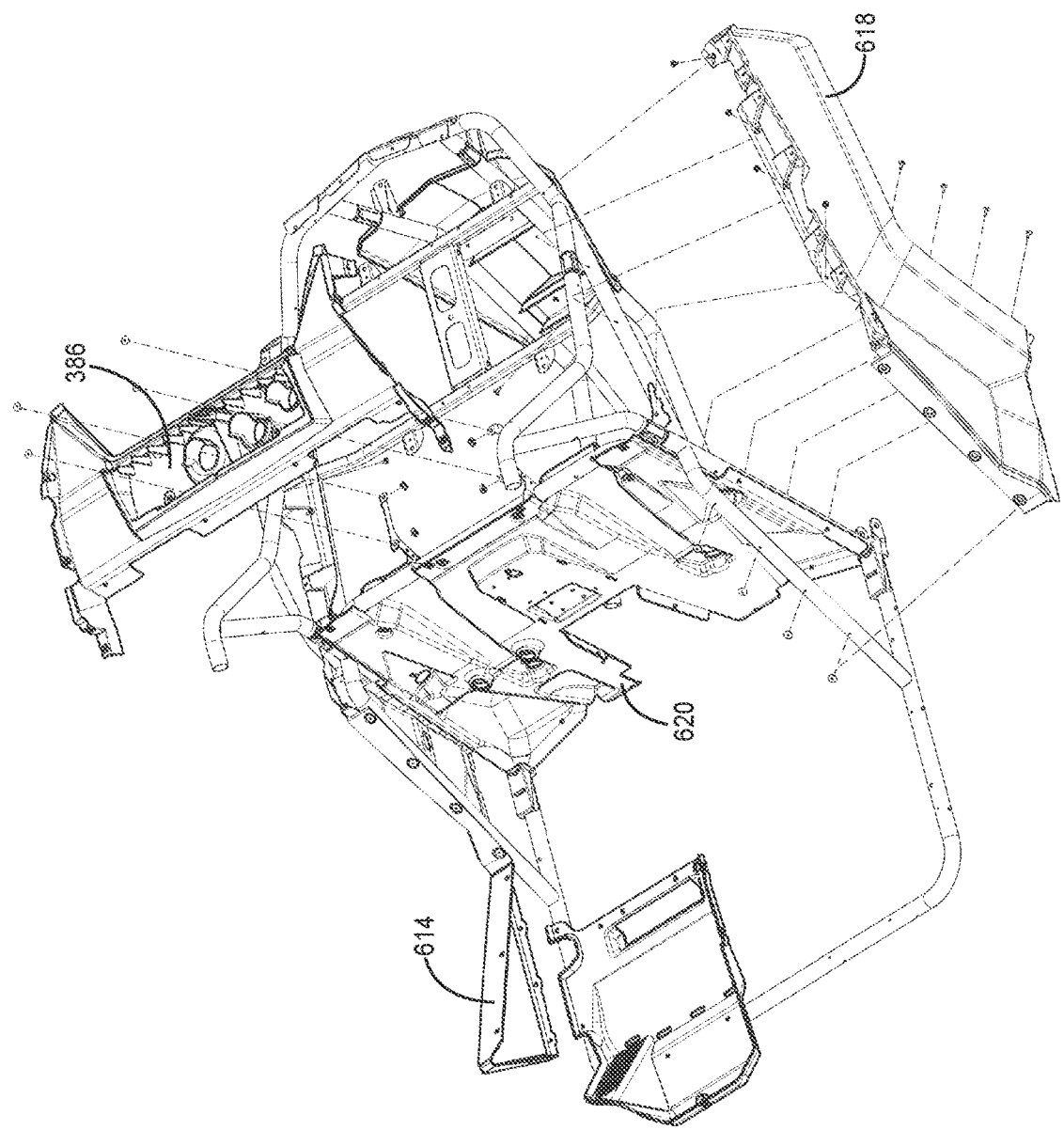
Figure 80:
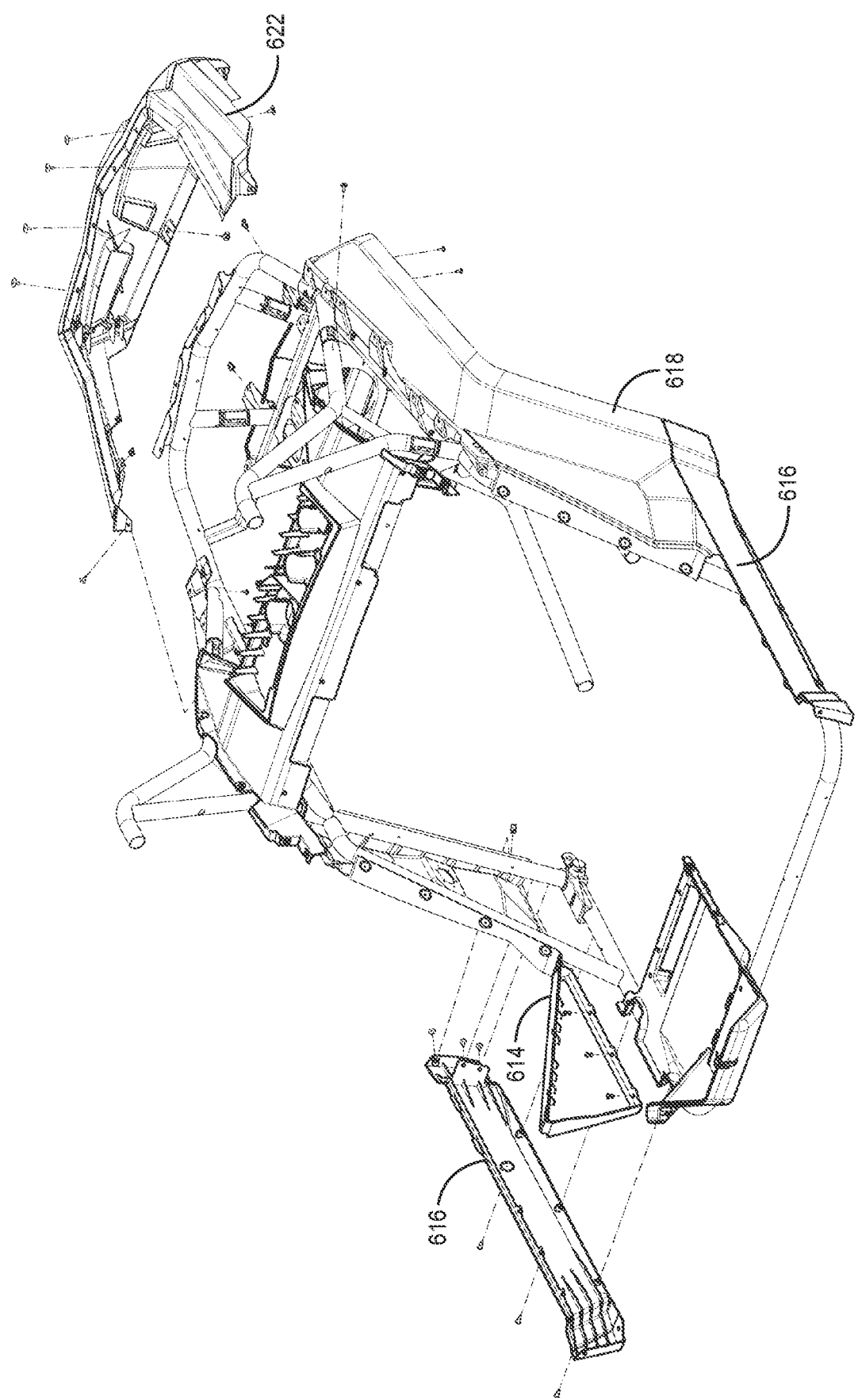
Figure 81:
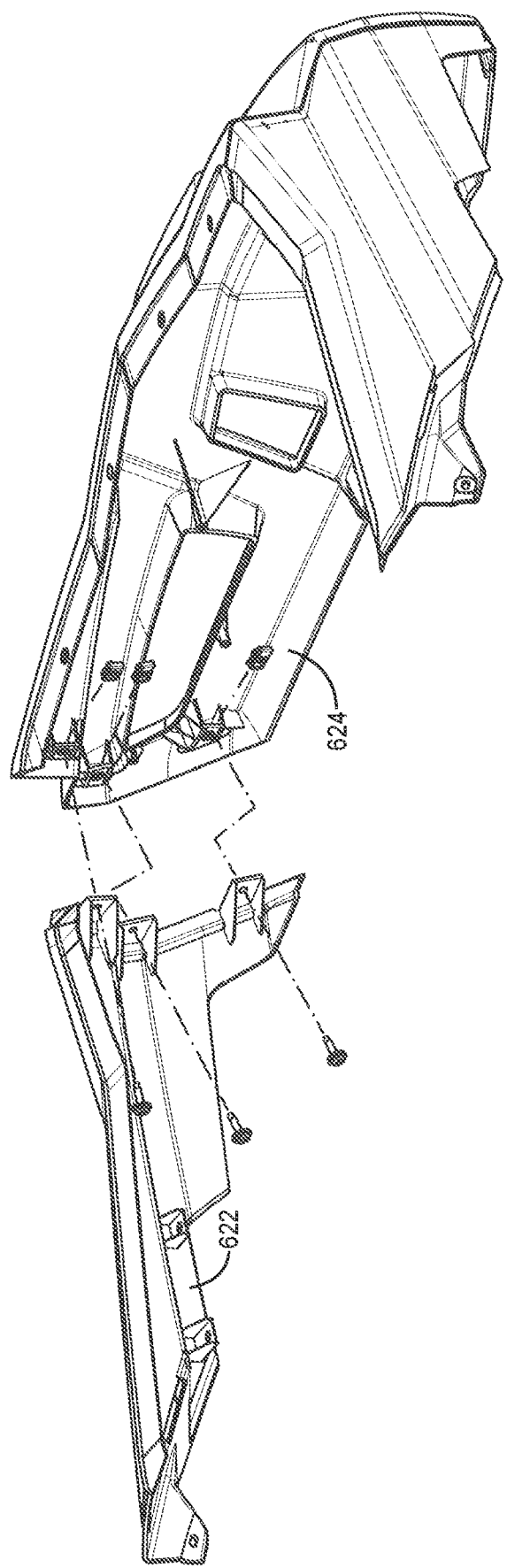

As further shown in FIG. 52, in some embodiments, the first air intake assembly 398 includes a first CVT intake duct 408, a removable outer CVT cover plate 412, and a sealing member 414. In some embodiments, the removable outer CVT cover plate 412 includes a first intake port 416. In some embodiments, the removable outer CVT cover plate 412 can be removed from the outer CVT cover 392 by rotating the removable outer CVT cover plate 412 in the direction of arrow 418. Further, the removable outer CVT cover plate 412 can be locked into place in rotating the removable outer CVT cover plate 412 in the direction opposite arrow 418. The removable outer CVT cover plate 412 includes one or more tabs 420 that interface with ramps 422 on the outer CVT cover 392 to lock/unlock the removable outer CVT cover plate 412 relative to the outer CVT cover 392. The tabs 420 can be located on either the removable outer CVT cover plate 412 or the outer CVT cover 392 and the ramps 422 can also be located on either the removable outer CVT cover plate 412 or the outer CVT cover 392. In some embodiments, the first CVT intake duct 408 interacts with the inner cowl 386 (FIG. 79). In some embodiments, the first CVT intake duct 408 interacts with the left port 424 (FIG. 83) of the inner cowl 386.

In some embodiments, the second CVT air intake assembly 400 includes a second CVT intake duct 426, an intake elbow 428, a second CVT intake sealing member 430, and a second intake port 432. In some embodiments, the intake elbow 428 and second intake port 432 have a rectangular cross-section, as shown in FIG. 52. In some embodiments, the second CVT intake duct 426 interacts with the inner cowl 385 (FIG. 83) and, in some embodiments, with the middle port 434 of the inner cowl 386. With further reference to FIG. 83, in some embodiments, the engine 86 receives combustion air and the CVT receives cooling air from a space between by the inner cowl 386 and outer cowl 436. Air enters the space between the inner cowl 386 and outer cowl 436 via a grate 438, which is rearwardly facing in some embodiments. In some embodiments, a cowl divider 440 divides the air between the right port 388 on one side and the middle port 434 and left port 424 on the other side.

In some embodiments, one or both of the CVT covers includes a drain hole 442 and drain plug 444.

Figure 15:
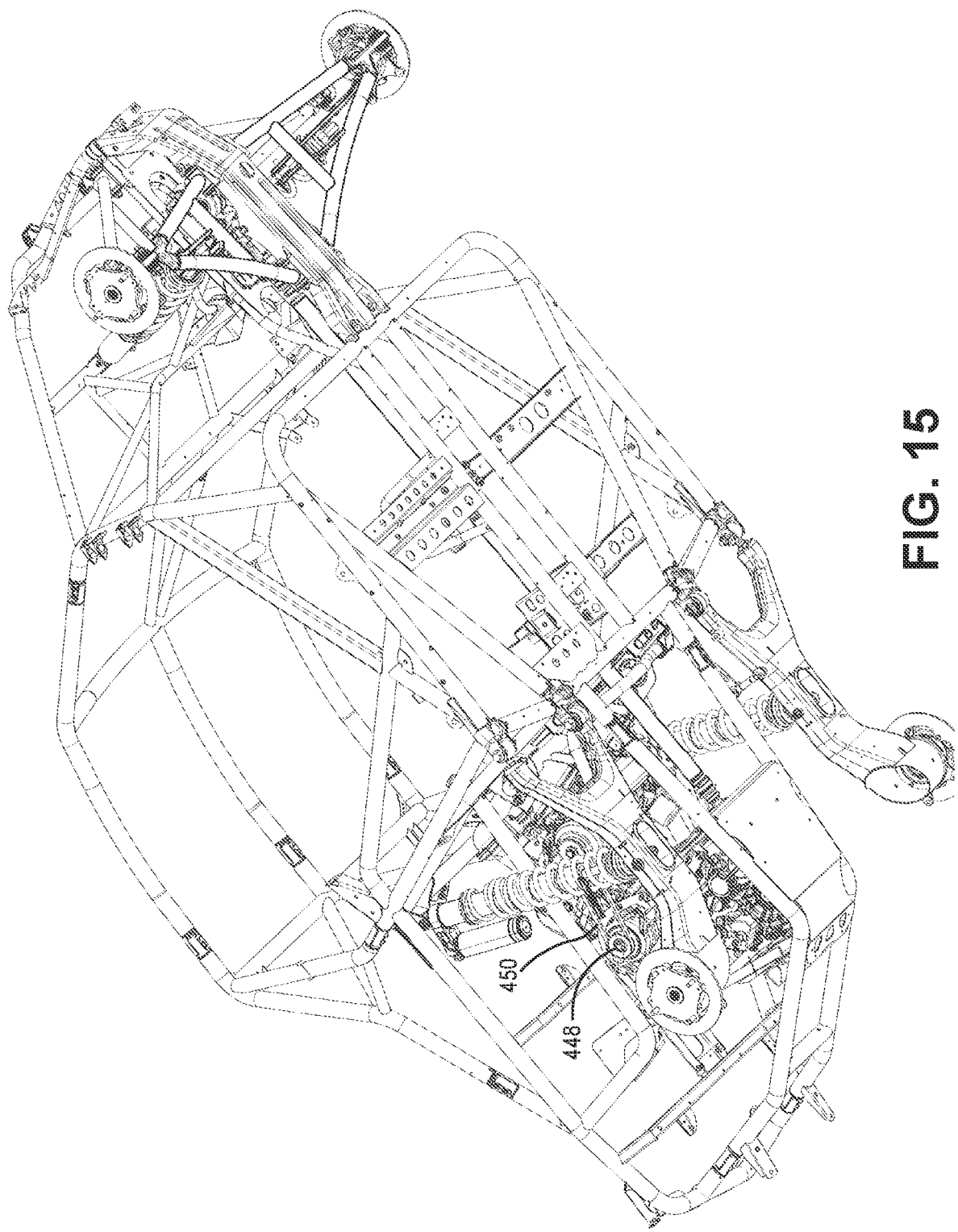

Returning to FIG. 44, in some embodiments, an outer alternator shroud 446 protects the alternator 448 (FIG. 15), alternator drive belt 450, and associated pulleys. In some embodiments, an inner alternator shroud 452 (FIG. 46) is provided on the engine side of the alternator 448. In some embodiments, the alternator drive belt 450 is coupled to the engine crankshaft (not shown) via a pulley.

Figure 44:
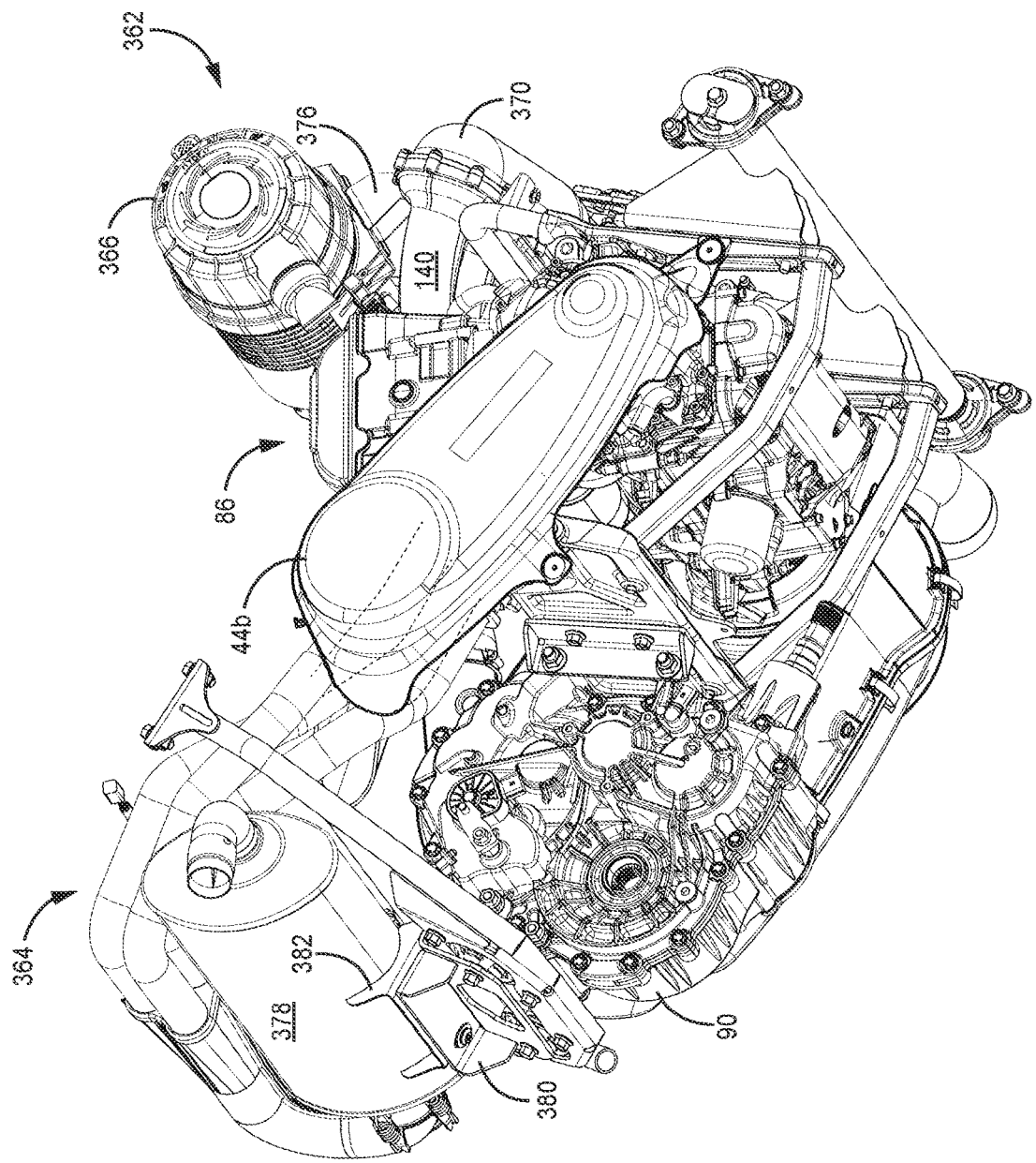
Figure 45:
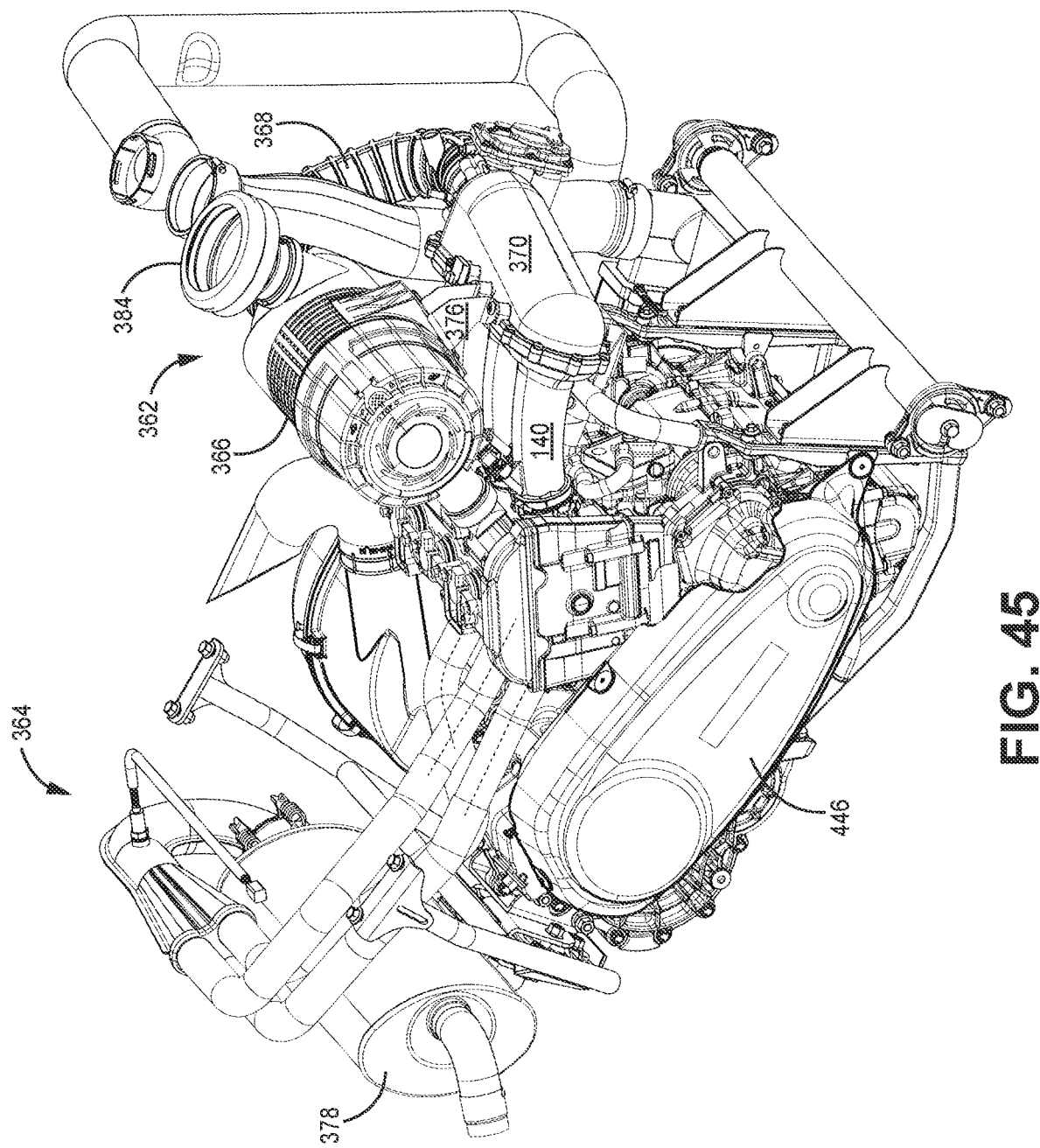
Figure 46:
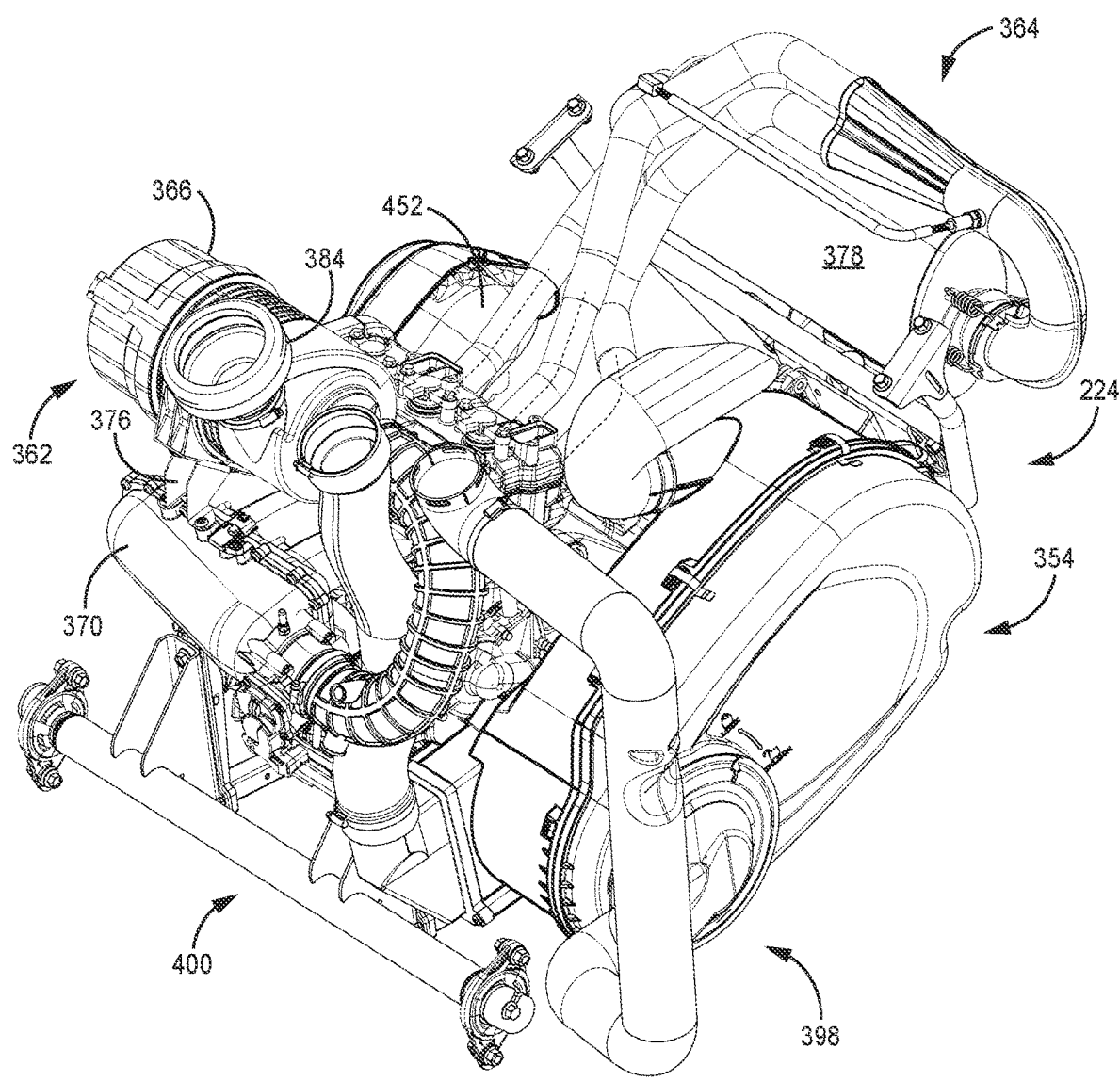
Figure 47:
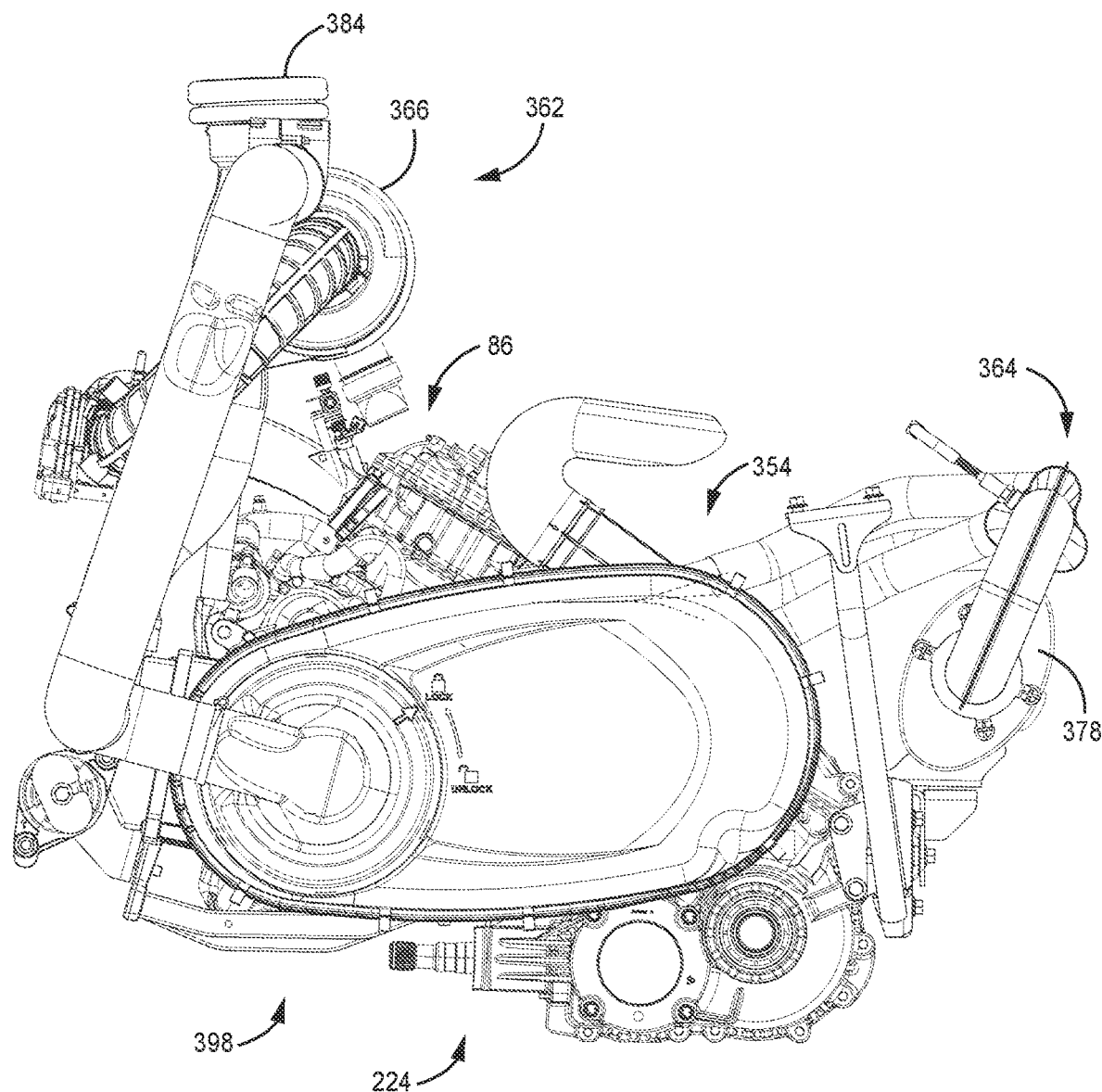

With further regard to FIG. 44, in some embodiments, a muffler 378 is coupled to a muffler support bracket 380 (FIG. 44), for example via fasteners which are fastened to muffler weldment 382, as also shown in FIG. 11. In turn, the muffler weldment 382 is, in some embodiments, welded to the muffler 378.

Figure 49:
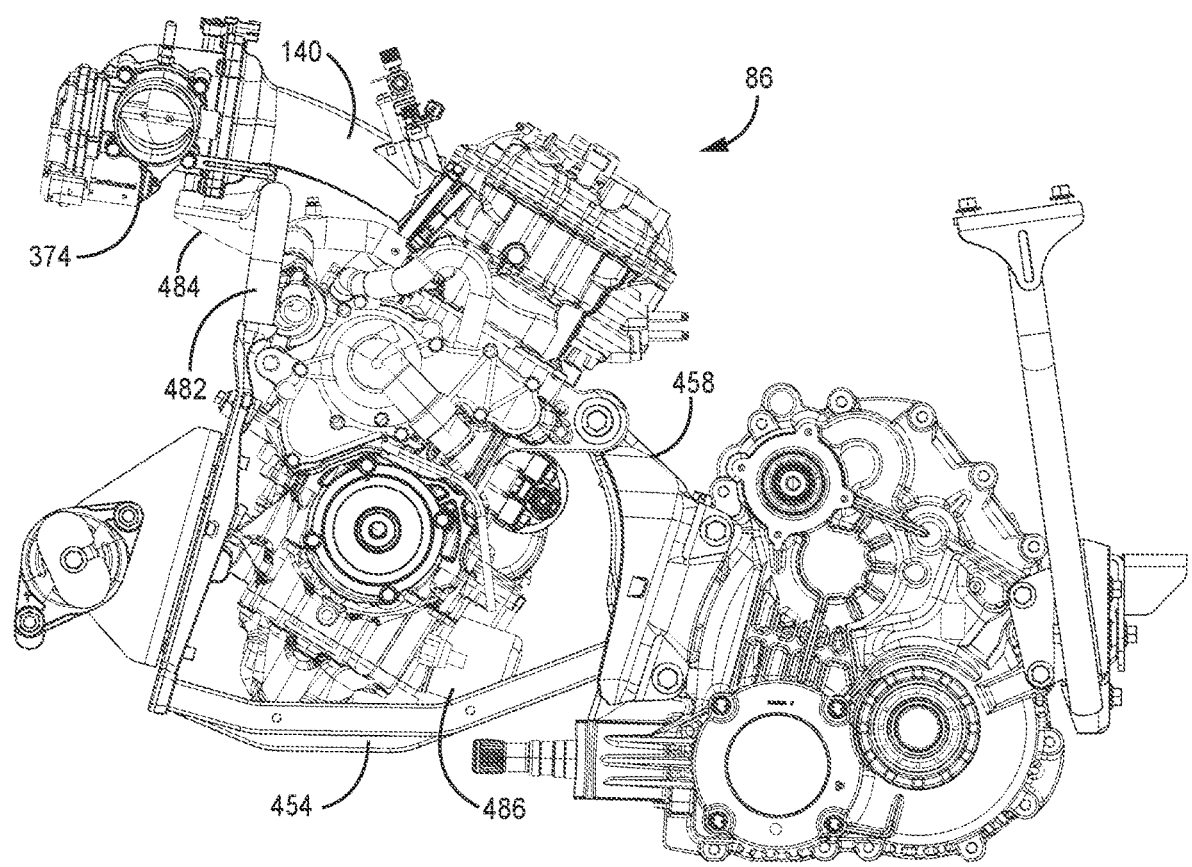
Figure 50:
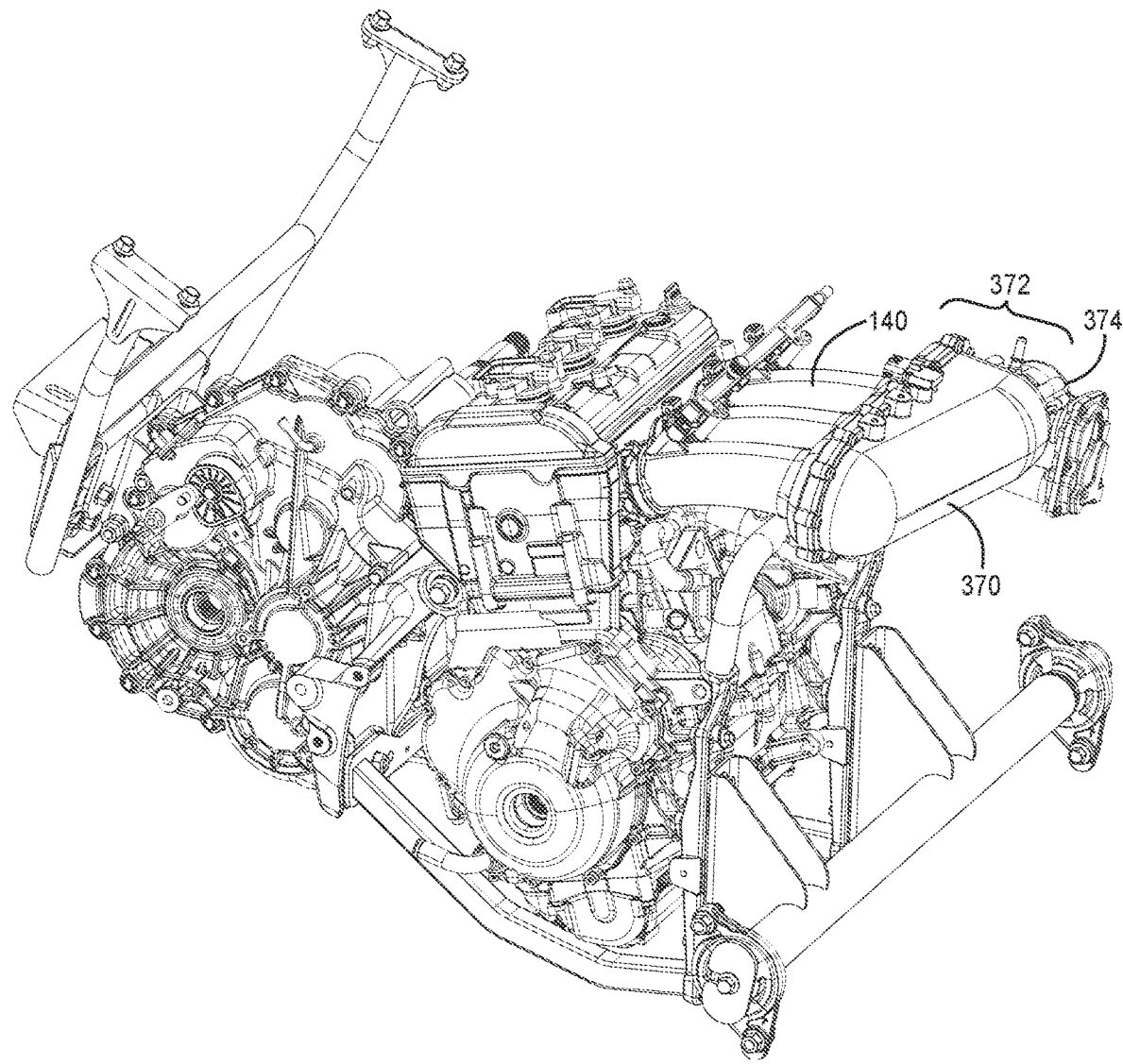
Figure 51:
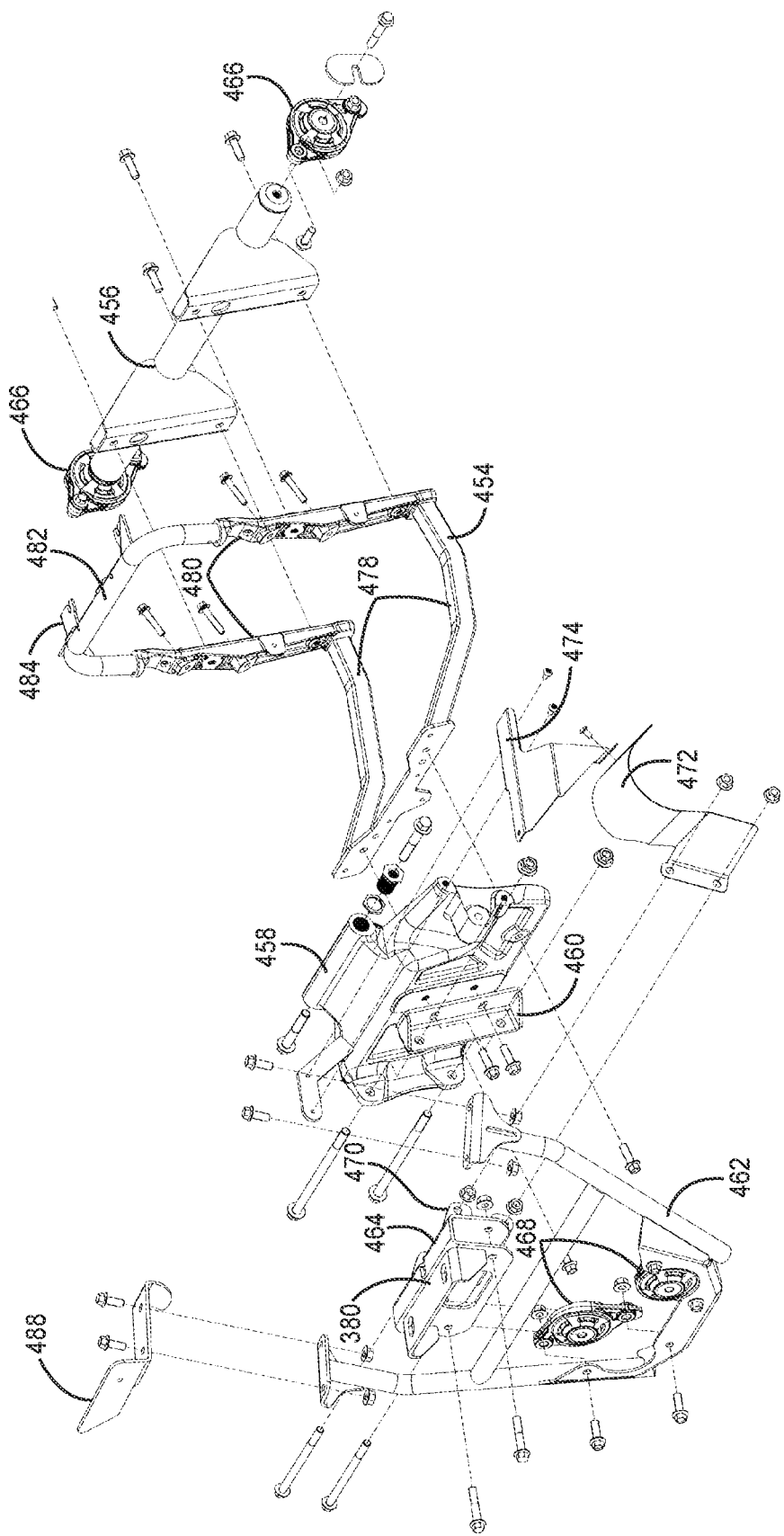

As shown in FIGS. 49-51, in some embodiments, the engine/transmission assembly includes an engine cradle member 454, a cradle support 456, cradle bridging member 458, cradle bridging bracket 460, rear transmission support member 462, and transmission support bracket 464. In some embodiments, the cradle support 456 is vibration isolated via front isolators 466 and the transmission support bracket 464 is vibration isolated via rear isolators 468. In some embodiments, the muffler support bracket 380 is coupled (e.g., welded) to the transmission support bracket 464. Further, in some embodiments, the transaxle 90 (FIG. 44) is coupled to the transmission support bracket 464, for example via one or more fasteners extending through support bracket tabs 470. In some embodiments, one or more heat shields 472, 474 provide shielding for exhaust pipes 476 (FIG. 48). As shown in FIG. 49, in some embodiments, the engine 86 is coupled to the engine cradle member 454 in front of the engine 86 and to the cradle bridging member 458 behind the engine 86. In some embodiments, the engine cradle member 454 has two cradle legs 478; the cradle legs 478 extend under portions of the engine 86. In some embodiments, the cradle legs 478 are each welded to the cradle uprights 480. In some embodiments, the engine cradle member 454 includes hoop member 482. Intake support tabs 484 are, in turn, supported by hoop member 482. In some embodiments an oil filter 486 (FIG. 49) is disposed between the engine 86 and the cradle bridging member 458.

Figure 17:
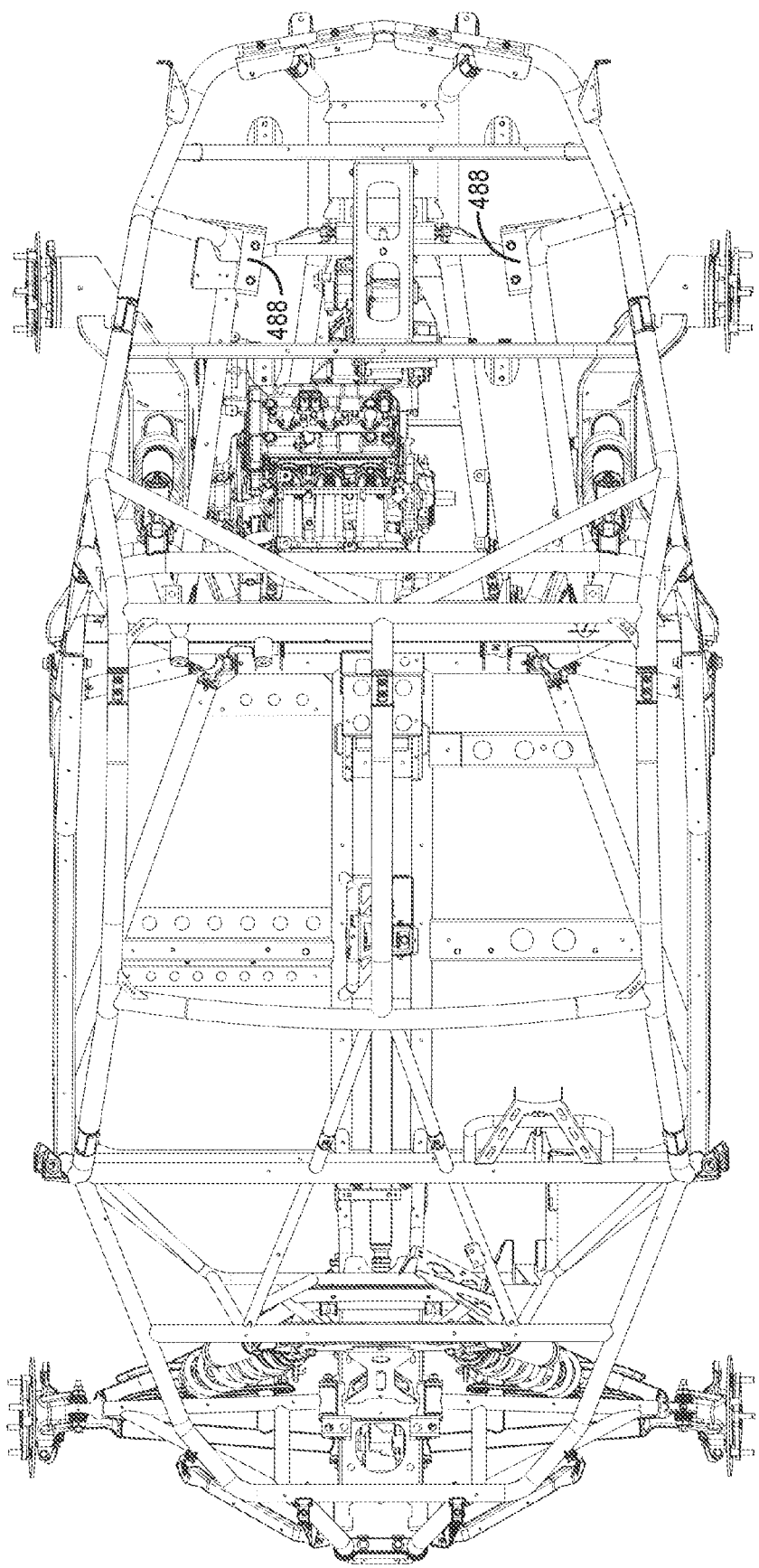
Figure 18:
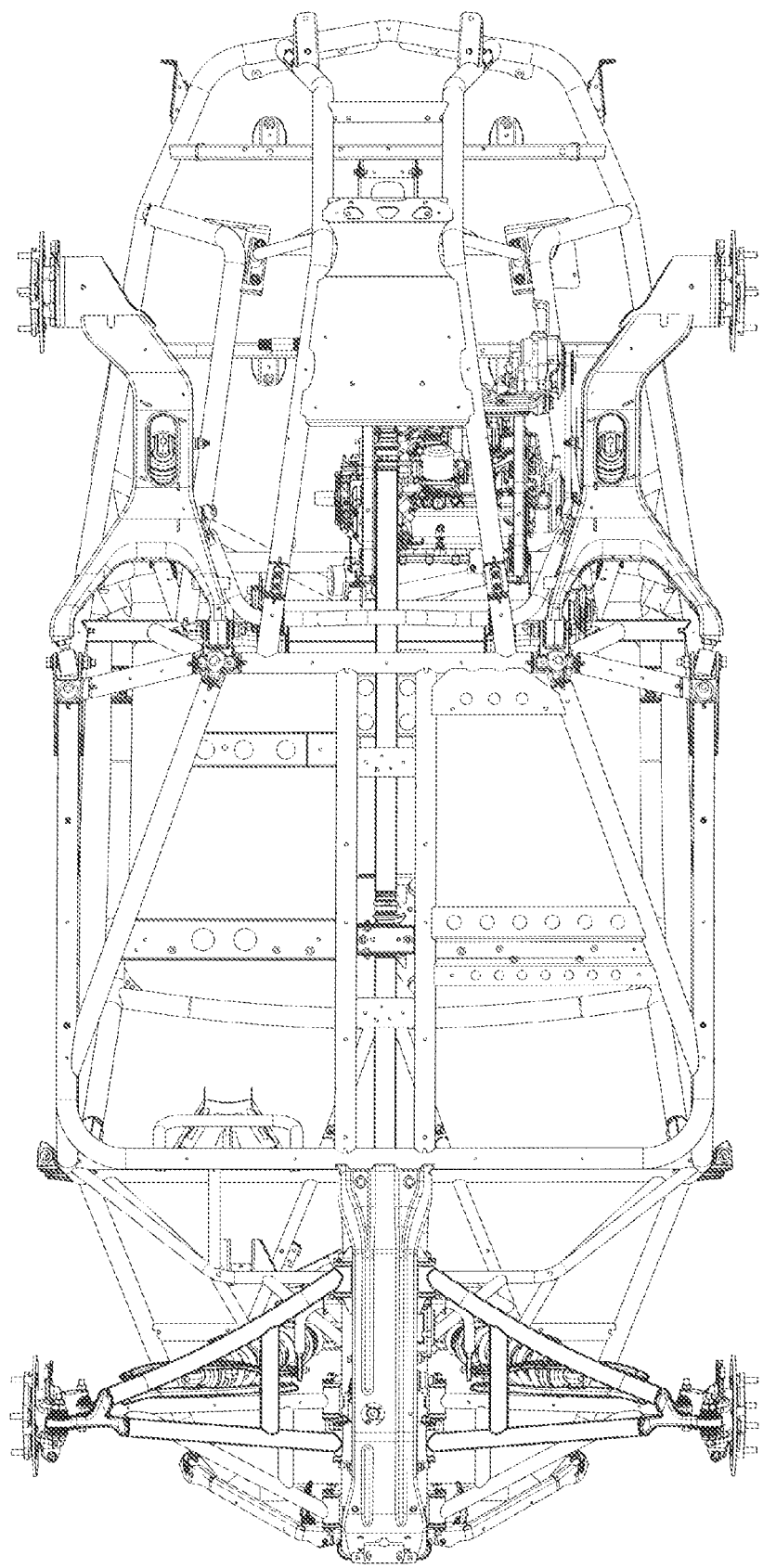
Figure 19:
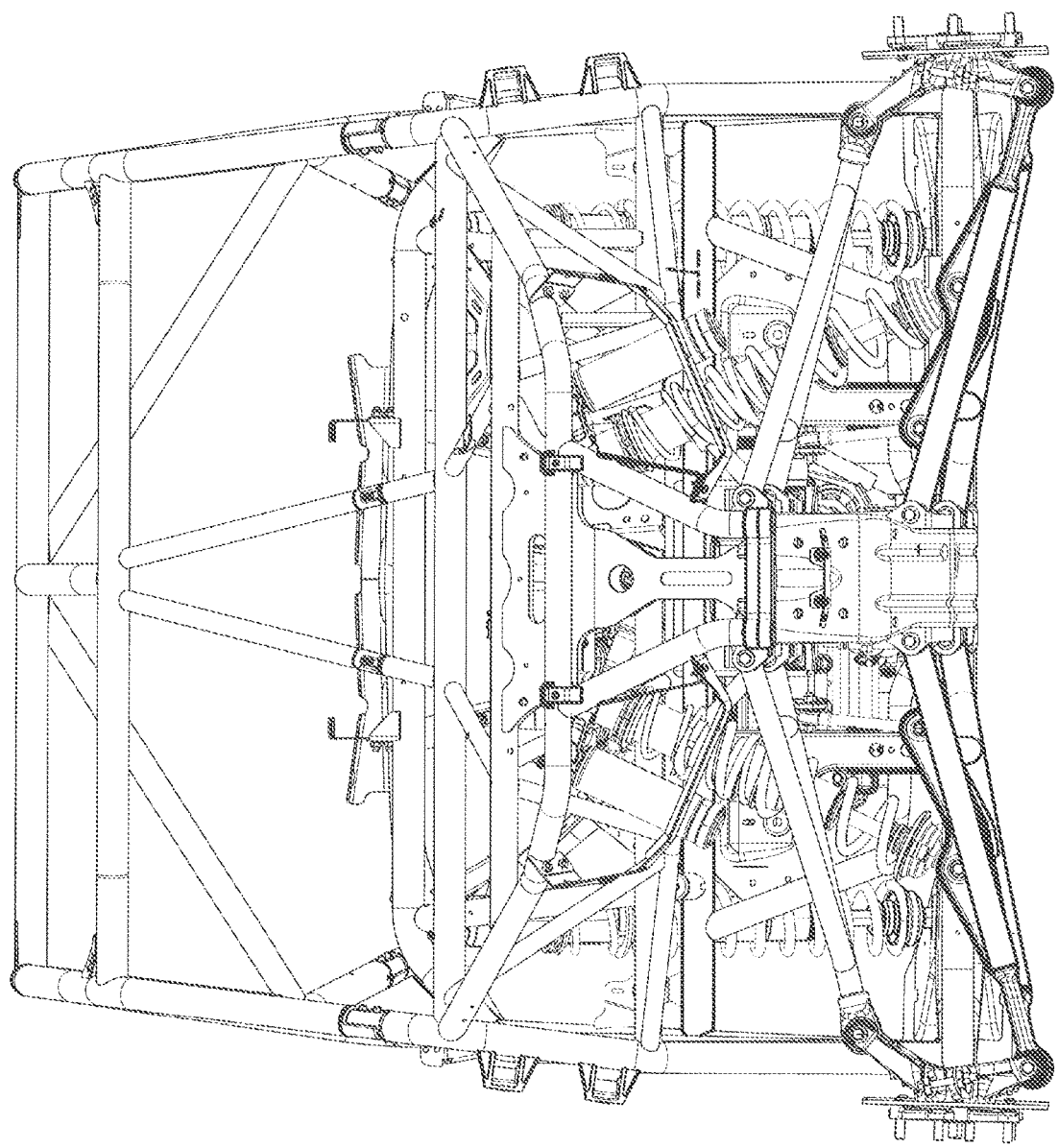
Figure 20:
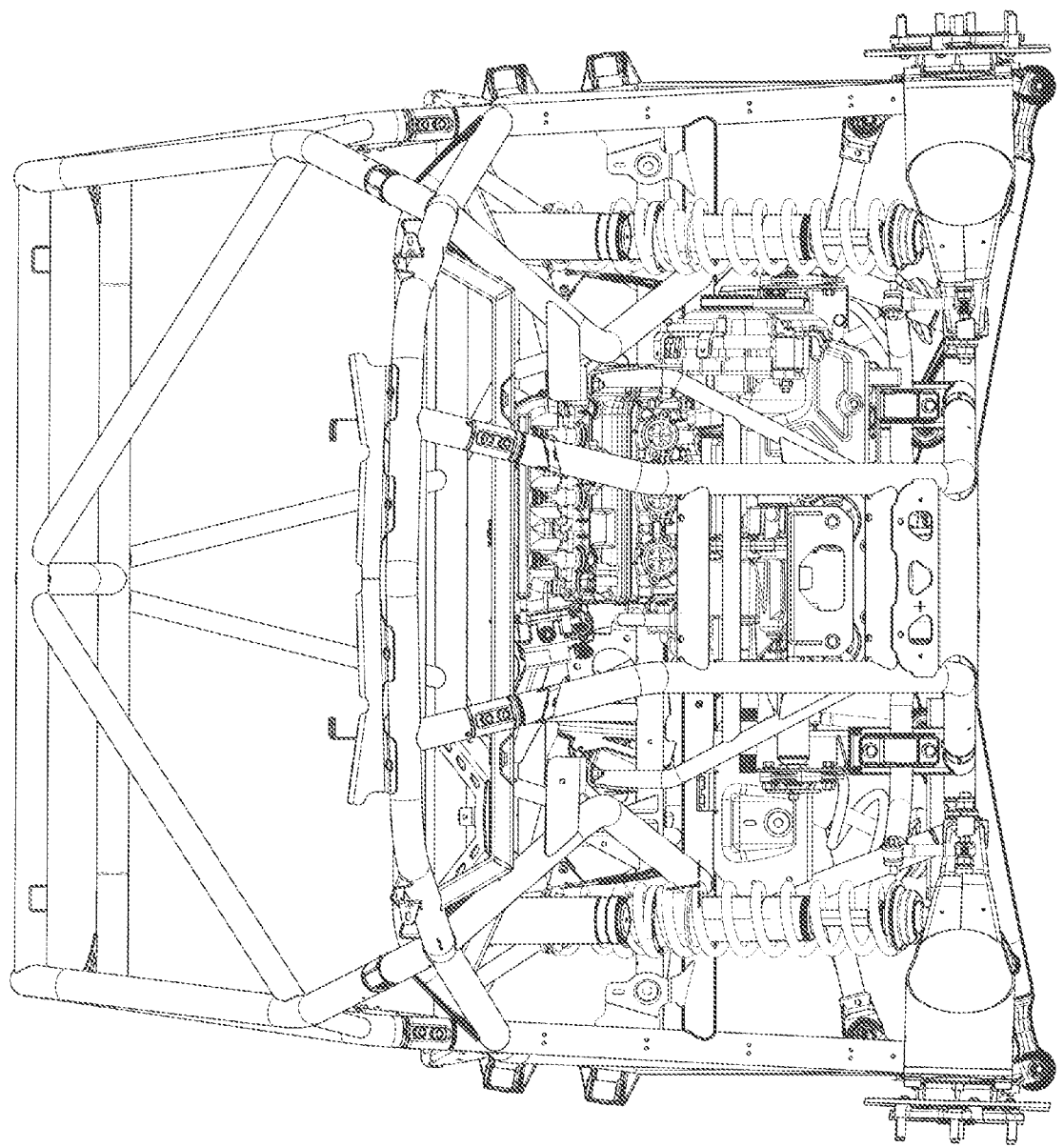

As shown in FIG. 17, in some embodiments, the rear transmission support member 462 is coupled to rear inner lengthwise frame member(s) 300 (FIG. 40) via lengthwise frame member brackets 488 (FIG. 17).

Figure 26:
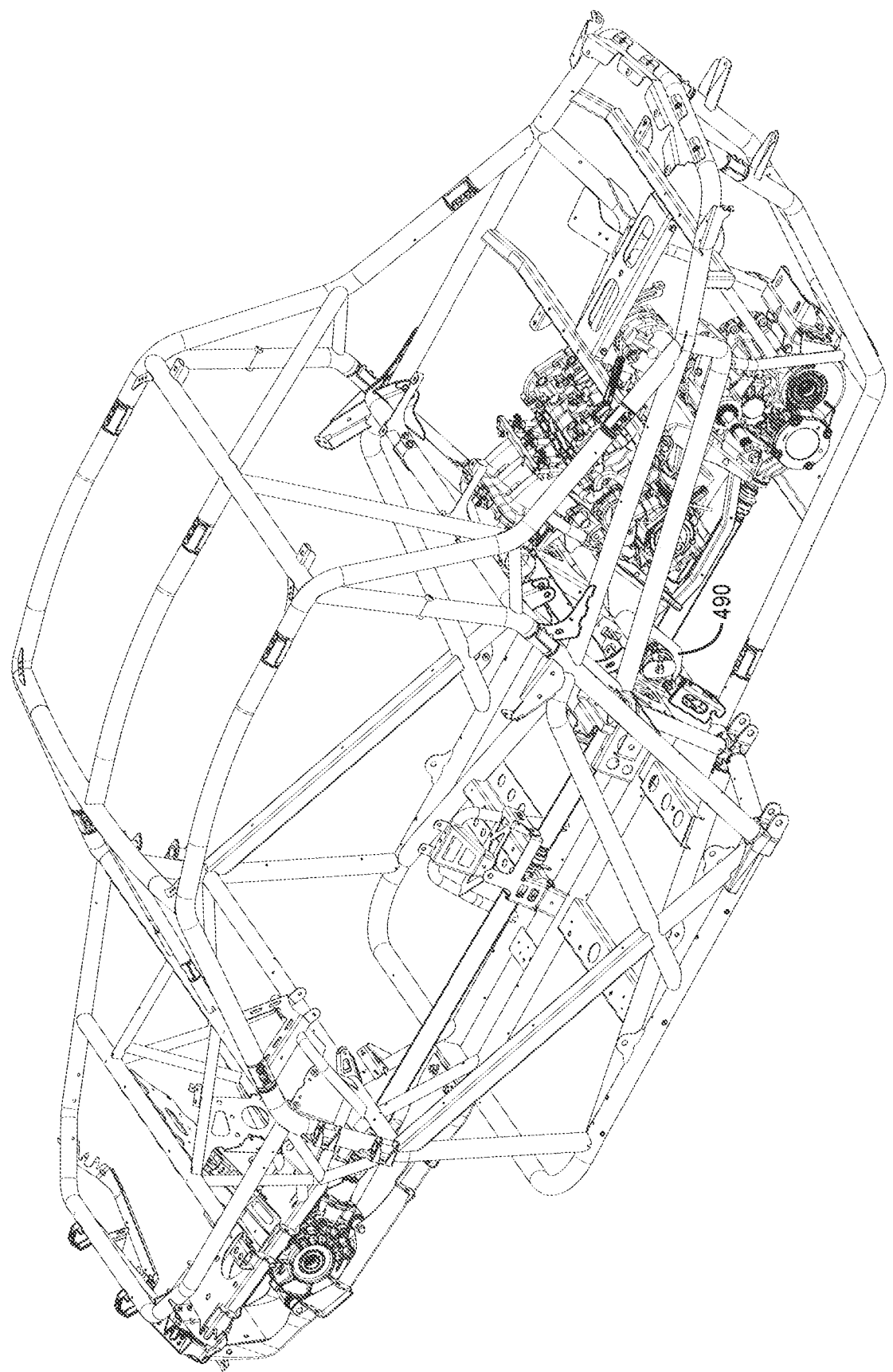
Figure 27:
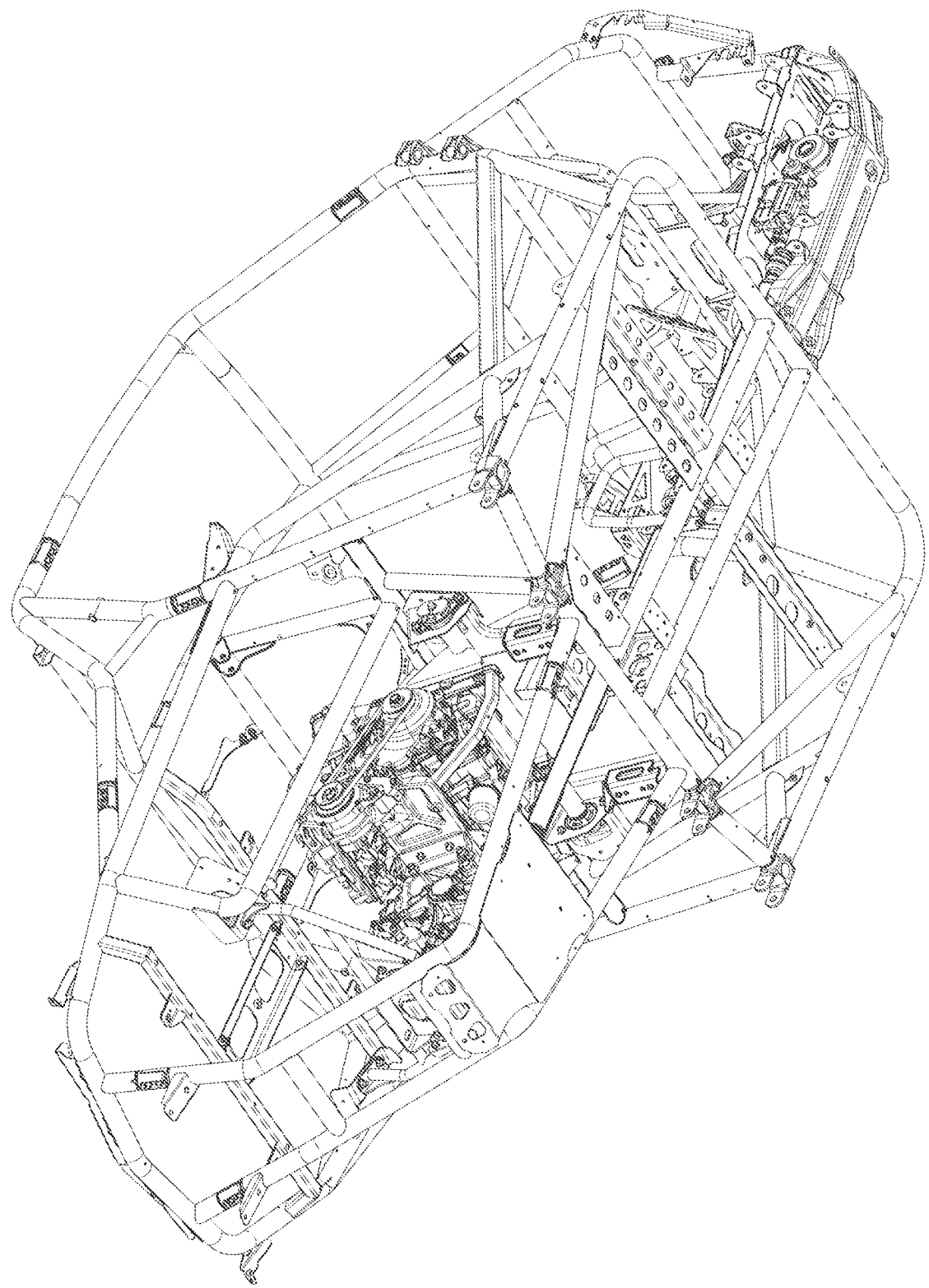
Figure 28:
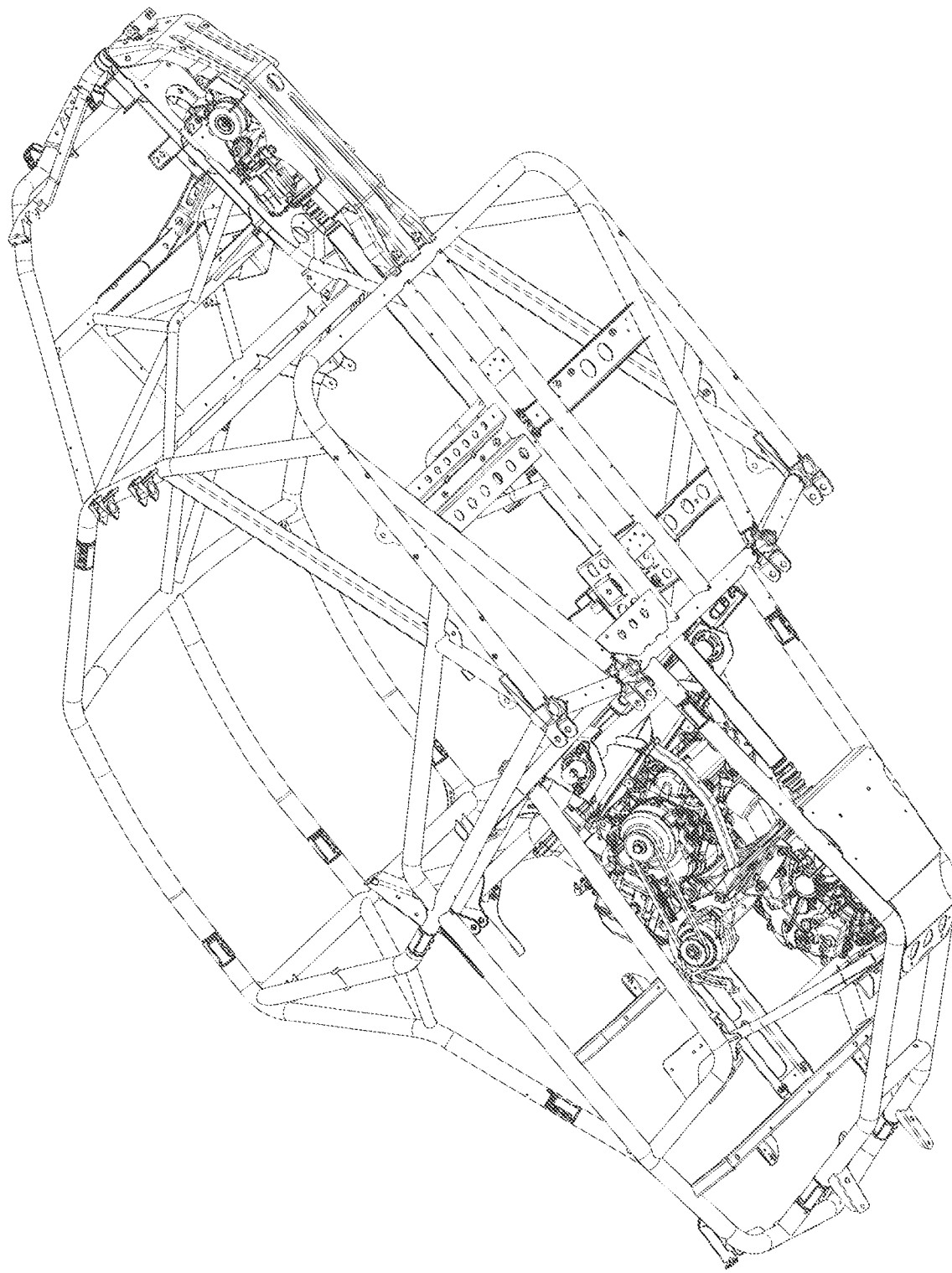

In some embodiments, the cradle support 456 (FIG. 51) is coupled to mount member(s) 490 (FIGS. 24 and 26) via front isolators 466 (FIG. 51). In some embodiments, the mount member(s) 490 are welded to the main frame 212.

Figure 21:
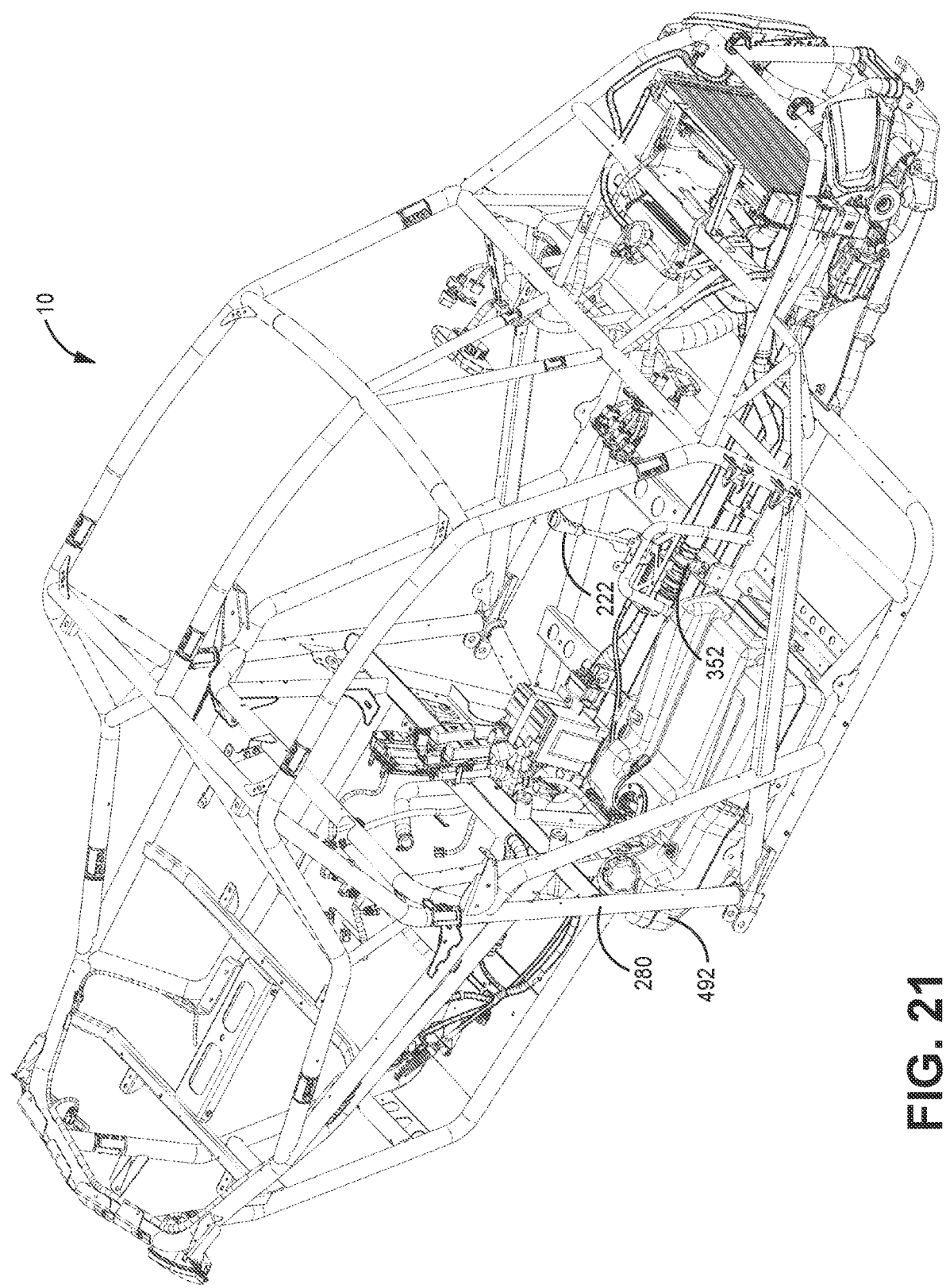
Figure 22:
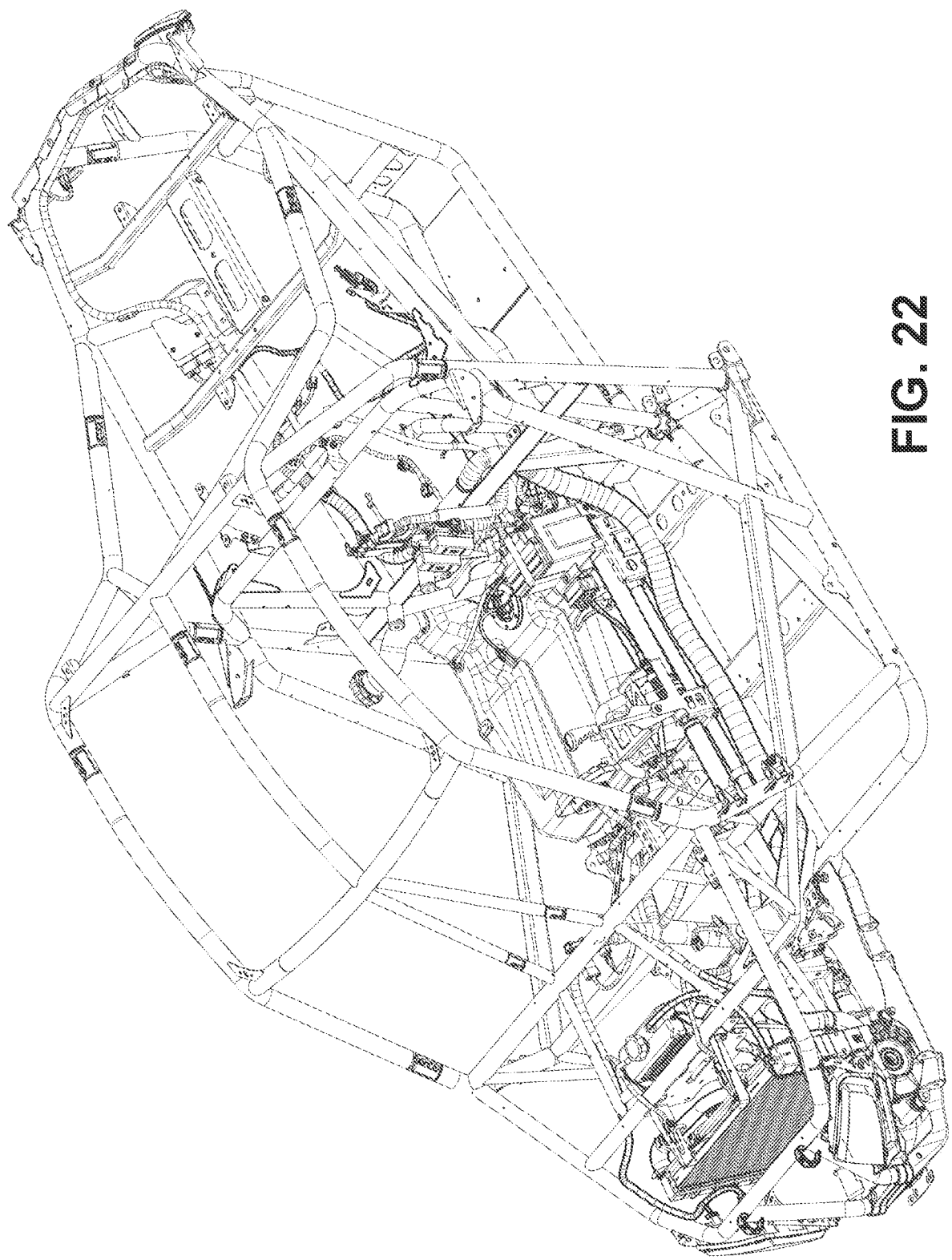
Figure 23:
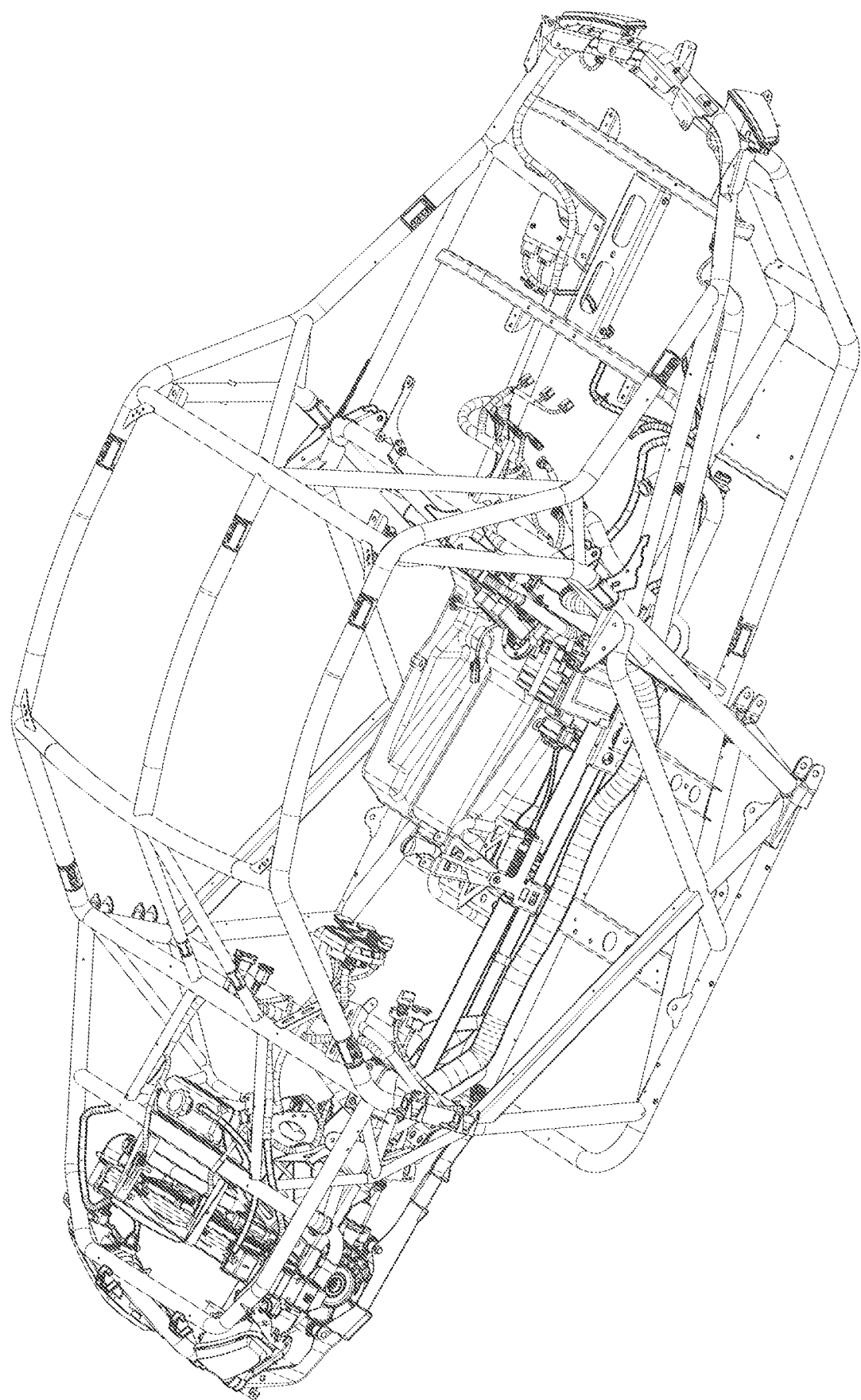

Turning to FIG. 21, in some embodiments, the off-road vehicle 10 includes a fuel tank 492. In some embodiments, a portion of the fuel tank 492 extends rearwardly of a portion of the rear outer upstanding support member 280. In some embodiments, a portion of the fuel tank 492 extends forwardly to the gear shift selector 222; in some embodiments, a portion of the fuel tank 492 extends forwardly of the bearing mount 352.

Figure 54:
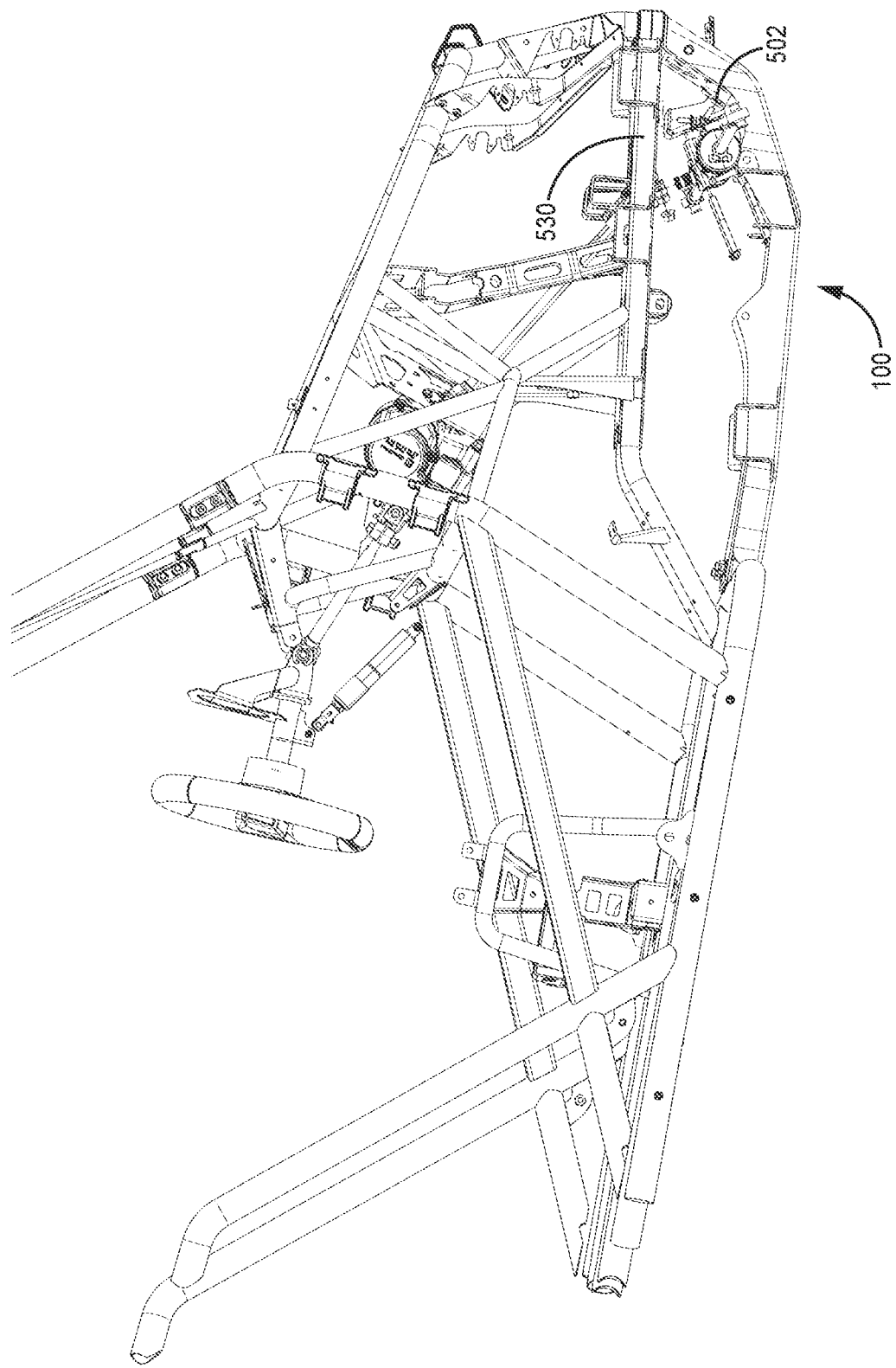
FIGS. 54-55 illustrate perspective views of steering components, according to some embodiments.
Figure 55:
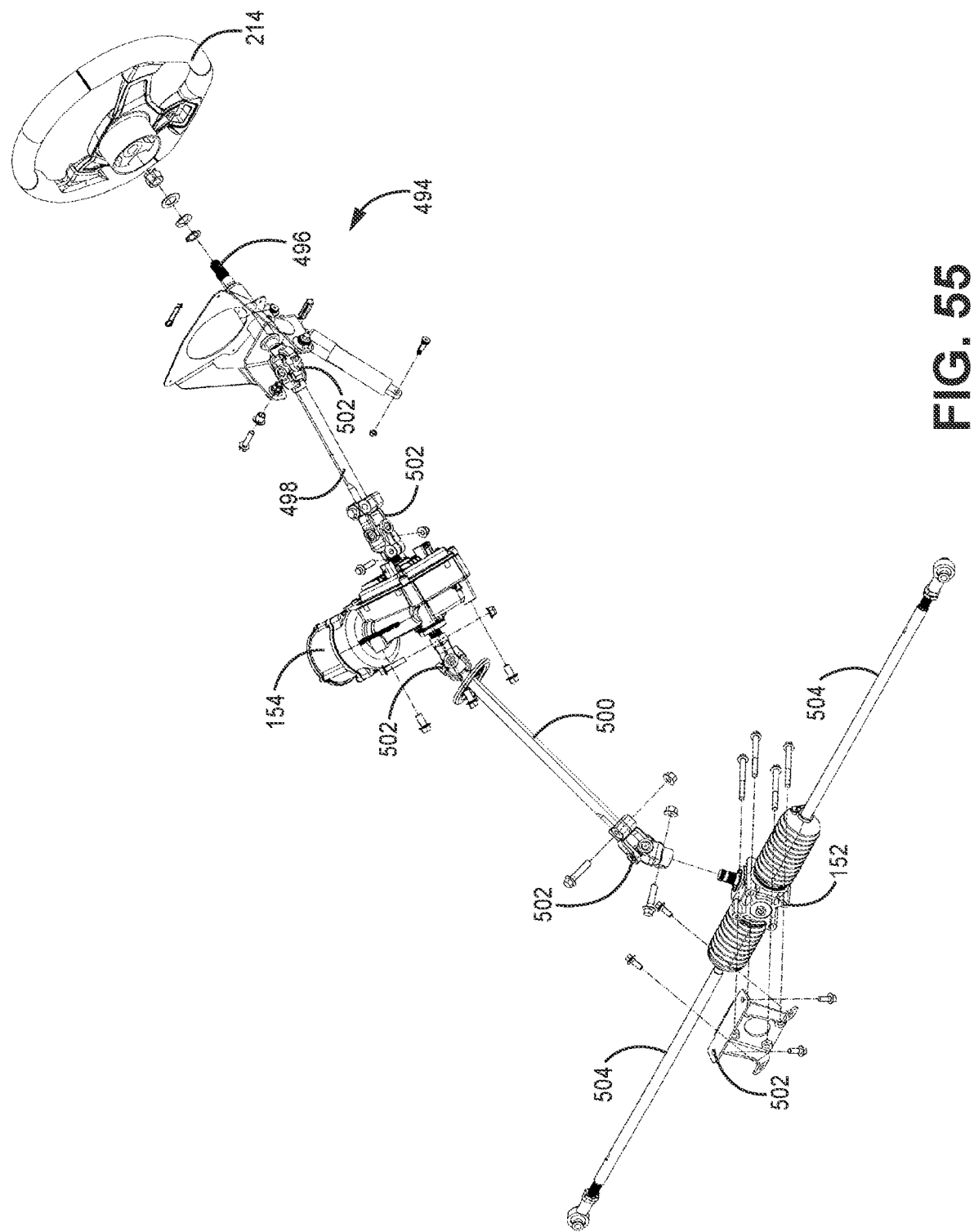

Turning to FIGS. 54 and 55, in some embodiments, a steering assembly 494 includes a steering wheel 214, a first steering shaft 496, a second steering shaft 498, and a third steering shaft 500. In some embodiments, the steering shafts are connected together via universal joints (u-joints) 502. In some embodiments, the steering assembly 494 further includes a steering rack 152 and power steering unit 154 (e.g., electric power steering or EPS). The steering assembly 494 includes tie rods 504 which, in turn, are respectively coupled to front knuckles 506 (FIG. 56).

In some embodiments, the steering rack 152 is coupled to a steering rack bracket 502. As shown in the partially exploded view in FIG. 54, the steering rack bracket 502 is coupled to the front subframe 100 and the front upper A-arm support member 330.

Figure 56:
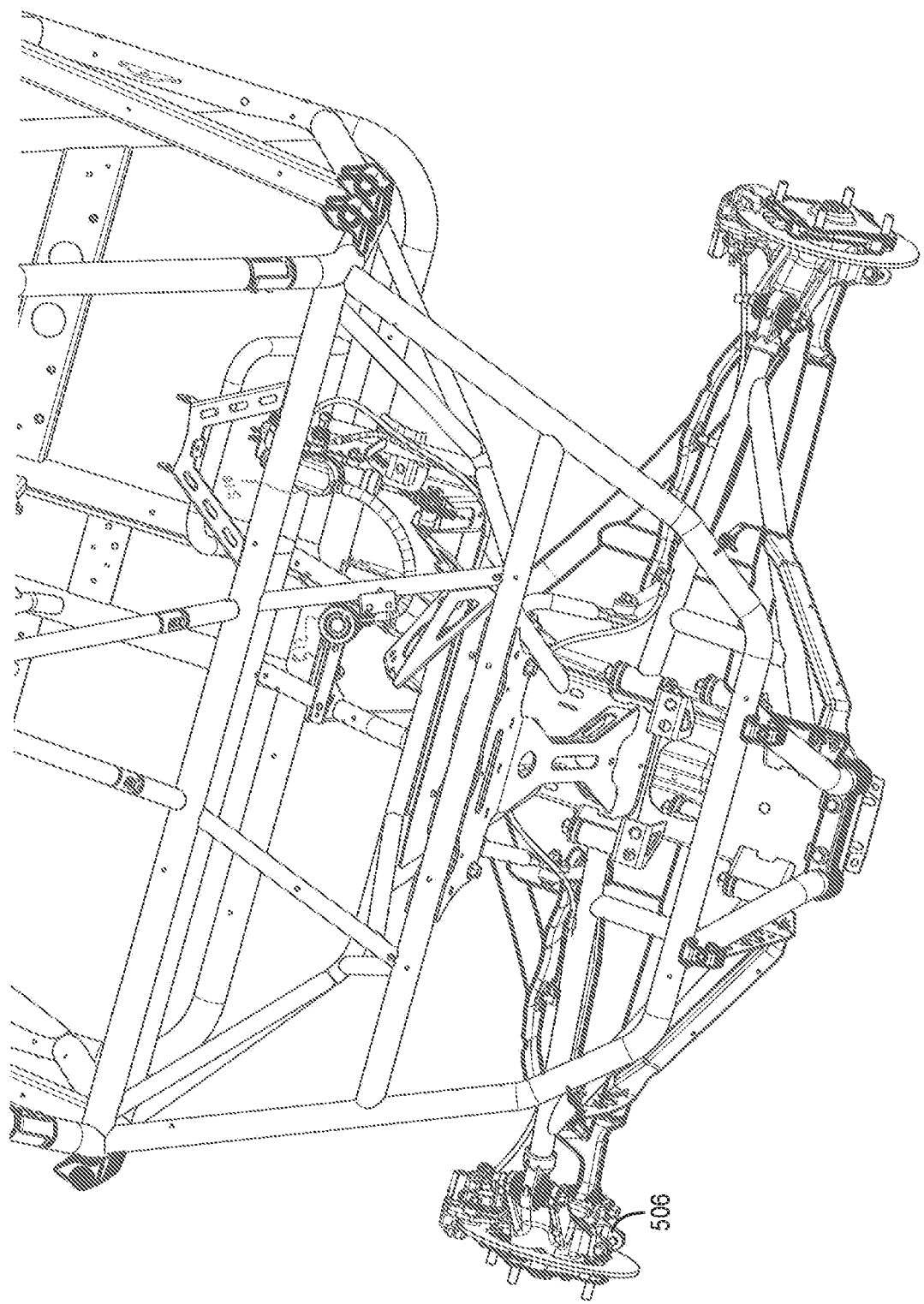
FIGS. 56-57 illustrate perspective views of a brake system, according to some embodiments.
Figure 57:
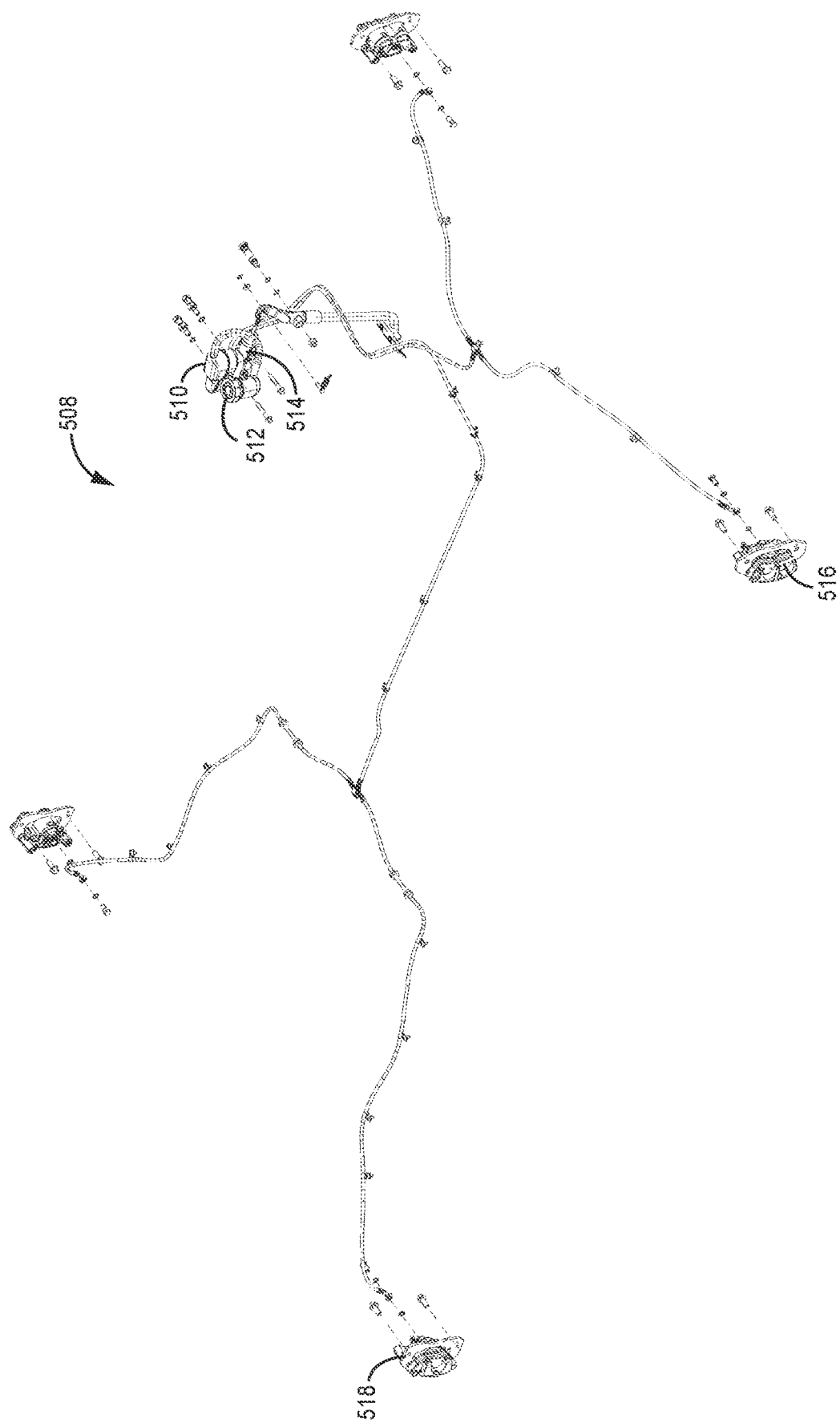
Figure 58:
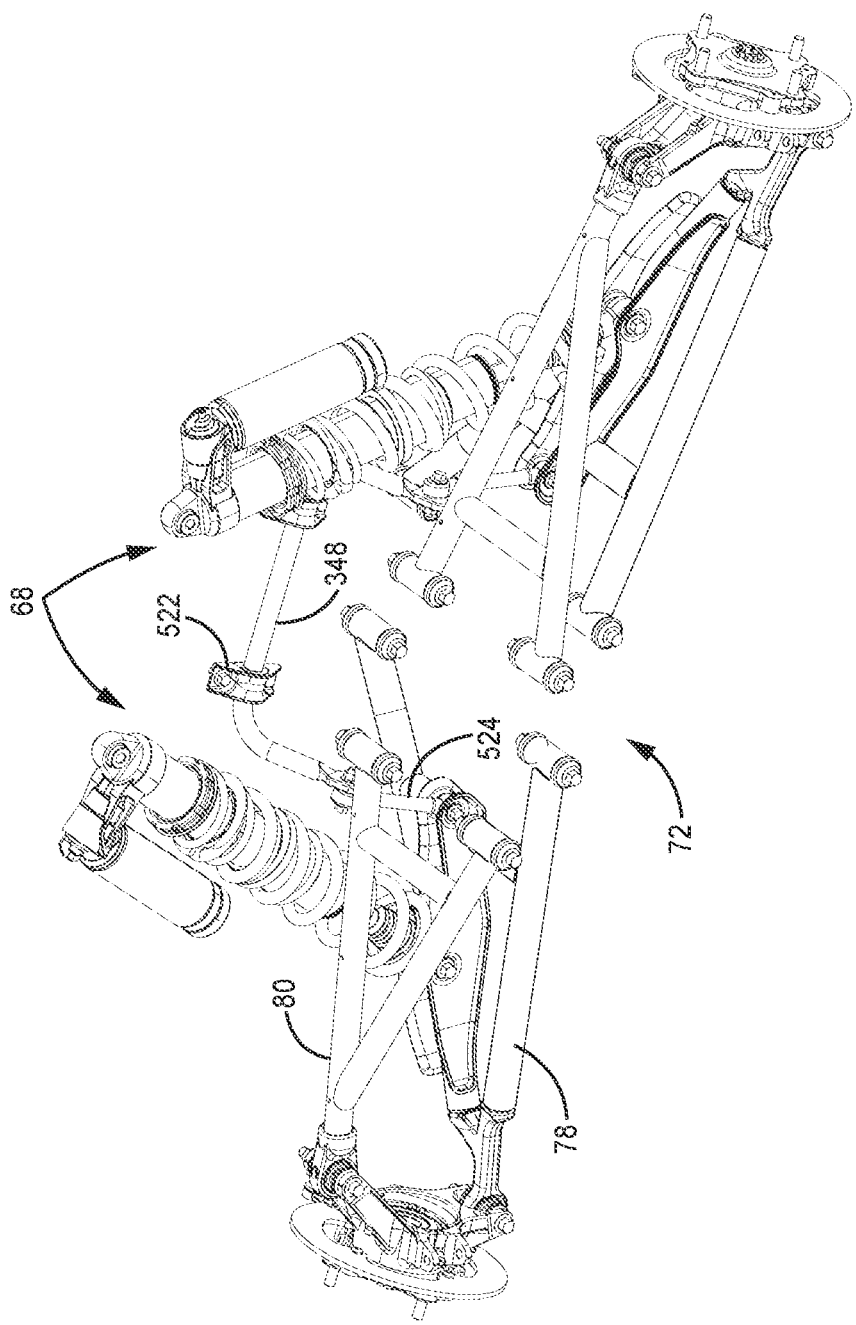
FIGS. 58-66, 91-92 illustrate perspective views of a suspension system, according to some embodiments.
Figure 59:
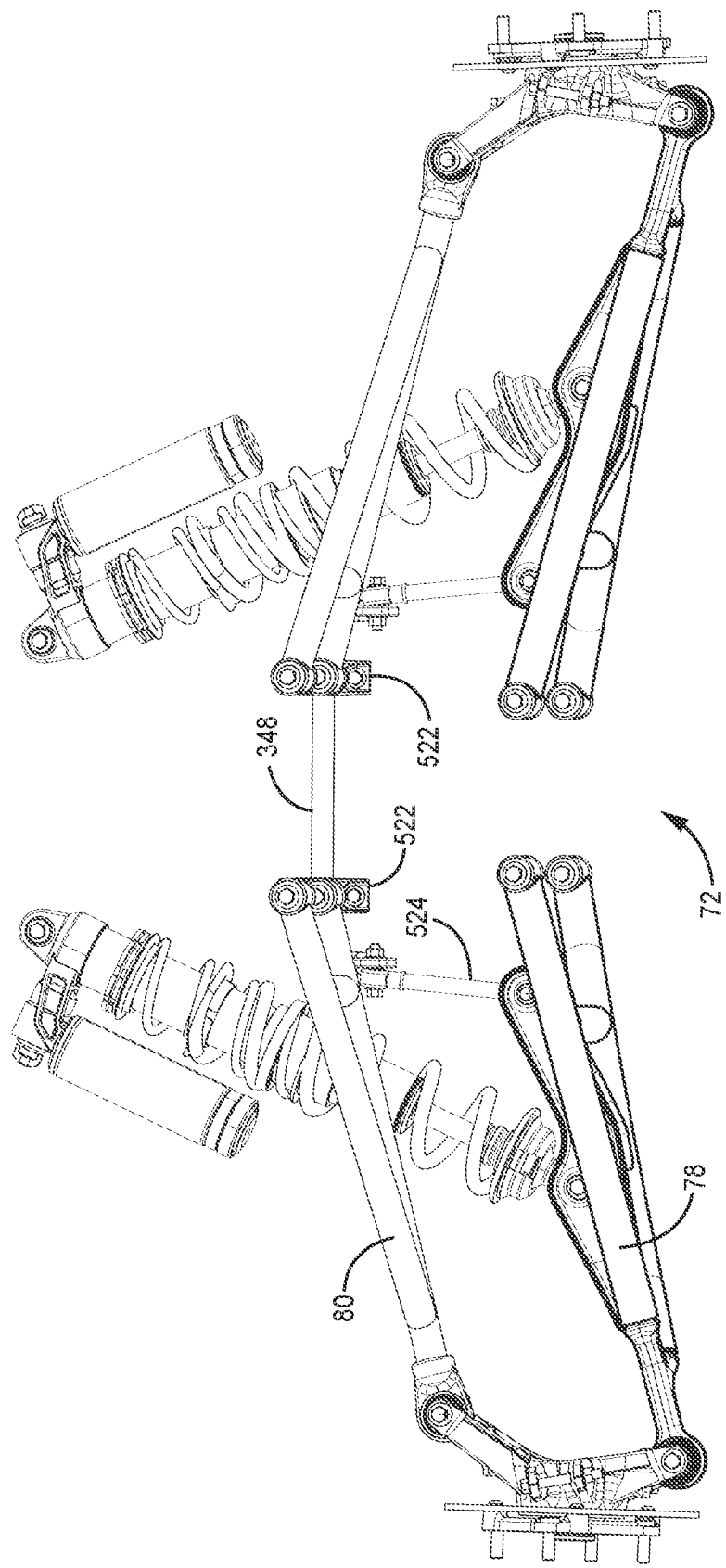
Figure 60:
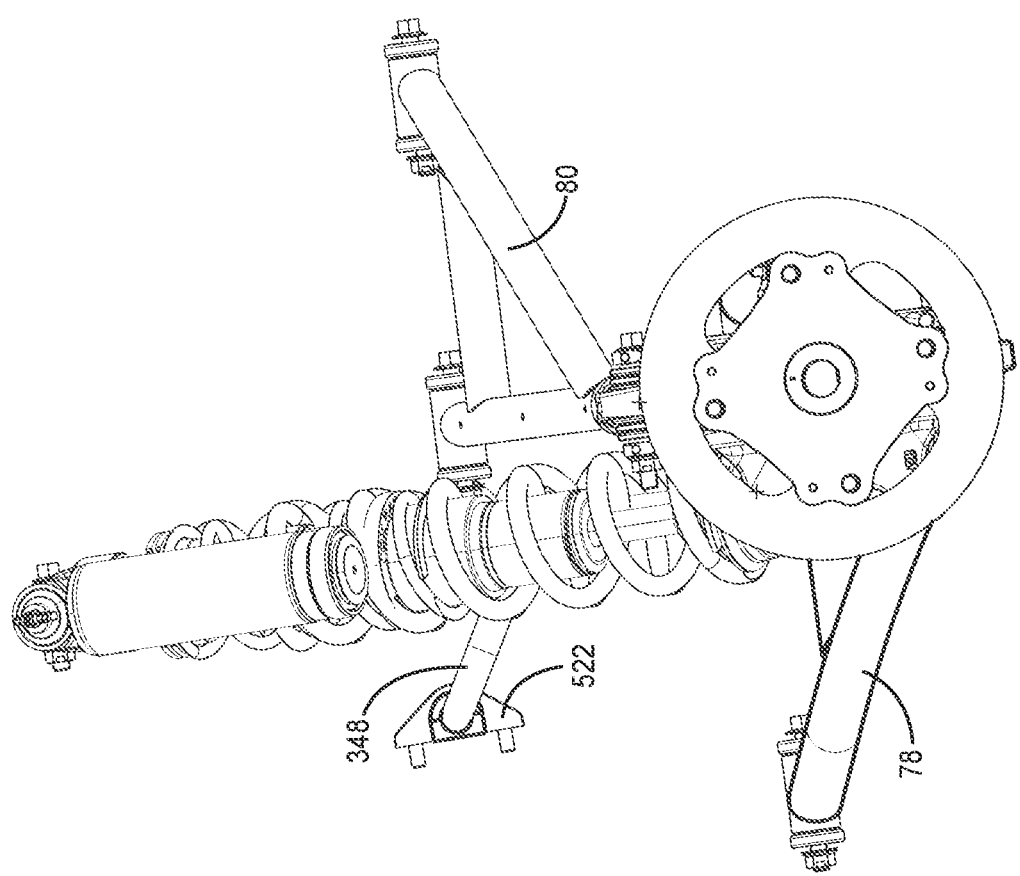

With regard to FIGS. 56 and 57, in some embodiments, a brake system 508 includes a first fluid reservoir 510 and a second fluid reservoir 512. In some embodiments, the second fluid reservoir 512 is a remote fluid fill reservoir. In some embodiments, the first fluid reservoir 510 is positioned above the master cylinder 514. In some embodiments, brake fluid is supplied to brake calipers, including front brake calipers 516 and rear brake calipers 518. In some embodiments, the front calipers 516 are each two-piston calipers and the rear calipers 518 are each single-piston calipers, however, the calipers (front and/or rear) can be of any suitable size and have any suitable number of pistons. Further, in some embodiments, the calipers can be integrated with anti-lock brake sensors.

Figure 16:
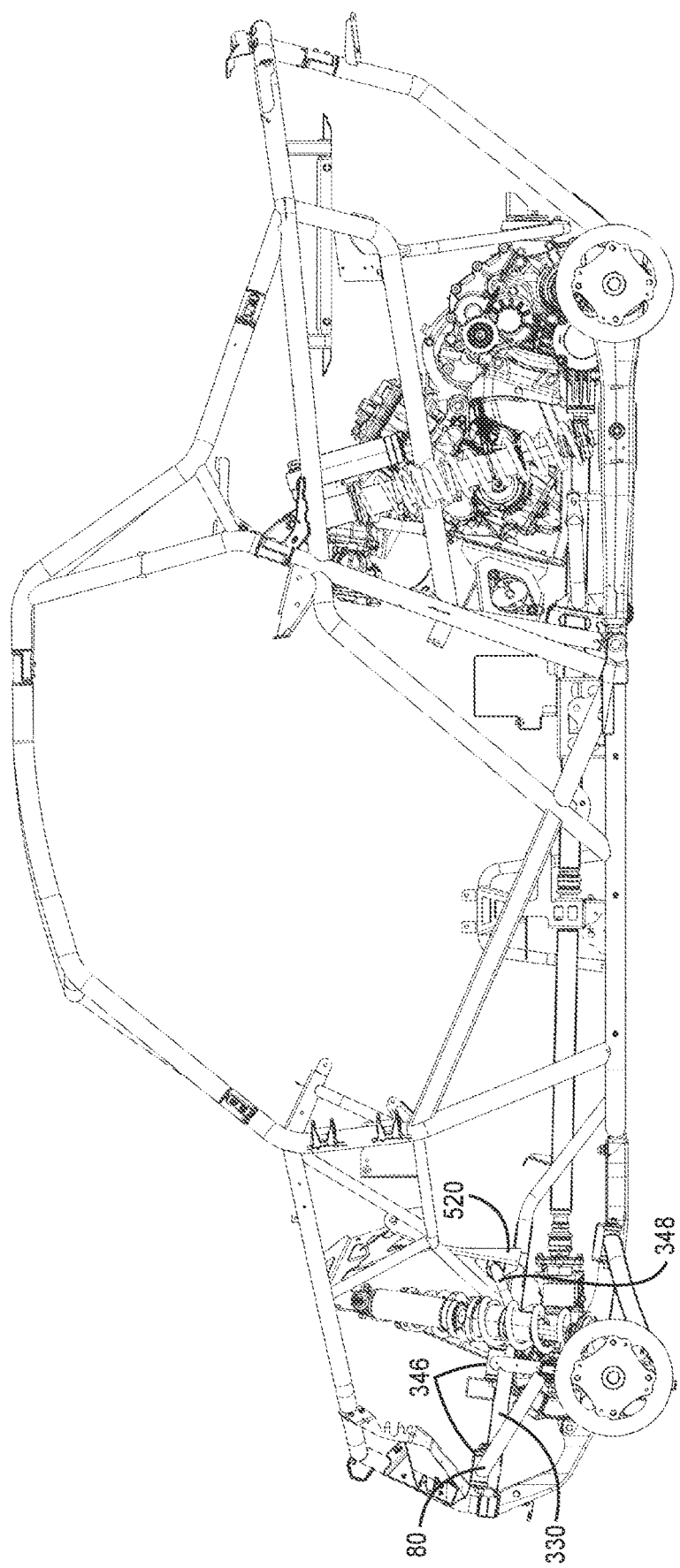
Figure 29:
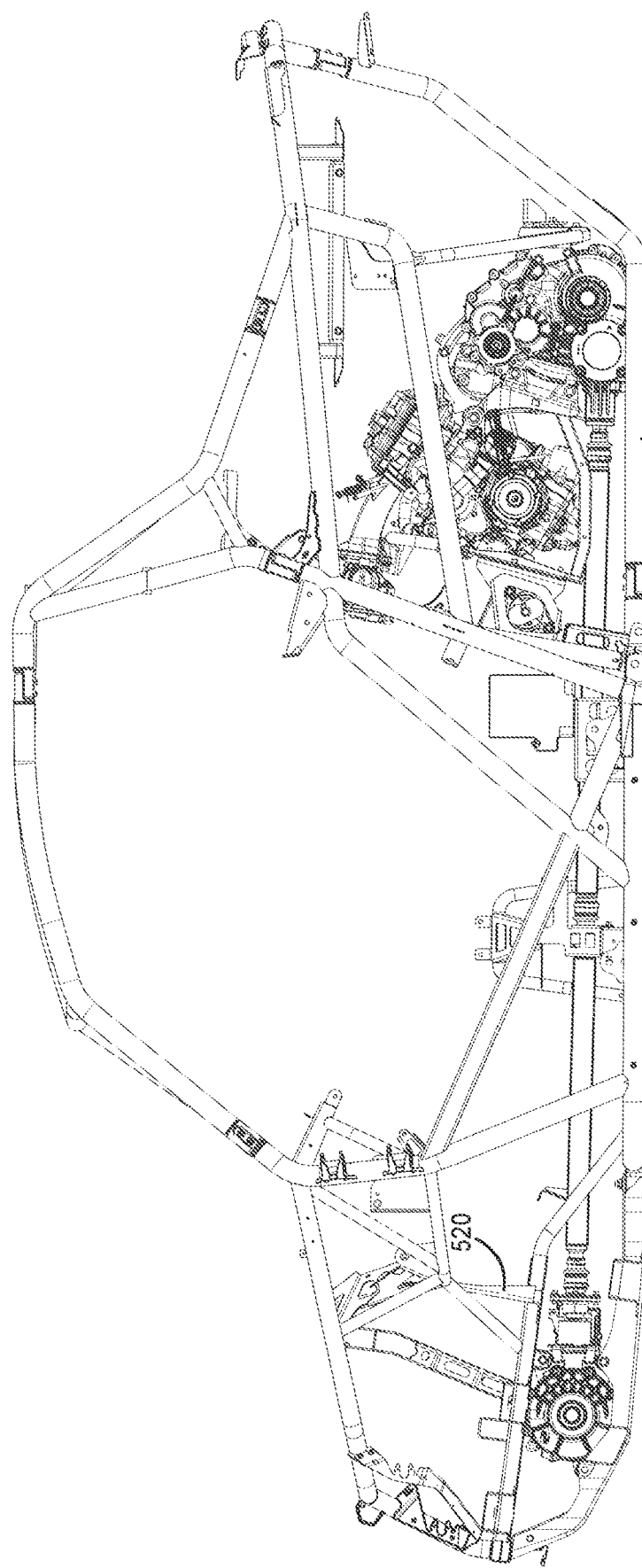
Figure 61:
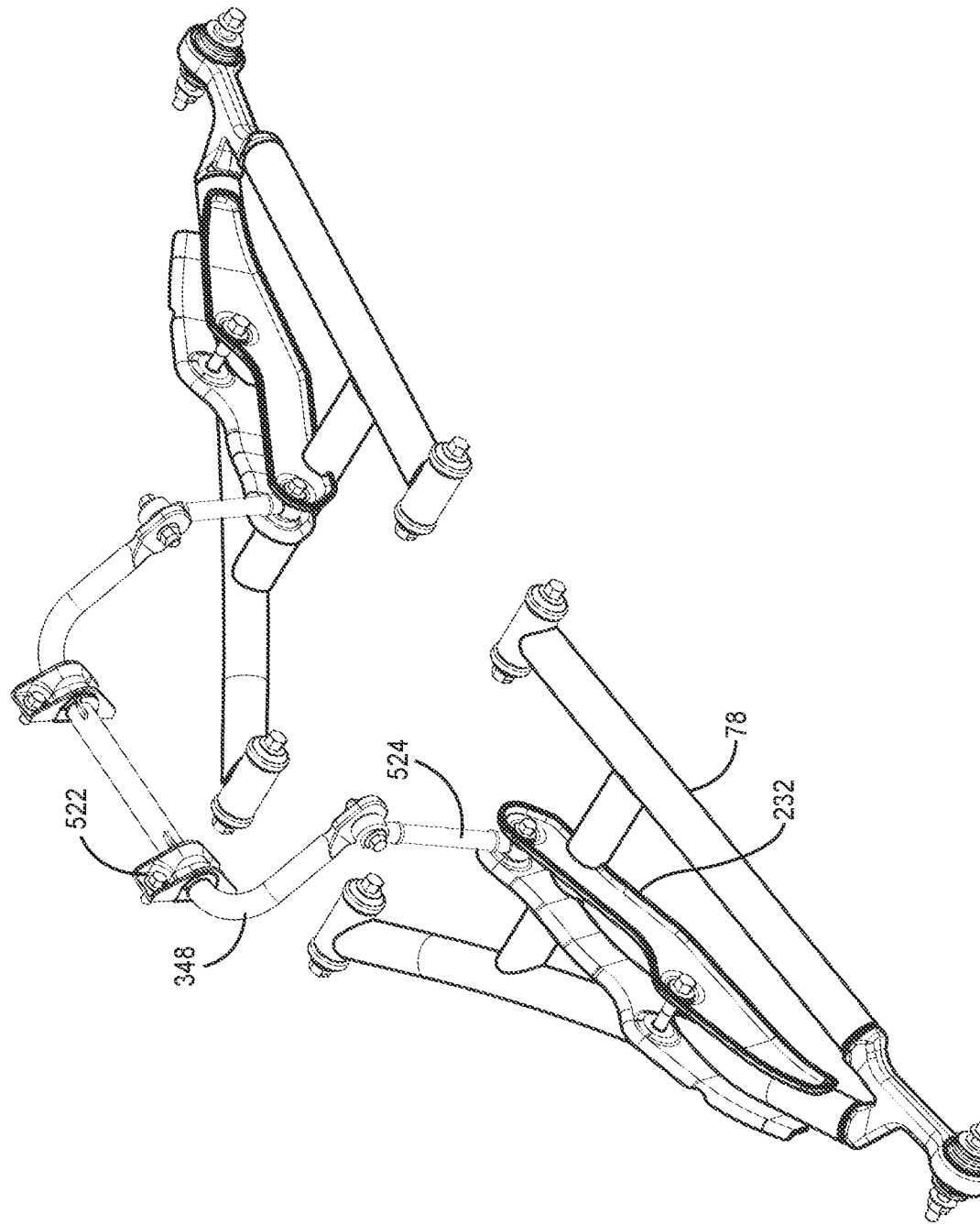
Figure 62:
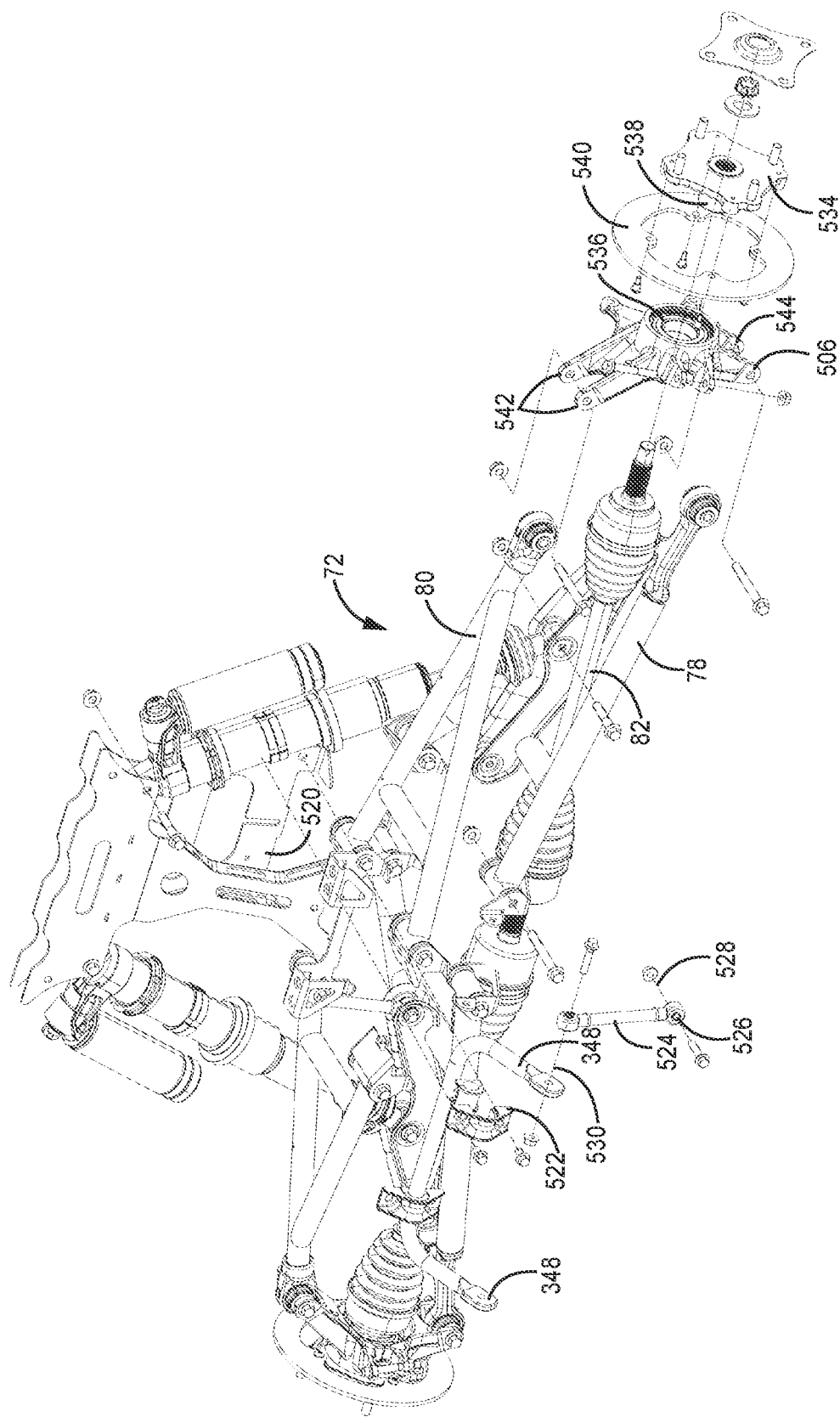
Figure 63:
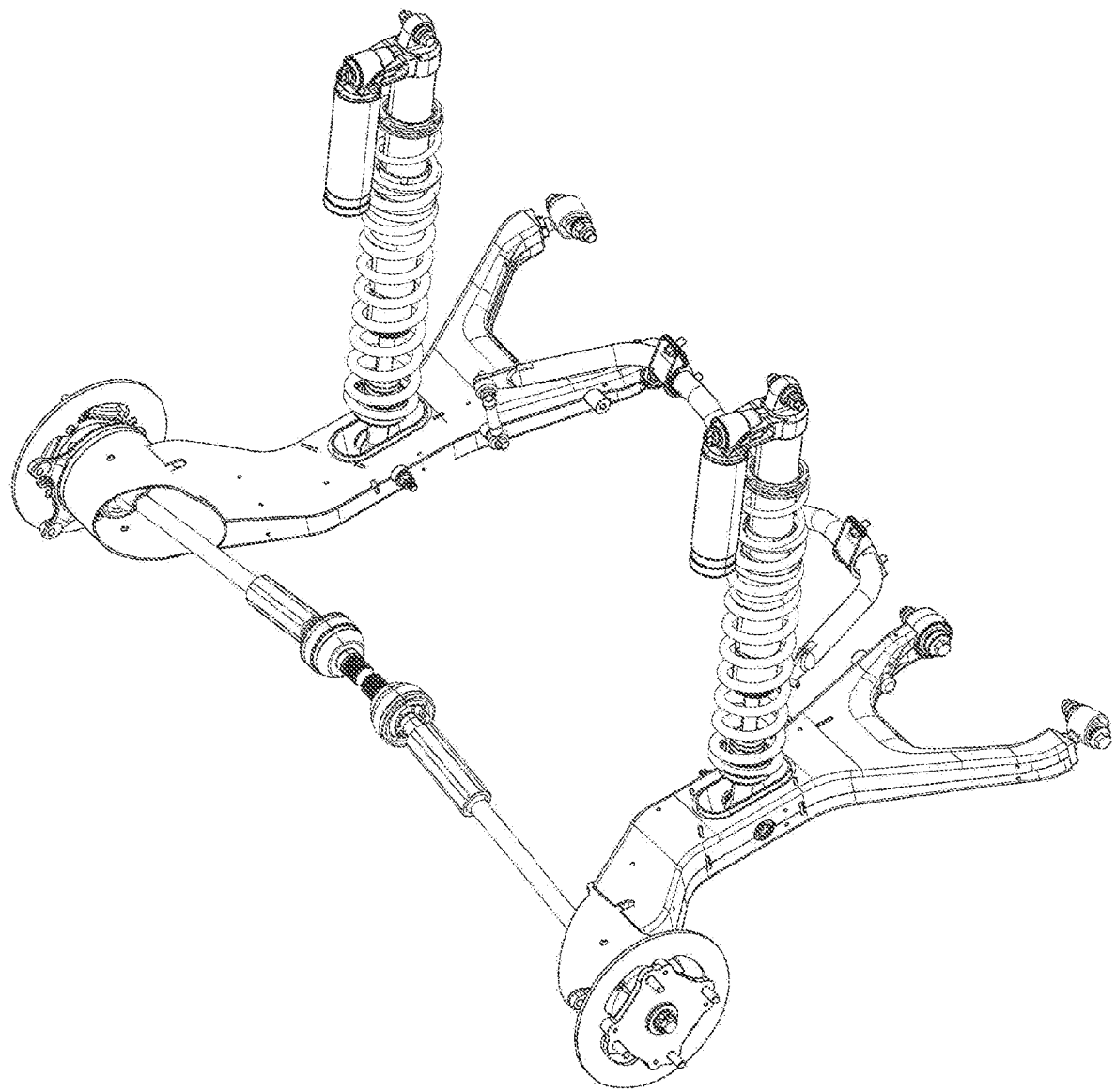
Figure 64:
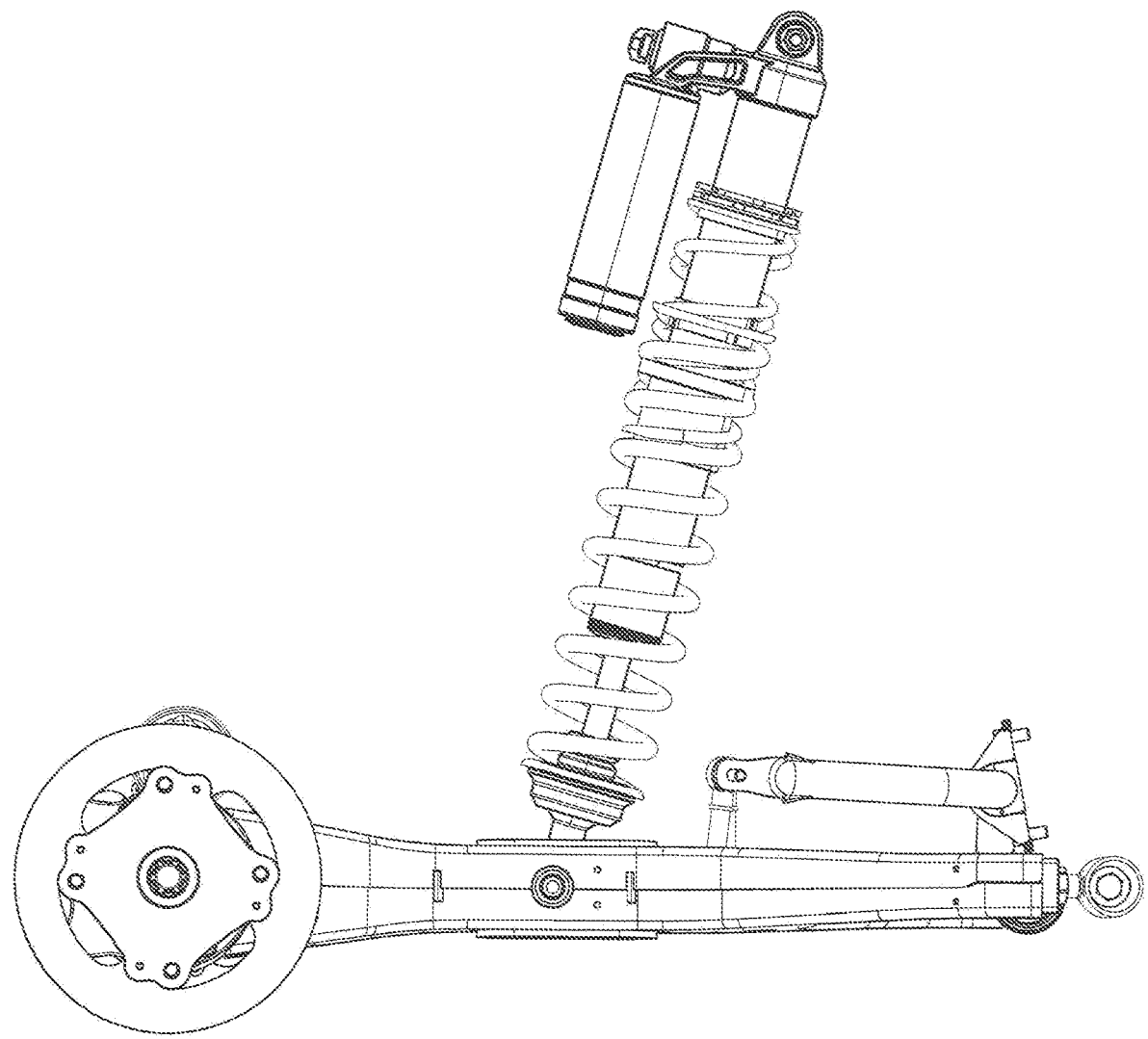
Figure 65:
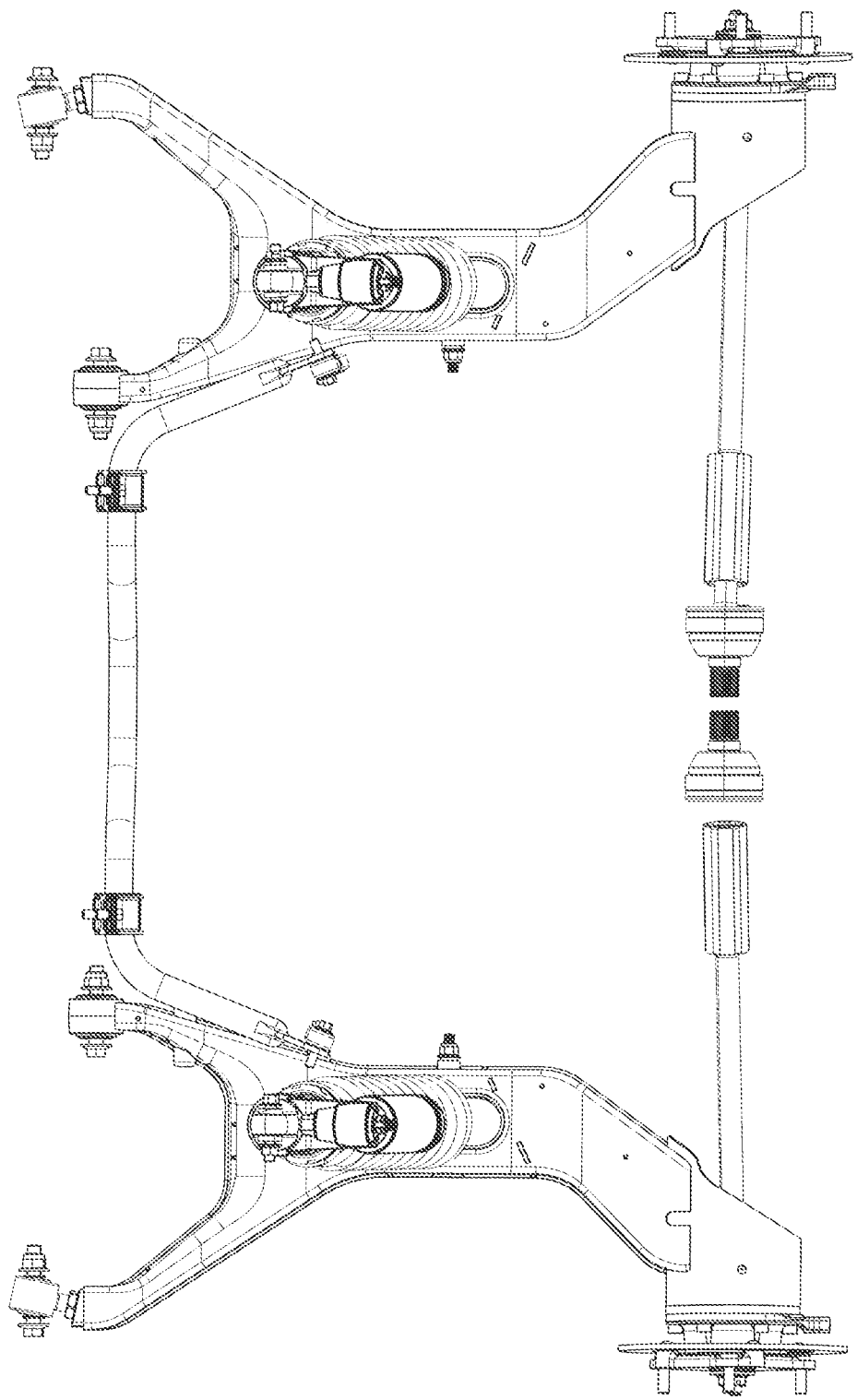
Figure 66:
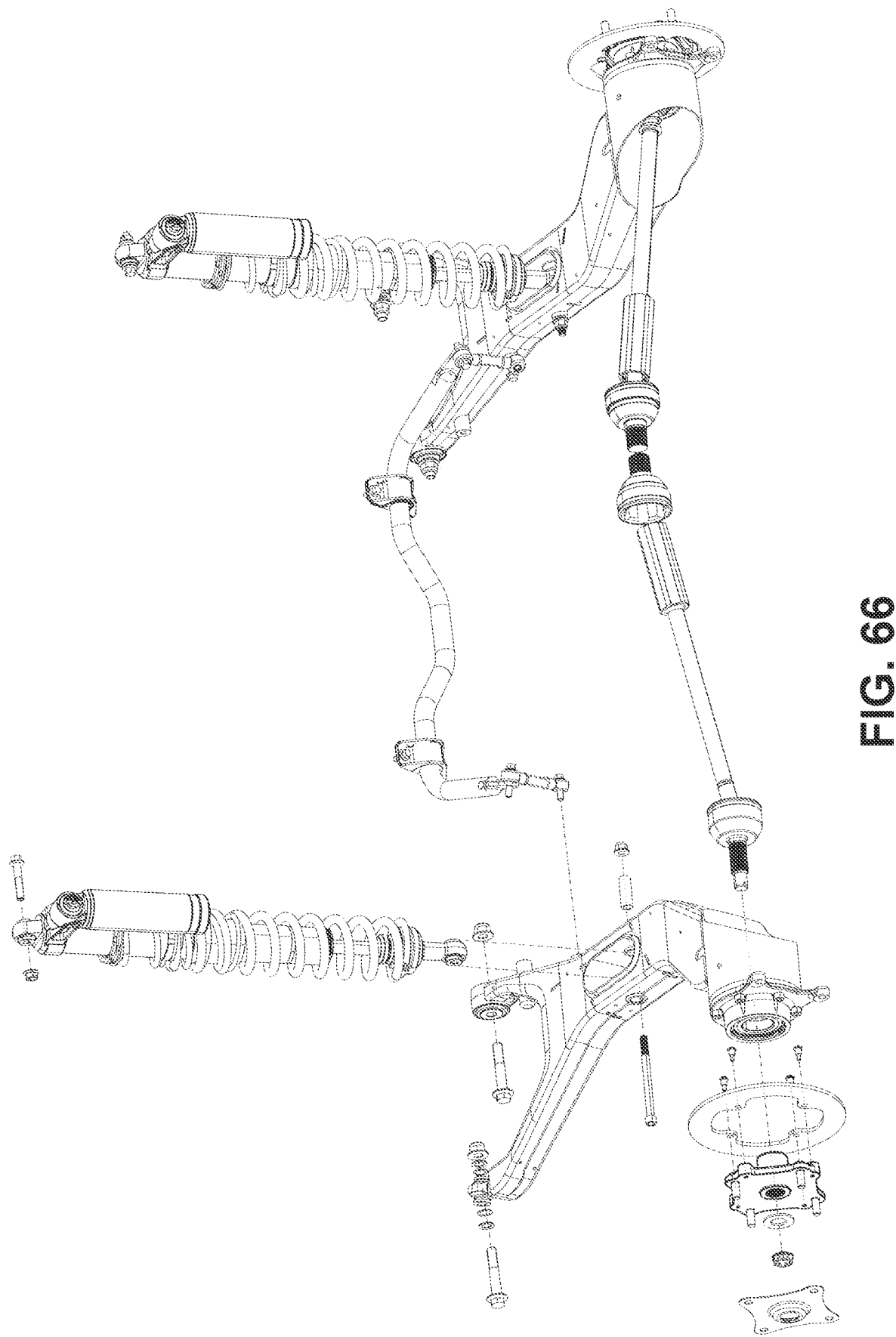
Figure 67:
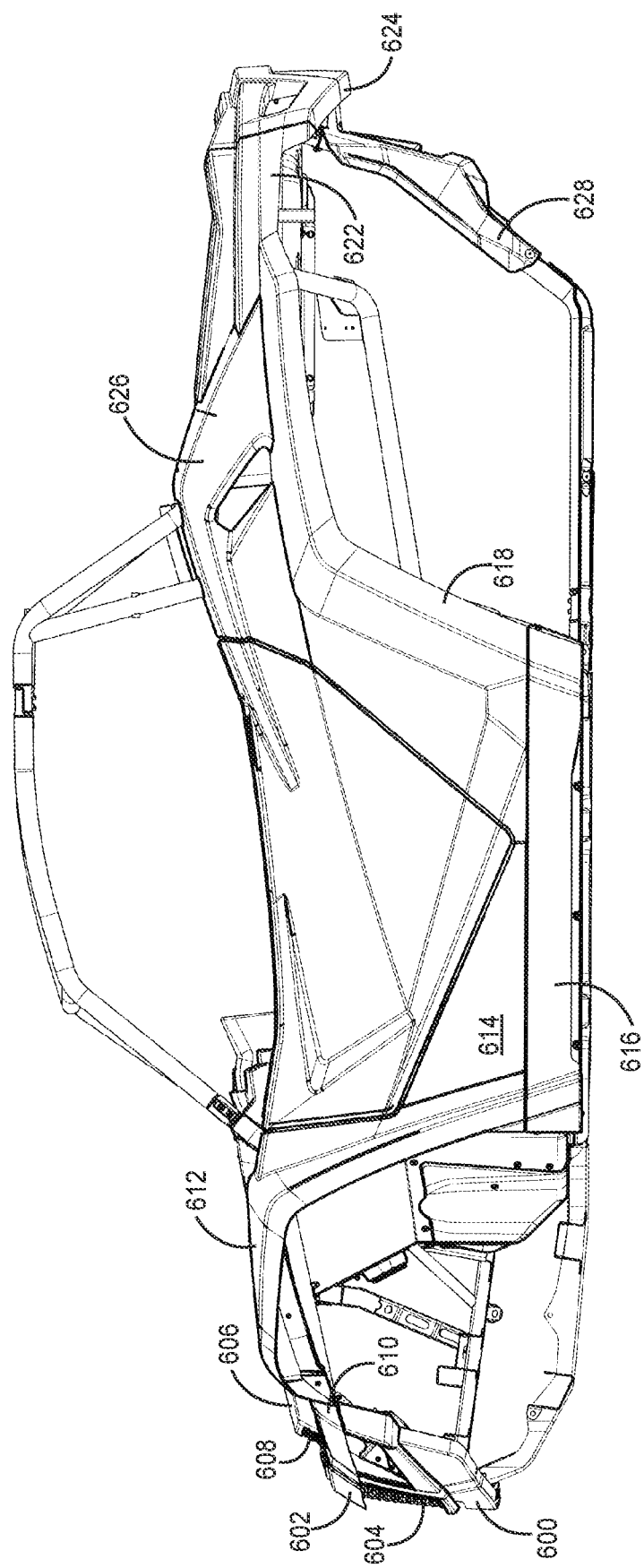
FIGS. 67-84 illustrate perspective views of body panels, cowls, skid plates, and doors of an off-road recreational vehicle, according to some embodiments.

Regarding FIGS. 58-62, 91, and 92, in some embodiments, a front suspension assembly 72 includes upper A-arms 80, lower A-arms 78, coil-over springs 68, and front anti-roll bar (ARB) 348. In some embodiments, the upper A-arms 80 are movably coupled to the front upper A-arm support member 330 (FIG. 97), for example via upper A-arm mount(s) 346 (FIG. 16). In some embodiments, the front anti-roll bar 348 is coupled to the lower A-arms 78. Further, the coil-over springs 68 are coupled to the lower A-arms rearwardly of the upper A-arms 80. In some embodiments, the front anti-roll bar 348 is rotatably coupled to front ARB support member 520 (FIGS. 16 and 29), via front ARB hangar(s) 522 (FIGS. 16, 58, 60 and 61). In some embodiments, the lower A-arms 78 are coupled to the anti-roll bar 348 via front ARB links 524. In some embodiments, the front ARB links 524 include spherical joints 526 at one or both ends thereof, as shown in FIG. 62, for example. As also shown in FIG. 62, in some embodiments, the spherical joints 526 each have a nominal axis (528, 530) though which a fastener is inserted. In some embodiments, the nominal axes 528 and 530 are non-parallel and, in some embodiments, are perpendicular to one another.

In some embodiments, for example as shown in FIG. 61, the front ARB links 524 are coupled to a central support 532 which extends intermediate the forward and rearward arms of the lower A-arm 78. In some embodiments, respective coil-over springs 68 are further coupled to the central support 532 outwardly of the location where the front ARB links 524 couple to the central support 532.

With regard to FIG. 62, in some embodiments, a front half-shaft 82 is coupled to a wheel hub 534 such that external splines on the front half-shaft 82 interact with internal splines on the wheel hub 534 to thereby drive the wheel hub 534. In some embodiments, a front knuckle 506 includes an inner bearing 536; an inner portion 538 of the wheel hub 534 rides on the inner bearing 536. In some embodiments, a brake rotor 540 is coupled to the wheel hub 534 inwardly of the flange portions of wheel hub 534.

Figure 91:
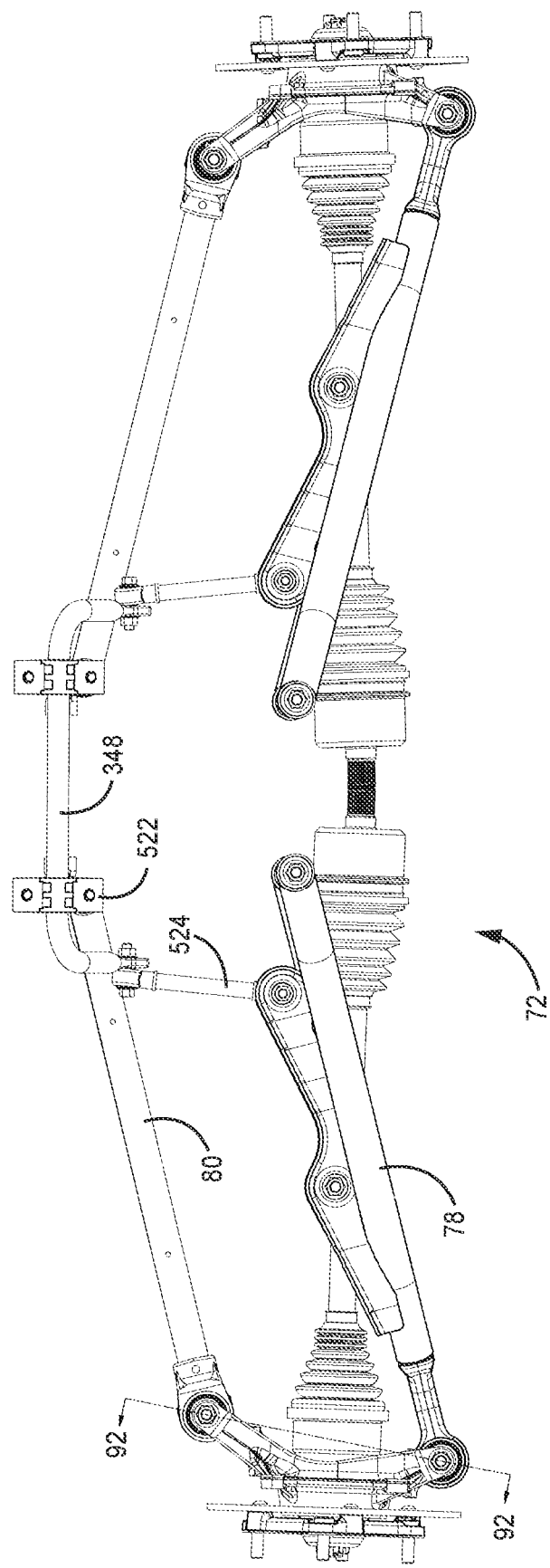
Figure 92:
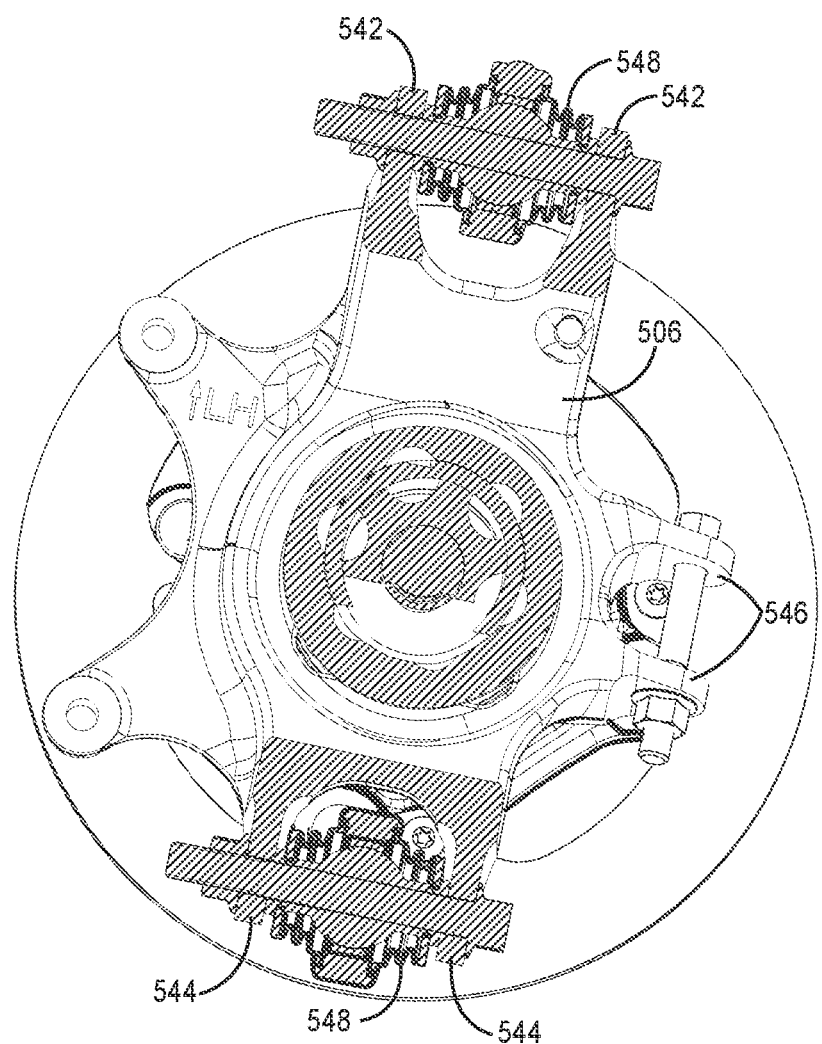

In some embodiments, the lower A-arms 78 and upper A-arms 80 include spherical bearings at ends thereof. In some embodiments, the spherical bearings at the ends of the respective A-arms fit between opposing knuckle arms. In particular, as shown in FIGS. 62, 91, and 92, the spherical bearings of the upper A-arms 80 fit between upper knuckle arms 542 and the spherical bearings of the lower A-arms 78 fit between lower knuckle arms 544. In some embodiments, the inside surfaces of the upper knuckle arms 542 and the inside surfaces of the lower knuckle arms 544 are machined surfaces in order to maintain tolerances and permit the desired fit with the knuckle's interface with the spherical bearings, as shown in FIG. 92. As shown in FIG. 92, the knuckle arms (542, 544) utilize fasteners that are in "double shear". As further shown in FIG. 92, the tie rod arms 546 utilize fasteners that are also in "double shear". With further regard to FIG. 92, in some embodiments, the spherical bearings at the end of the respective A-arms have thereover rubber boots 548. The rubber boots help prevent foreign material (e.g., dirt) from intruding into the bearing surface.

Figure 69:
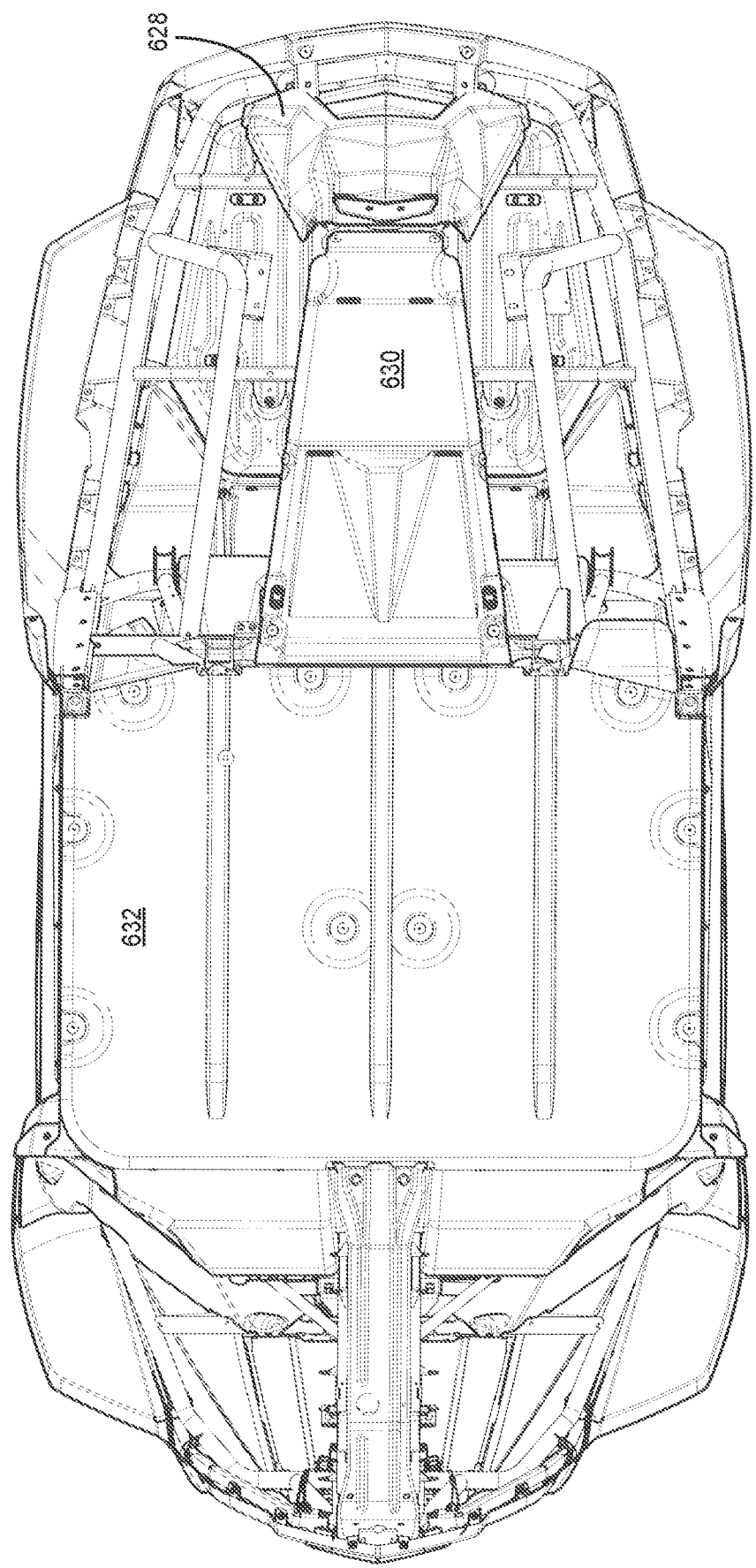
Figure 70:
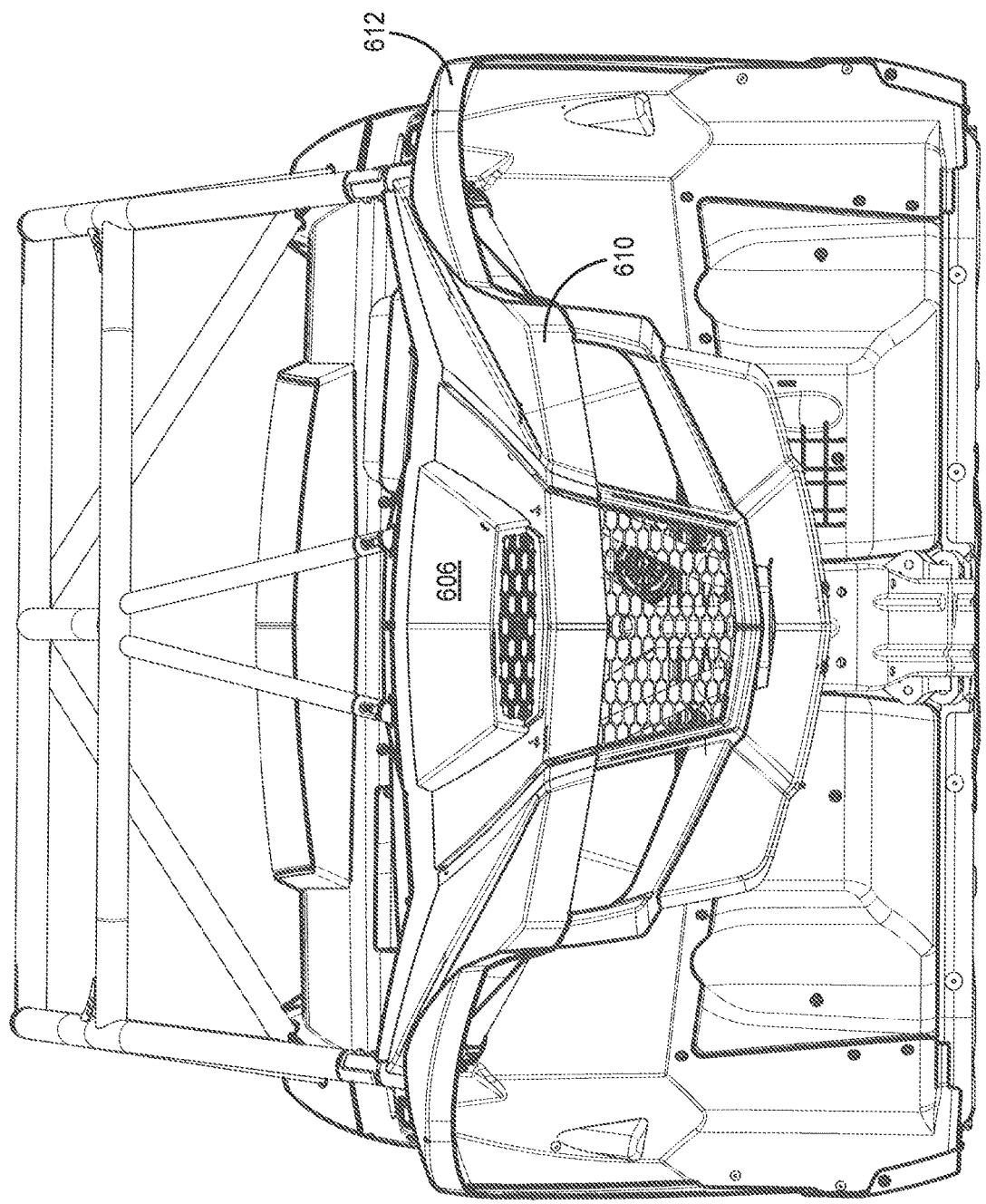
Figure 71:
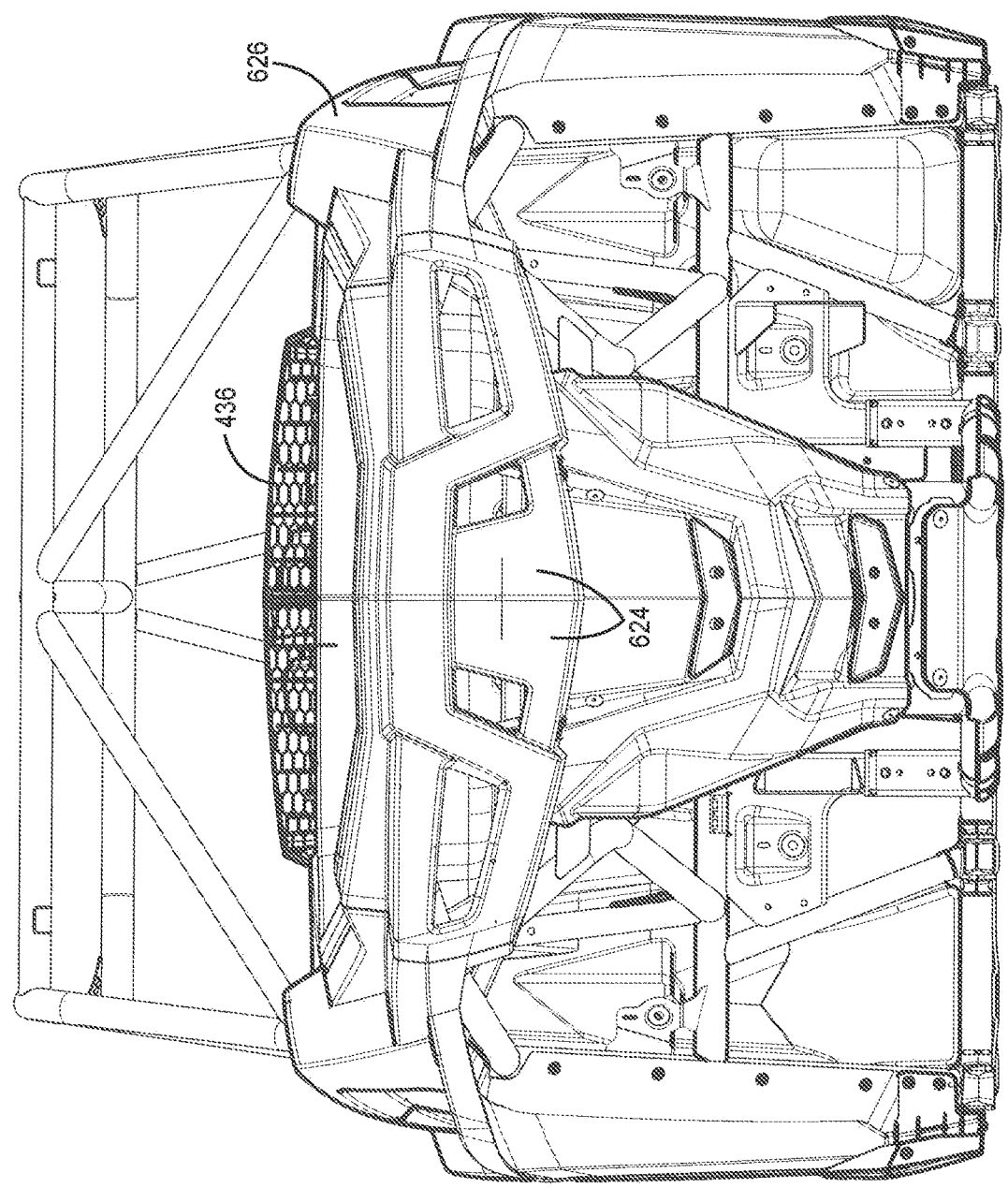
Figure 72:
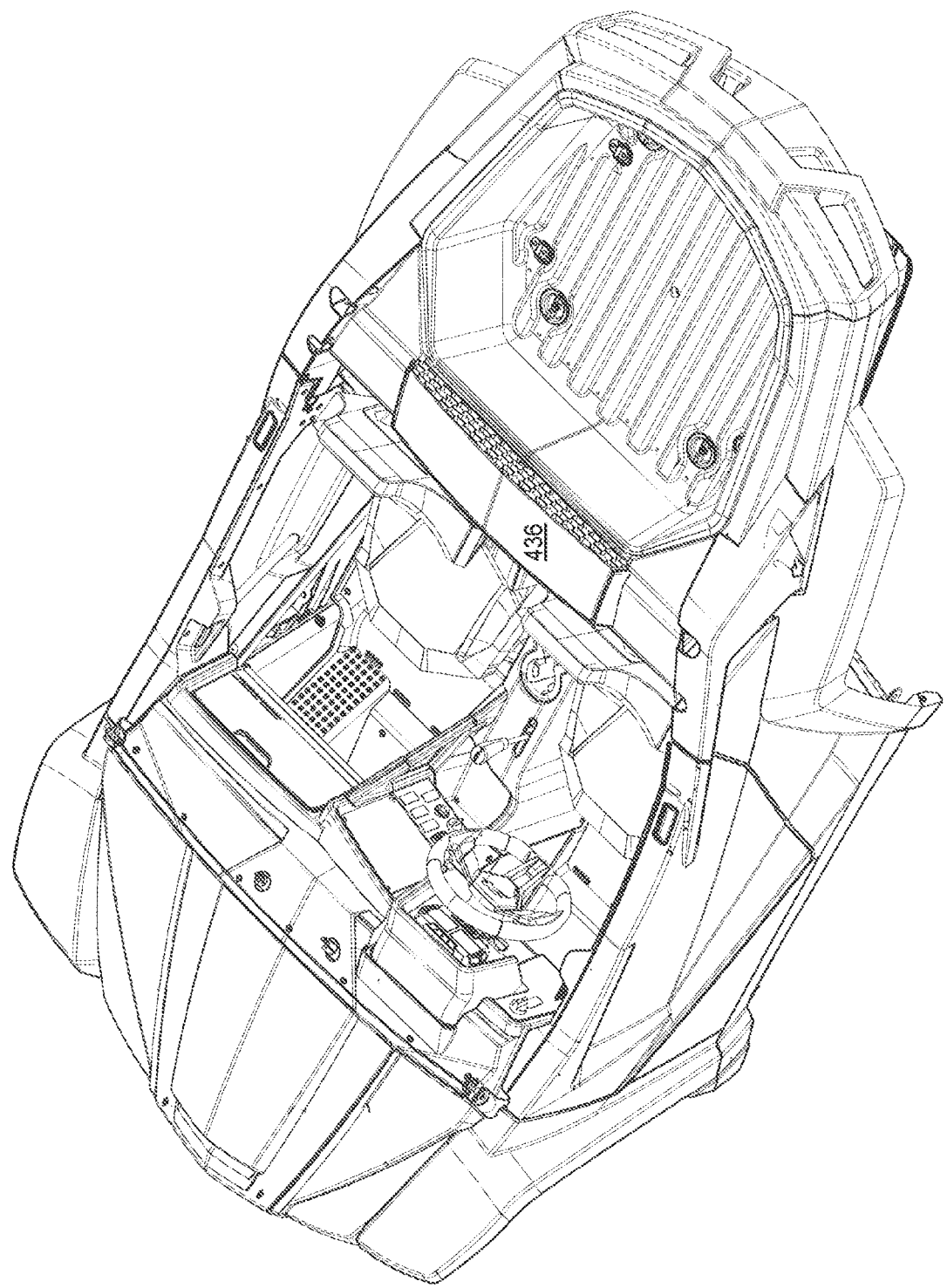
Figure 73:
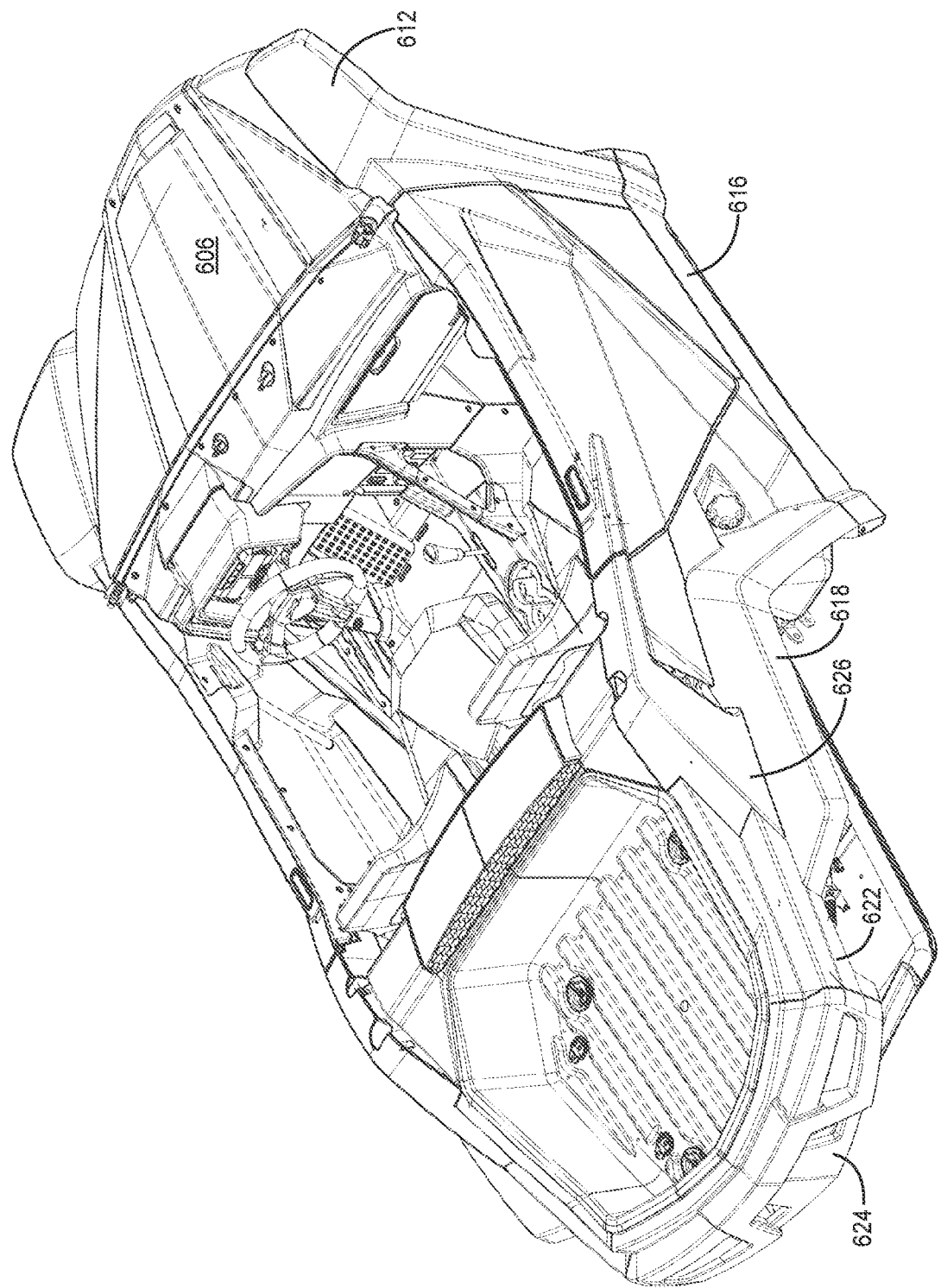
Figure 74:
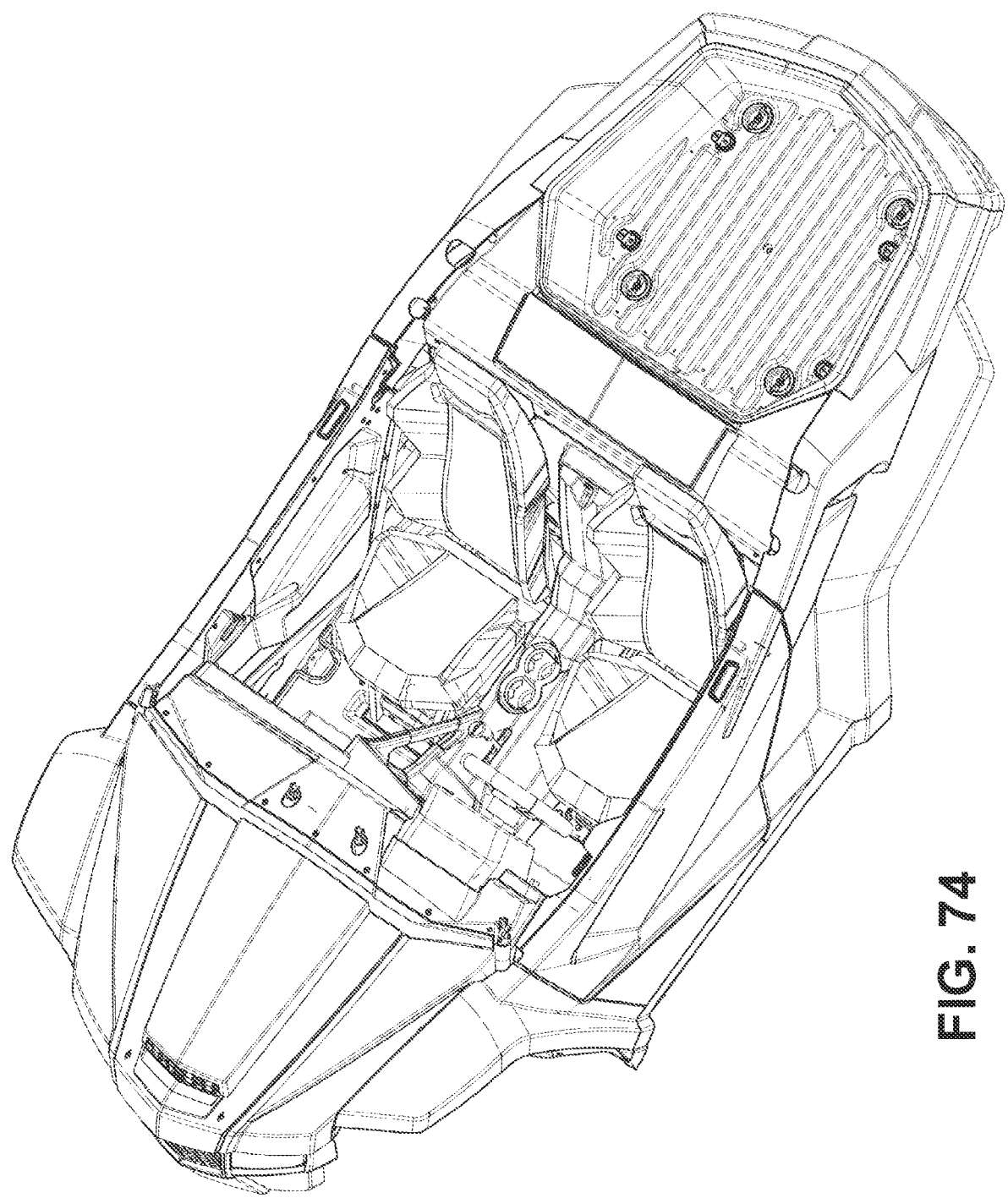
Figure 75:
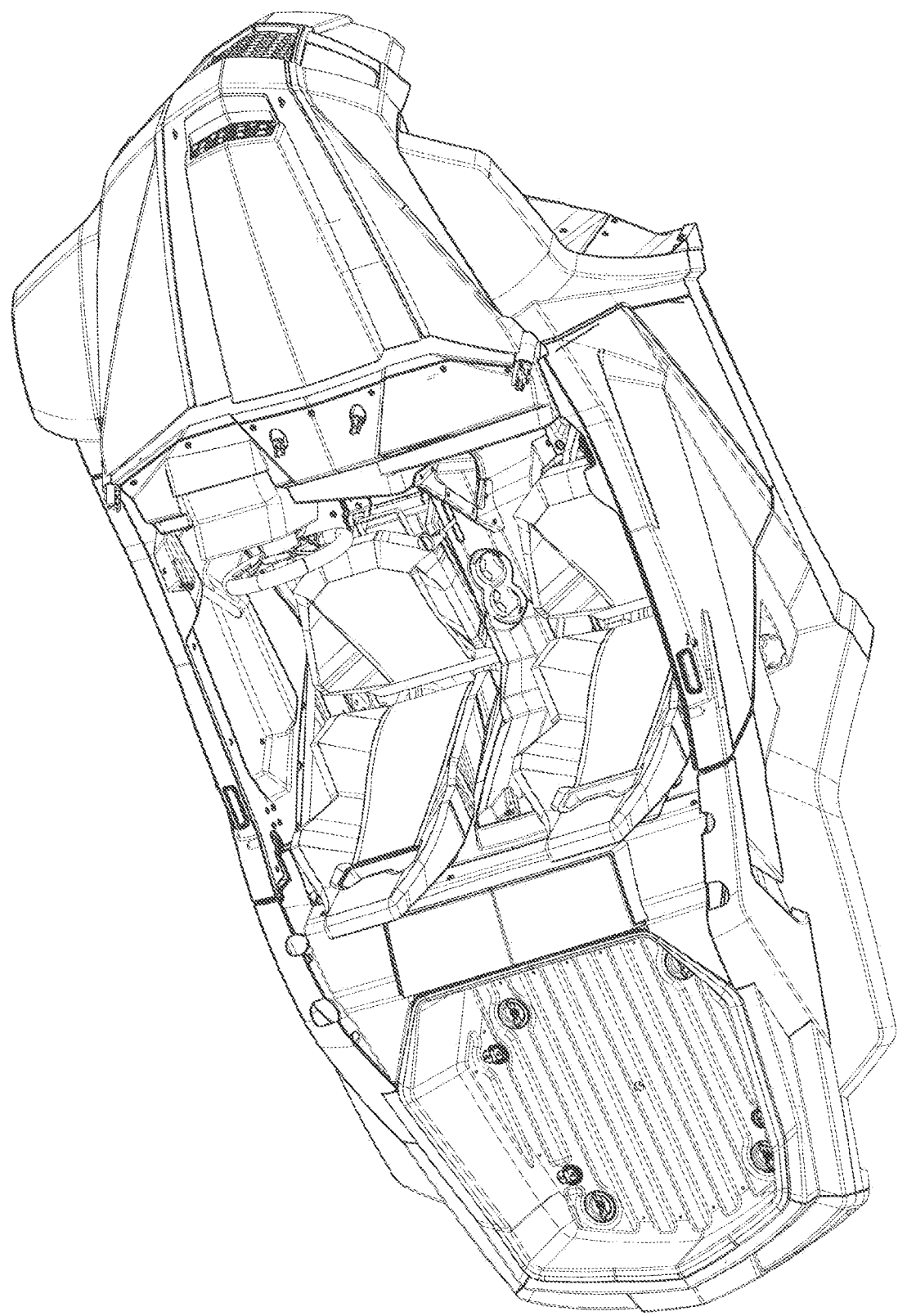
Figure 76:
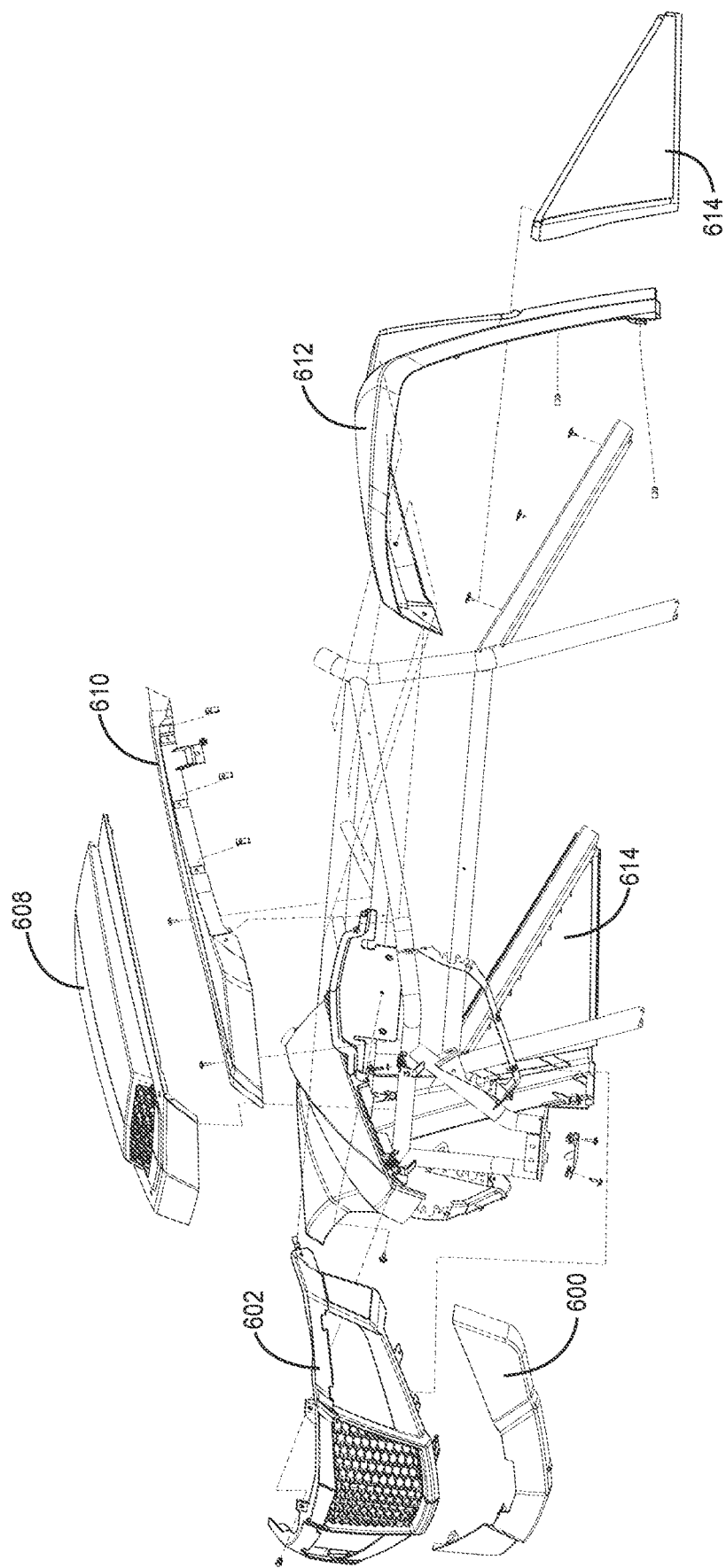
Figure 78:
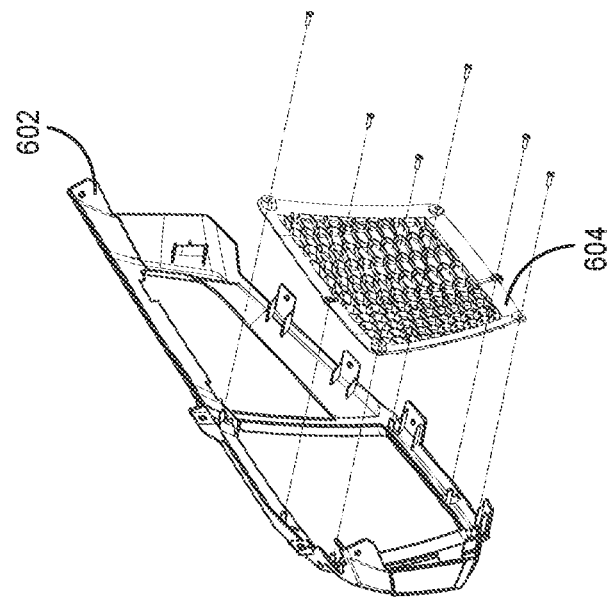
Figure 77:
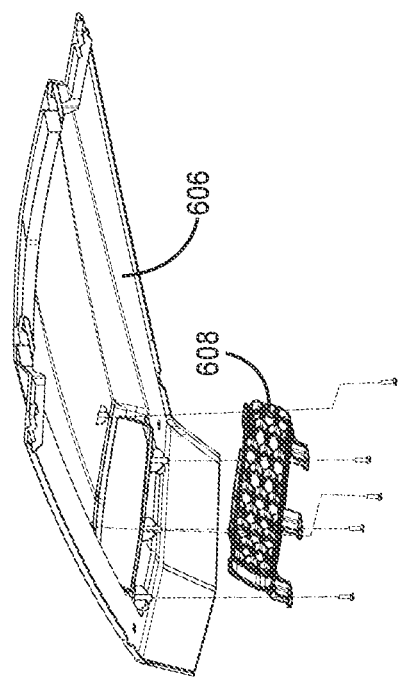

Turning to FIGS. 67-84, in some embodiments, the off-road vehicle 10 includes one or more body panels, cowls, skid plates, doors. As shown, in some embodiments, the off-road vehicle includes a front bumper panel 600, a front grill panel 602, front grill insert 604, central hood panel 606, hood insert 608, cornering hood panel 610, front outer fender panel 612, front bridging panel 614, rocker panel 616, rear outer fender panel 618, firewall panel 620, rear outer fender panel 622, rear bumper panel 624, rear ROPS panel 626, rear lower body panel 628, and rear subframe panel 630. In some embodiments, the off-road vehicle 10 further includes an underside panel 632, as shown in FIG. 69.

Figure 30:
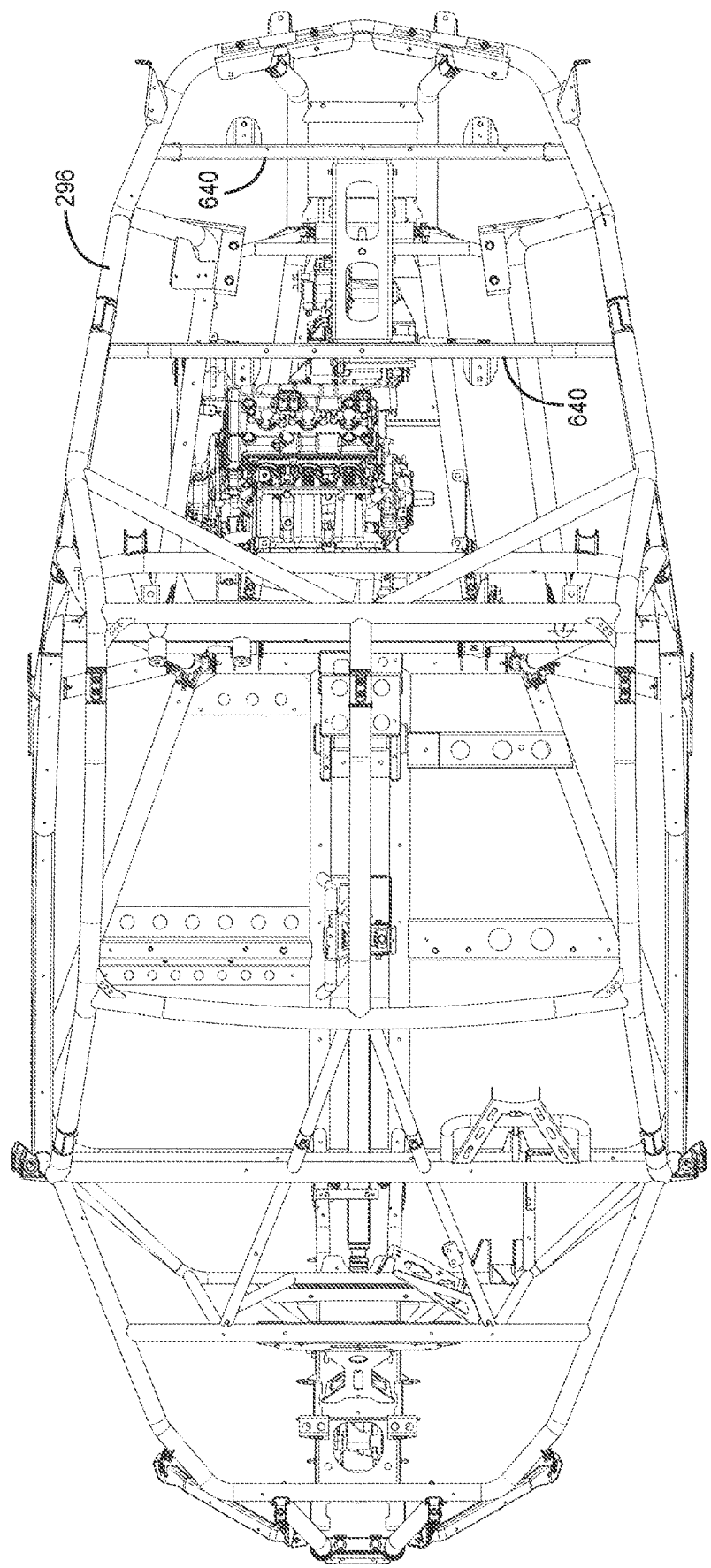
Figure 31:
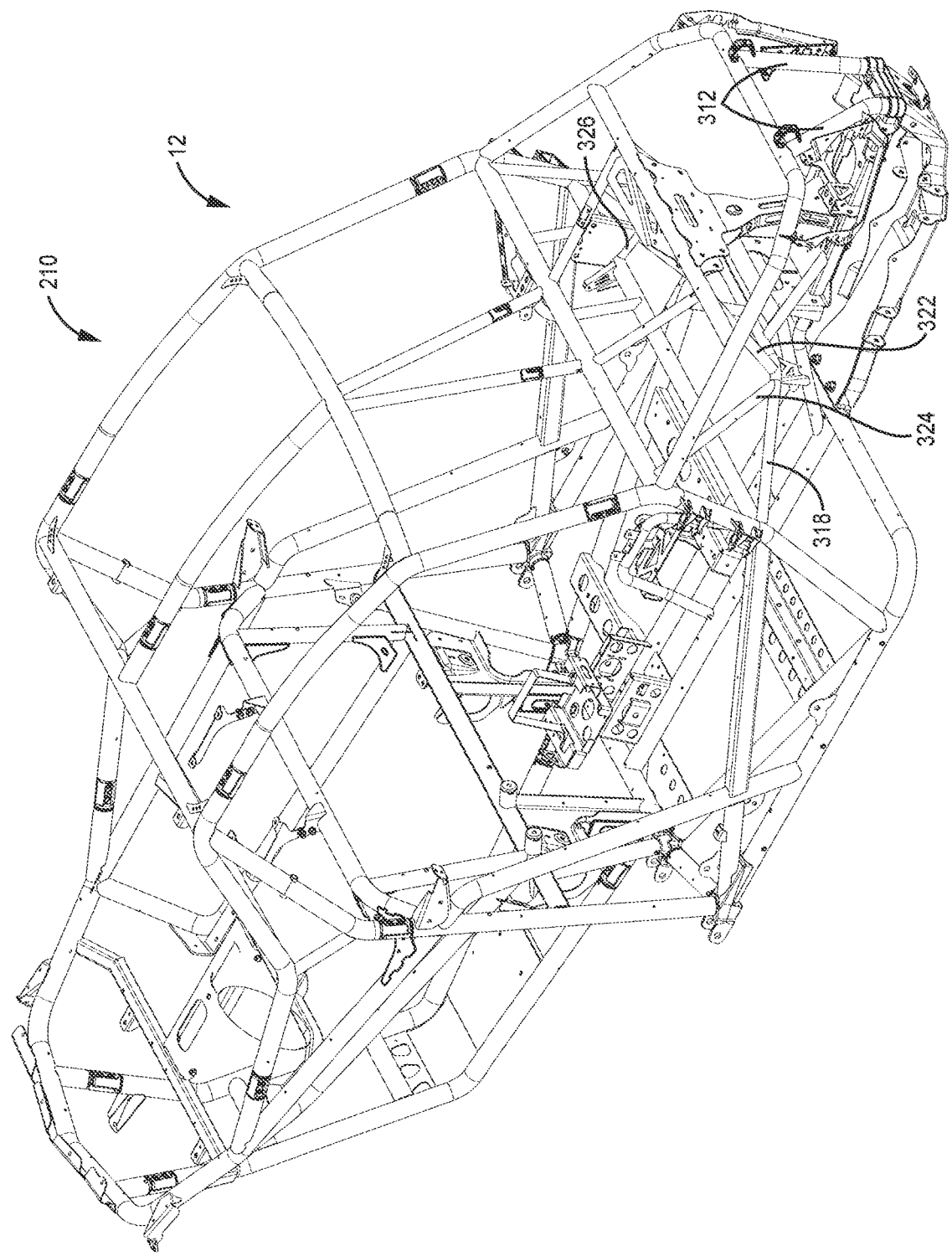
Figure 84:
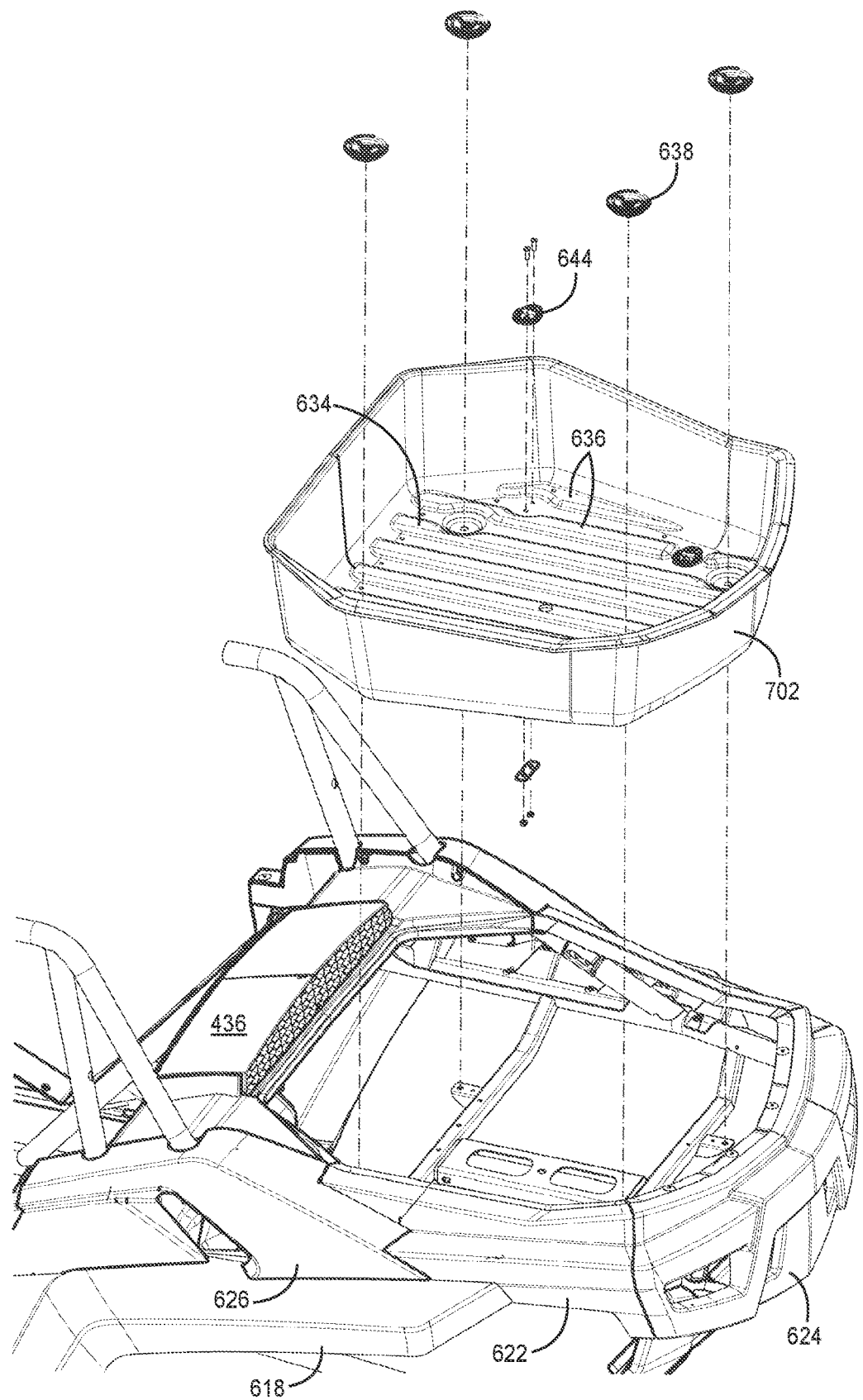
Figure 85:
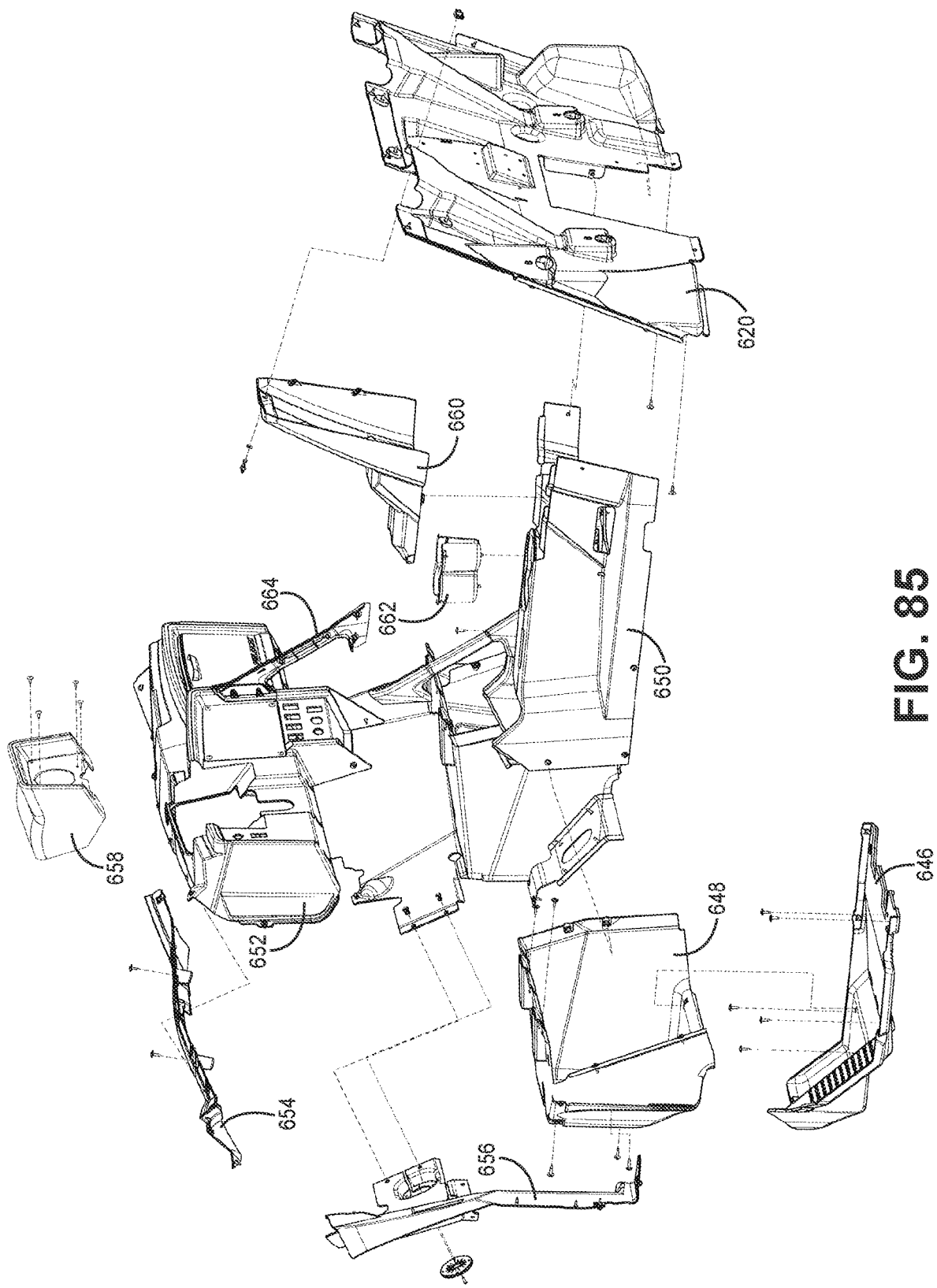
FIGS. 85-90, 106, and 107 illustrate perspective views a floor panel, a footwell panel, center console, upper dash, bridging dash panel, corner upright panel, gauge panel, rear console member, and cupholder member of an off-road recreational vehicle, according to some embodiments.

With additional reference to FIG. 84, in some embodiments, the cargo box 202 is removable from the frame 12 (e.g., main frame 212) without tools. As shown in FIG. 84, in some embodiments, the cargo box 202 has a plurality of sidewalls and a floor 634. In some embodiments, the floor 634 includes one or more ridges or corrugations 636 to provide strength to the cargo box 202. In some embodiments, the cargo box 202 is coupled, for example via fasteners 638 (e.g., large wing screws) which can be screwed in and out with one's hand to secure the cargo box 202 to cargo box frame members 640. In some embodiments, for example as shown in FIG. 30, the cargo box frame members 640 extend generally laterally between opposing rear outer lengthwise frame members 296. In some embodiments, the cargo box frame members 640 have cargo box frame tabs 642 into which the fasteners 638 are screwed (e.g., the cargo box frame tabs include nut plates, etc.).

In some embodiments, the cargo box 202 includes one or more tie-downs 644 to which cargo can be secured.

With regard to FIGS. 85-90, 106, and 107, in some embodiments, the off-road vehicle 10 comprises a floor panel 646, a footwell panel 648, center console 650, upper dash 652, bridging dash panel 654, corner upright panel 656, gauge panel 658, rear console member 660, and cupholder member 662.

Figure 86:
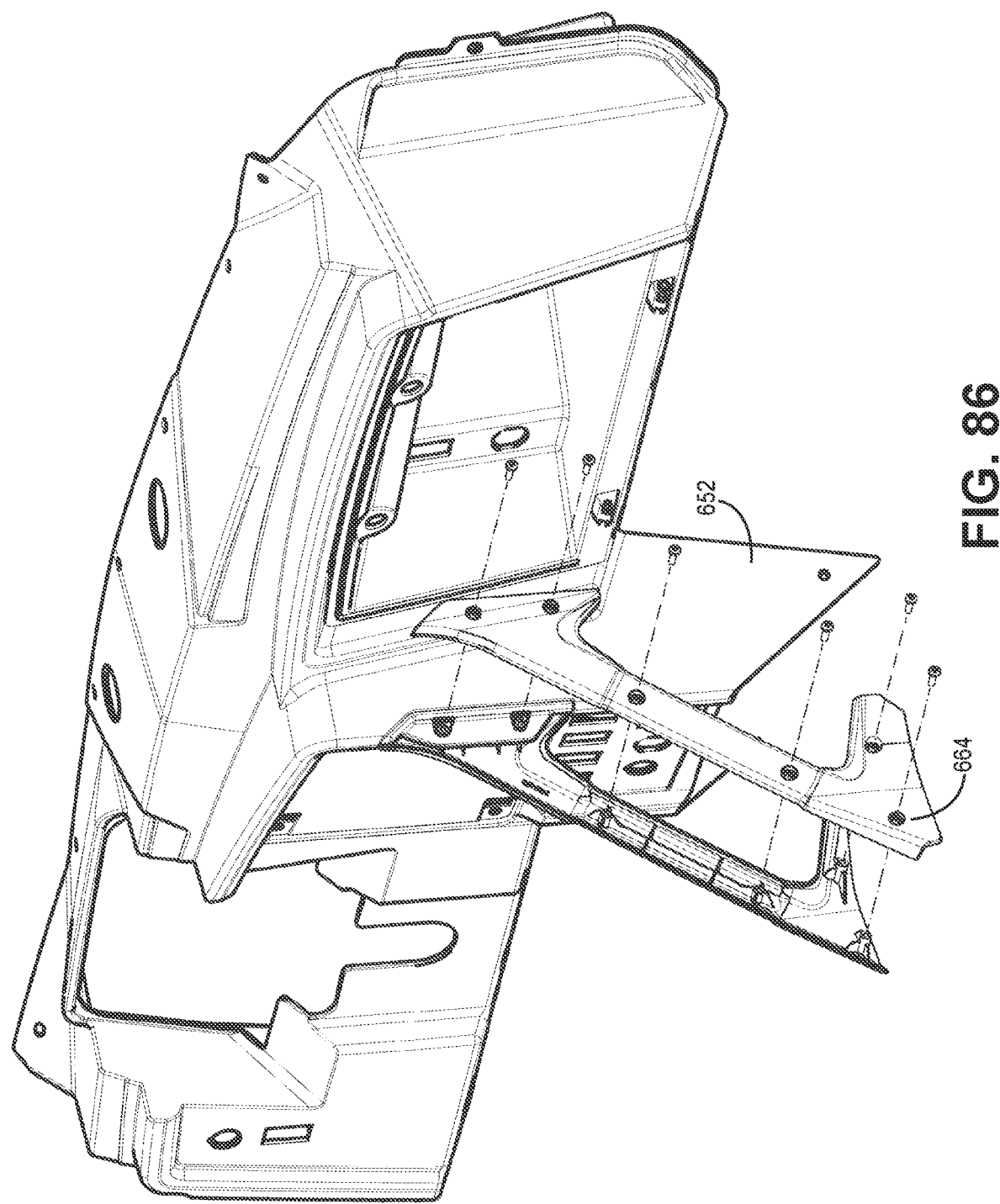

Referring to FIG. 86, in some embodiments, a passenger grab handle 664 is coupled at a first end to the upper dash 652 and at a second end to a portion of the frame 12, such as handle support hoop 666, as shown in FIG. 3. In some embodiments, the second end of the passenger grab handle 664 is coupled, via fasteners 670, to through-holes 668 (FIG. 3). The fasteners 670, in turn, are further secured to mating portion of grab handle portion 664, as shown in FIG. 86. In this way, the passenger grab handle 664 is secured, in some embodiments to one or more plastic panels and, additional, to a portion of the frame 12. In some embodiments, the grab handle 664 is formed in two halves and both halves are formed from a polymeric material.

Figure 87:
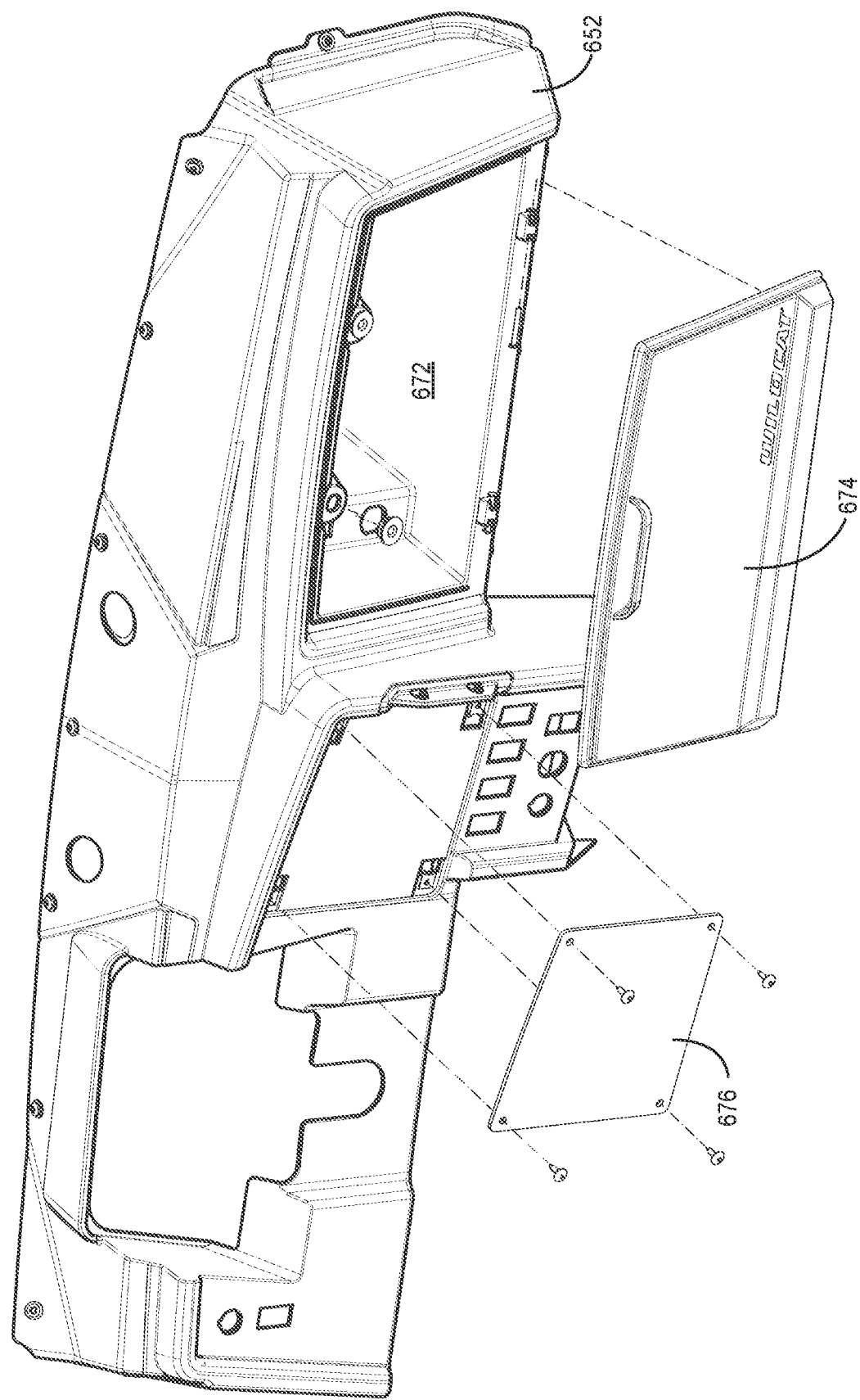
Figure 88:
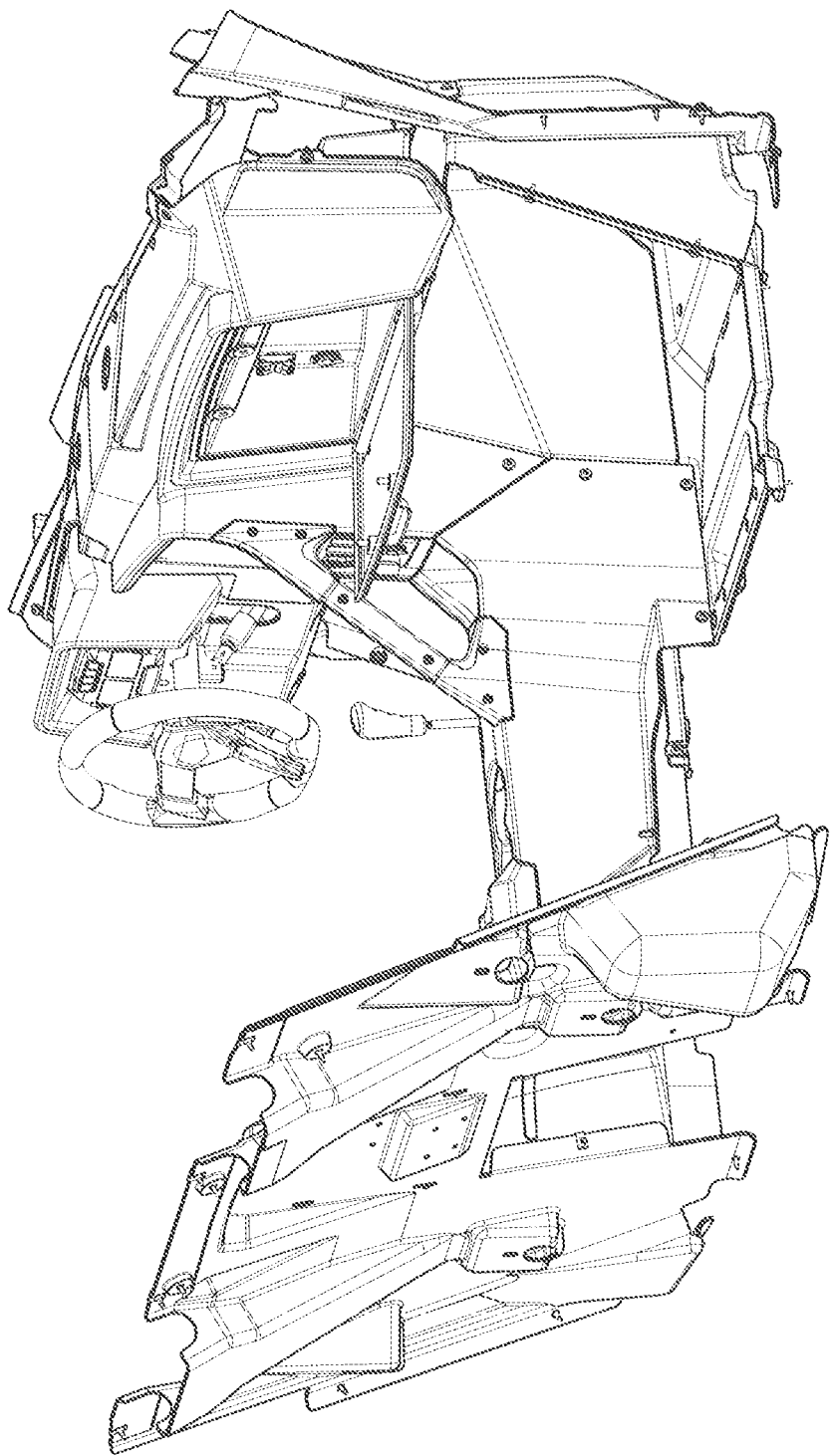
Figure 89:
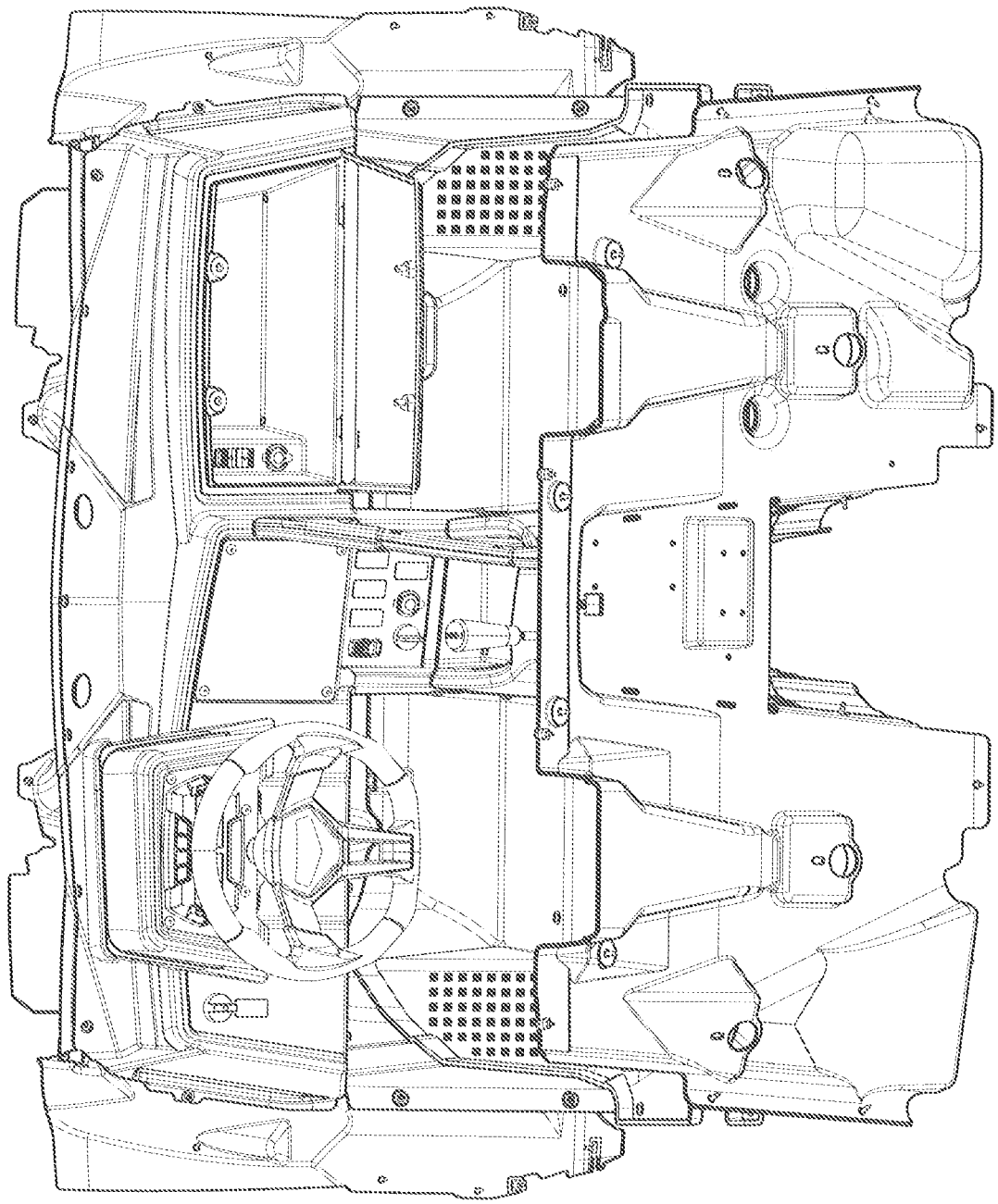
Figure 90:
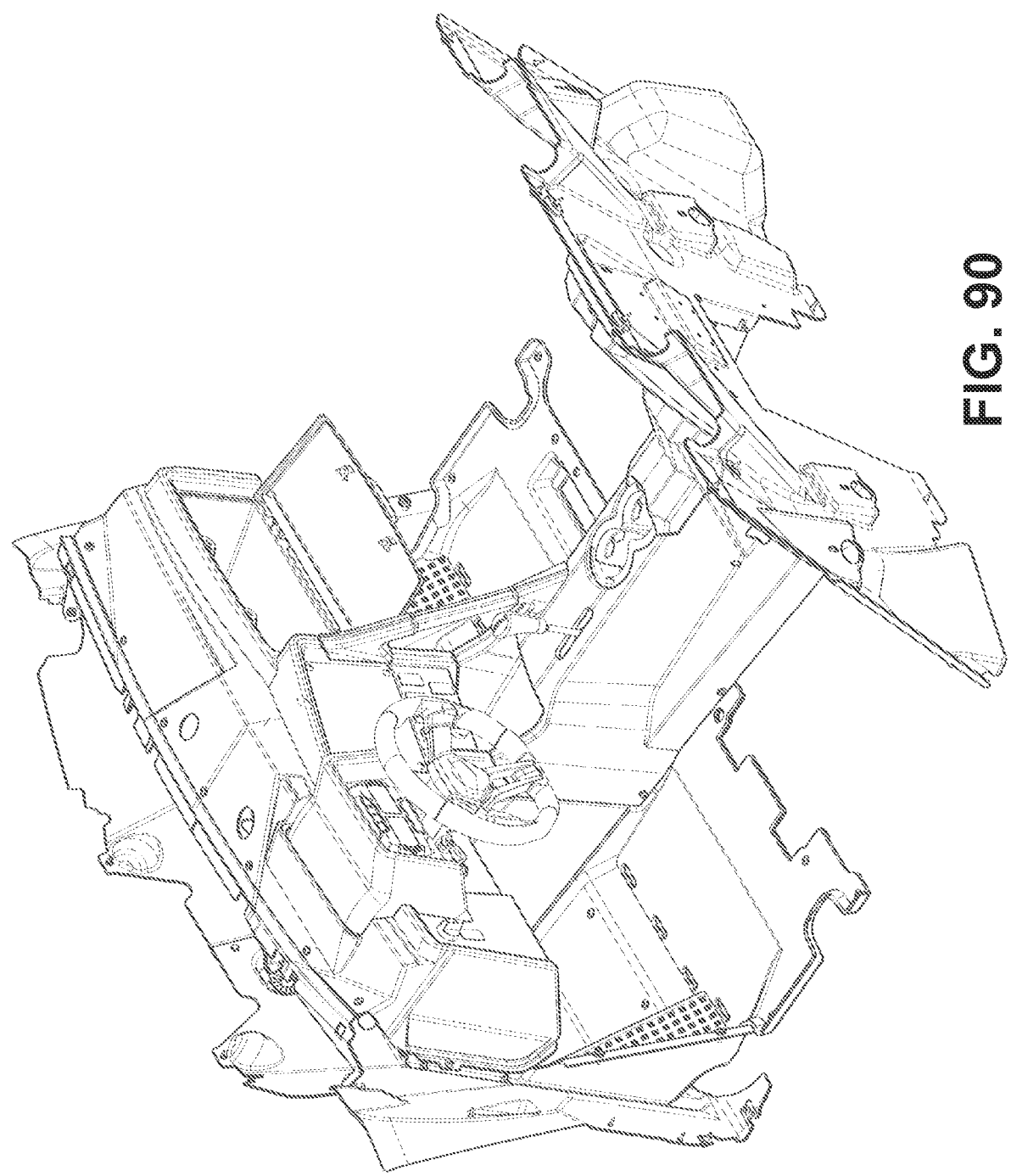

With reference to FIG. 87, in some embodiments, a glovebox 672 has a glovebox door 674, which is openably coupled, for example with a hinge, to the upper dash 652. In some embodiments, a filler panel 676 can be coupled to the upper dash 652, however, the filler panel 676 can be removed in favor of one or more accessories, such as GPS navigation, audio system, etc.

Figure 106:
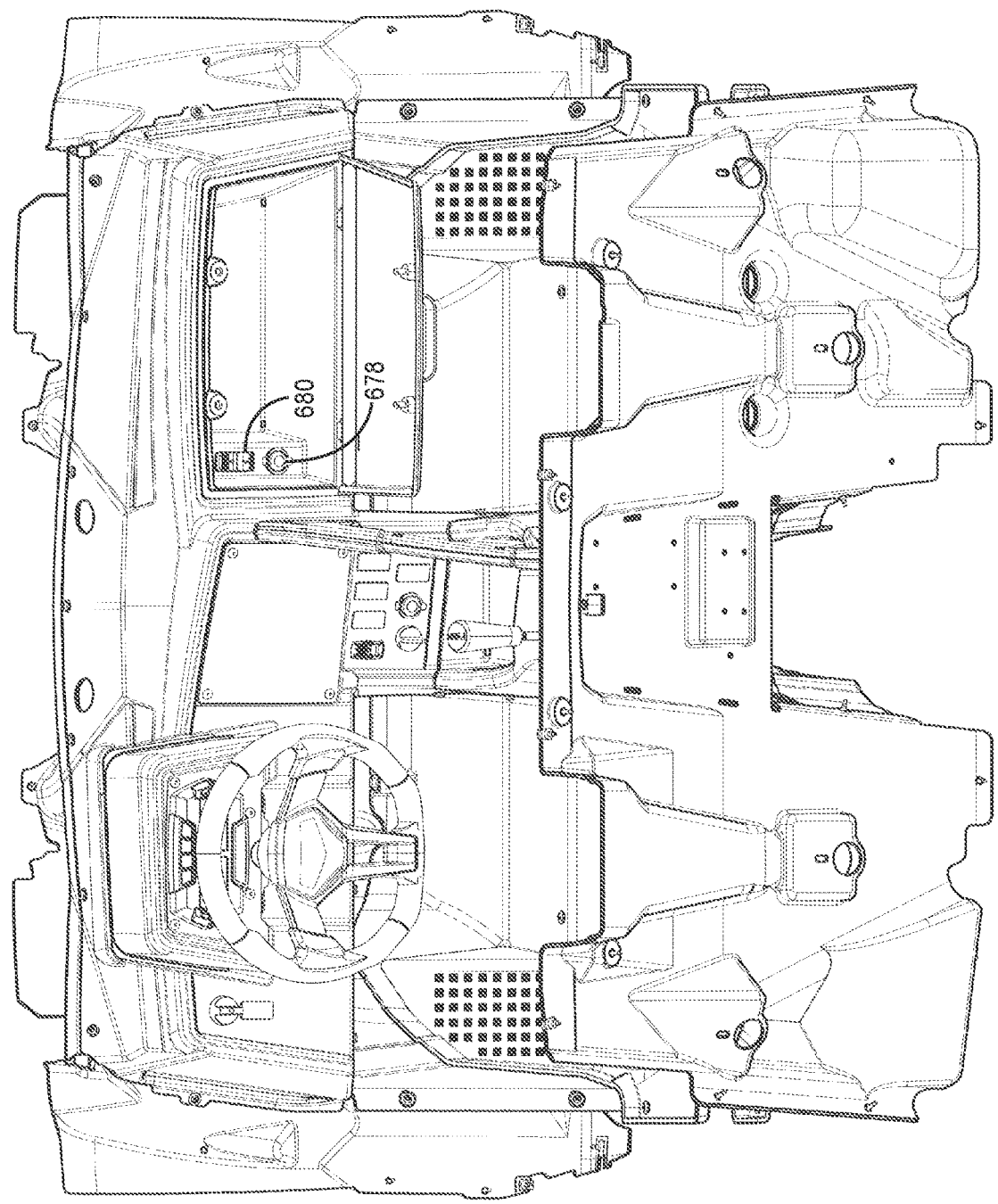
Figure 107:
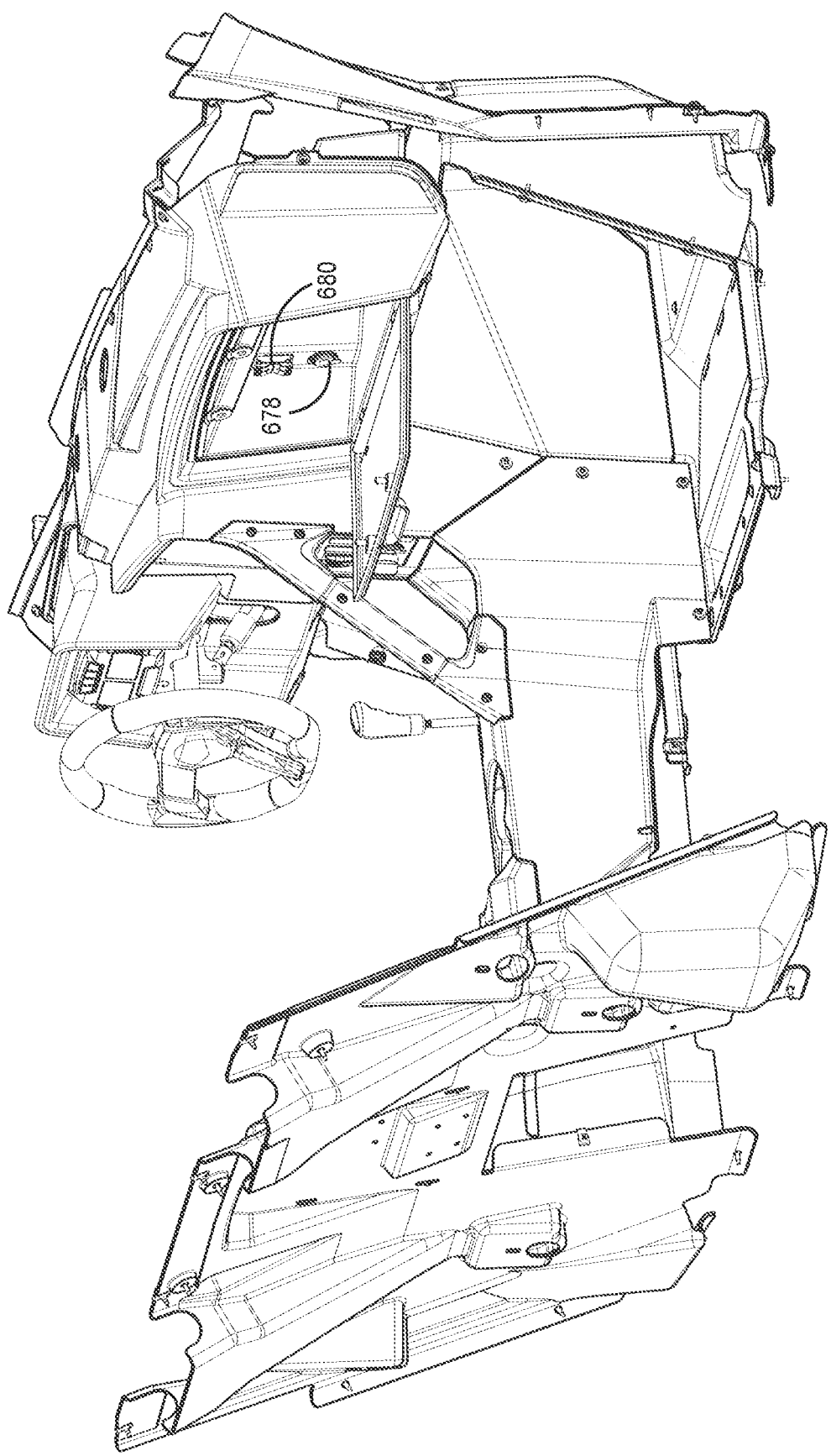

Turning now to FIGS. 106 and 107, in some embodiments, a power supply plug 678 is positioned within the glovebox 672. In some embodiments, the power supply plug is a 12-volt direct current plug; in some embodiments, the power supply plug is a 120-volt alternating current plug, such as a wall-plug.

In some embodiments, one or more USB (universal serial bus) plugs 680 are positioned within the glovebox 672. In some embodiments, the USB plugs 680 can provide power for charging cellular phones, etc. In some embodiments, however the USB plugs can permit the operator the ability to interface with an onboard GPS, modify shock settings or other vehicle characteristics, download ride statistics (range, fuel economy, maximum cornering g's, straight line acceleration, lap times, etc.).

With regard to FIGS. 101-105, in some embodiments, the trailing arm attachment locations are formed from castings to which respective frame tubes are welded. In some embodiments, an outer suspension support casting 700 is coupled (e.g., welded) to rear outer lateral lower frame member 272, rear outer upstanding support member 280, outer lower frame member 268, and lower diagonal outer support member 704.

Figure 104:
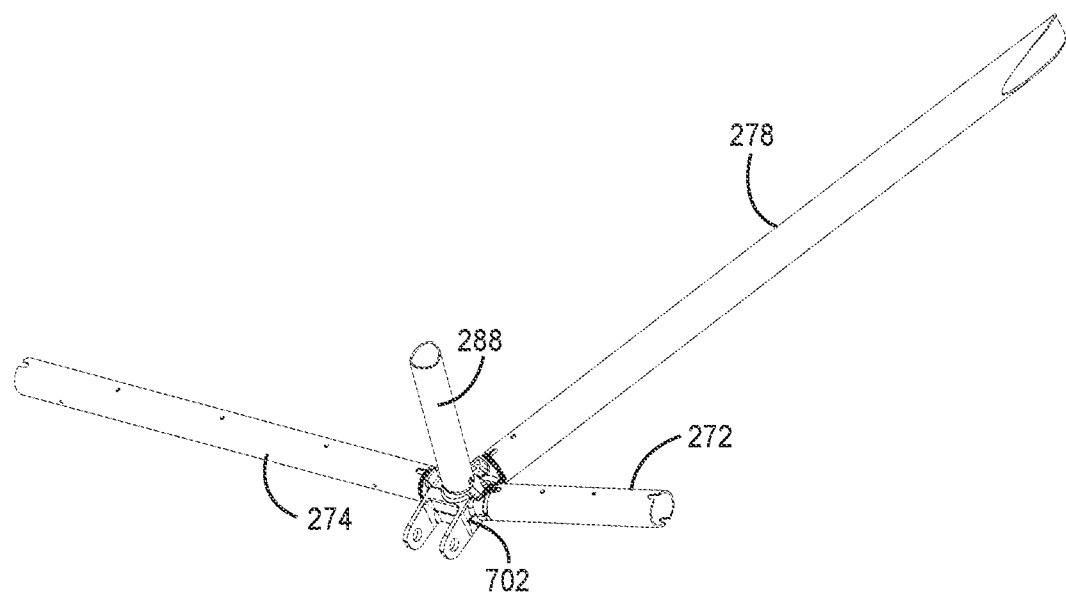
Figure 105:
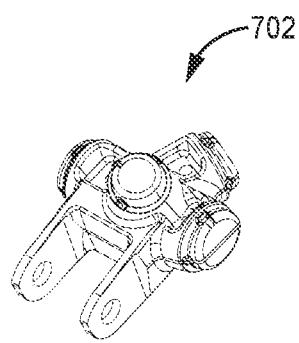

As shown in FIGS. 104 and 105, in some embodiments, the inner suspension support casting 702 is coupled (e.g., welded) to the rear outer lateral lower frame member 272, rear inner upstanding lower support member 288, and joining lower frame member 278. As discussed above with respect to other castings, the outer suspension support casting 700 and inner suspension support casting 702 include features which facilitate easy alignment of frame tubes to be welded thereto.

U.S. Pat. No. 8,764,039, titled "Suspension for Vehicle," filed Apr. 24, 2012, having inventors Keller and Seal is hereby incorporated by reference in its entirety. Further, the contents of U.S. Provisional application titled "Camber Adjusting Assembly," having inventor Robby Gordon, and Application No. 62/208,537, filed Aug. 21, 2015, is herein incorporated by reference. Additionally, the contents of U.S. Provisional application titled "Universal Wishbone Trailing Arm," having inventor Robby Gordon, and Application No. 62/208,531, filed Aug. 21, 2015, is also incorporated by reference herein. Additionally, the contents of U.S. application Ser. No. 15/242,320, titled "Universal Wishbone Trailing Arm," and U.S. application Ser. No. 15/242,380, titled "Camber Adjusting Assembly," both having first named inventor Robby Gordon are incorporated by reference herein. U.S. Provisional application titled "Off Road Vehicle," having inventor Robby Gordon, and Application No. 62/208,805, filed Aug. 23, 2015, is herein incorporated by reference. Further, the immediate application claims the benefit of and priority to Application 62/208,805, titled "Off Road Vehicle," having inventor Robby Gordon, and filed Aug. 23, 2015. Finally, U.S. 62/474,562, filed Mar. 21, 2017, having first named inventor Devin Joseph Danielson is incorporated herein by reference.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. An off-road vehicle comprising:
a frame;
a suspension movably coupled to the frame;
a passenger compartment;
an engine having an engine block;
a transmission operatively coupled to the engine; and
an engine cradle, the engine cradle having a first portion extending forwardly of the engine block and a second portion extending rearwardly of the engine block, wherein the first portion of the engine cradle includes first and second cradle uprights secured to the engine and wherein the second portion of the engine cradle includes first and second cradle legs extending rearwardly from the first and second cradle uprights, respectively.

2. The off-road vehicle of claim 1, wherein the first and second cradle uprights each include one or more bolt holes for securing the engine to the first and second cradle uprights.

3. The off-road vehicle of claim 1, wherein the first portion of the engine cradle includes cradle uprights, wherein the engine cradle further includes a cradle support coupled to the first and second cradle uprights, wherein the cradle support is located forward of the first and second cradle uprights, and wherein the engine cradle further includes front isolators, wherein the front isolators couple the cradle support to the frame.

4. The off-road vehicle of claim 1, wherein the first portion of the engine cradle further includes a hoop member, having one or more tabs for supporting an intake assembly.

5. The off-road vehicle of claim 1, further including a cradle bridge member coupled to the second portion of the engine cradle, wherein the cradle bridge member is located rearward of the engine cradle.

6. The off-road vehicle of claim 5, wherein the engine is coupled to the cradle bridge member.

7. The off-road vehicle of claim 1, further including a transmission support member coupled to the frame, wherein the transmission support member is coupled to the transmission.

8. The off-road vehicle of claim 1, wherein the suspension includes a front suspension comprising upper A-arms and lower A-arms, wherein the upper A-arms are movably coupled to the frame via a front upper A-arm support member.

9. The off-road vehicle of claim 1, further including side-by-side seats arranged within the passenger compartment.

10. The off-road vehicle of claim 1, wherein the frame includes at least one cargo box support member.

11. The off-road vehicle of claim 10, further including a cargo box, wherein the cargo box is removably coupled to the at least one cargo box support member.

12. The off-road vehicle of claim 1, wherein a driveshaft is coupled to the transmission, wherein one or more portions of the driveshaft extends beneath a portion of the engine.

13. The off-road vehicle of claim 1, further including an exhaust assembly.

14. The off-road vehicle of claim 1, further including:
a radiator;
a first coolant line extending from a front of the radiator to the engine, wherein the first coolant line provides coolant from the radiator to the engine; and
a second coolant line extending from a back of the radiator to the engine, wherein the second coolant line provides coolant from the engine to the radiator.

15. The off-road vehicle of claim 1, wherein the suspension includes a rear suspension, and wherein the rear suspension includes a wishbone trailing arm attachment to the frame.

16. An off-road vehicle comprising:
a frame;
a suspension movably coupled to the frame;
a passenger compartment;
an engine having an engine block;
a transmission operatively coupled to the engine;
an engine cradle, the engine cradle having a first portion extending forwardly of the engine block and a second portion extending rearwardly of the engine block; and
a cradle bridge member coupled to the second portion of the engine cradle, wherein the cradle bridge member is located rearward of the engine cradle, wherein the engine is coupled to the cradle bridge member.

17. The off-road vehicle of claim 16, wherein the first portion of the engine cradle includes first and second cradle uprights secured to the engine and wherein the second portion of the engine cradle includes first and second cradle legs extending rearwardly from the first and second cradle uprights, respectively, wherein the engine cradle further includes a cradle support coupled to the first and second cradle uprights, wherein the cradle support is located forward of the first and second cradle uprights, and wherein the engine cradle further includes front isolators, wherein the front isolators couple the cradle support to the frame.

* * * * *